US007248832B2

(12) United States Patent
Ikeda et al.

(10) Patent No.: US 7,248,832 B2
(45) Date of Patent: Jul. 24, 2007

(54) TRANSMITTING AND RECEIVING SYSTEM, TRANSMITTING APPARATUS AND RECEIVING APPARATUS

(75) Inventors: Takumi Ikeda, Hyogo-ken (JP); Yasunori Kawakami, Hyogo-ken (JP); Tsutomu Mikami, Kyoto-fu (JP); Hidekazu Tanigawa, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 865 days.

(21) Appl. No.: 09/911,873

(22) Filed: Jul. 25, 2001

(65) Prior Publication Data
US 2002/0123310 A1 Sep. 5, 2002

(30) Foreign Application Priority Data
Aug. 1, 2000 (JP) ............................. 2000-232760
Jul. 19, 2001 (JP) ............................. 2001-219506

(51) Int. Cl.
*H04B 7/24* (2006.01)
*H04B 1/00* (2006.01)
*H04B 7/00* (2006.01)

(52) U.S. Cl. ......................................... 455/39; 455/70
(58) Field of Classification Search .................. 455/92, 455/414.1–414.3, 432.3, 39, 70
See application file for complete search history.

(56) References Cited

U.S. PATENT DOCUMENTS 5,787,356 A * 7/1998 Tanaka et al. ............... 455/464
6,438,213 B2 * 8/2002 Takeda et al. ............. 379/67.1
6,745,177 B2 * 6/2004 Kepler et al. .................. 707/3
6,766,313 B1 * 7/2004 Kromann ....................... 707/2
6,778,986 B1 * 8/2004 Stern et al. ................... 707/10
6,792,245 B1 * 9/2004 Kawai ........................ 455/3.01
6,834,111 B1 * 12/2004 Nishimura et al. ......... 380/255
2002/0110230 A1 * 8/2002 Leuca et al. ............. 379/201.01

FOREIGN PATENT DOCUMENTS

JP 10-91686 4/1998

OTHER PUBLICATIONS

English Language Abstract of JP 10-91686.

* cited by examiner

*Primary Examiner*—Benny Q Tieu
(74) *Attorney, Agent, or Firm*—Greenblum & Bernstein, P.L.C.

(57) ABSTRACT

A transmission and reception system includes a transmission apparatus 1 and reception apparatuses 21 and 22. The transmission apparatus 1 transmits a storage identifier for identifying a storage medium and data. The reception apparatuses 21 and 22 each include a receiving section for receiving the storage identifier for identifying the storage medium and the data, and a storage control section for storing the data received by the receiving section on the storage medium identified by the storage identifier received by the receiving section. Hence, automatic storage of data conforming to personal taste and simultaneous automatic storage of data for plural persons are realized.

8 Claims, 70 Drawing Sheets

Fig. 3

| Content kind<br>Large item | Content kind<br>Small item | Content kind number |
|---|---|---|
| News | Politics/Economy | 00 |
|  | Sports | 01 |
|  | Weather | 02 |
|  | ... | ... |
| Sports | Soccer | 10 |
|  | Athletics | 11 |
|  | ... | ... |
| Music | Japanese music | 20 |
|  | Western music | 21 |
|  | ... | ... |
| Game | Role playing | 30 |
|  | Race | 31 |
|  | Shooting | 32 |
|  | Action | 33 |
|  | Simulation | 34 |
|  | Adventure | 35 |
|  | ... | ... |
| ... | ... | ... |

Fig. 6

| Name of user | Receiving apparatuses identification number | Usage period | Content kind number | Content number |
|---|---|---|---|---|
| A | ID(A1),ID(A2) | 99/10/28~00/03/31 | 01 | — |
| A | ID(A1),ID(A2) | — | — | #010001011345 |
| | | | | |

Fig. 7

| Name of user | Receiving apparatuses identification number | Usage period | Content kind number | Content number | Storage identifier |
|---|---|---|---|---|---|
| A | ID(A1),ID(A2) | 99/10/28~ 00/03/31 | 01 | — | β |
| A | ID(A1),ID(A2) | — | — | #010001011345 | β |
| | | | | | |

Fig. 13

| Content kind number | Storage medium identifier |
|---|---|
| 00 | α |
| 01 | β |
| 02 | α |
| ... | ... |
| 10 | γ |
| 11 | γ |
| ... | ... |
| 20 | α |
| 21 | α |
| ... | ... |
| 30 | β |
| 31 | β |
| 32 | β |
| 33 | β |
| 34 | β |
| 35 | β |
| ... | ... |
| ... | ... |

Fig. 26

| User name | Receiving apparatuses identification number |
|---|---|
| A | ID(A1), ID(A2) |

Fig. 27

| User name | Content kind number | | | | | | | | |
|---|---|---|---|---|---|---|---|---|---|
| | 00 | 01 | 02 | 03 | 10 | 11 | 20 | 21 | 22 |
| A | 1.0 | −2.5 | −0.5 | −1.5 | 2.5 | 0.5 | 0.5 | 0.5 | 0.5 |

Fig. 28

| User name \ Content kind number | 00 | 01 | 02 | 03 | 10 | 11 | 20 | 21 | 22 |
|---|---|---|---|---|---|---|---|---|---|
| A | 1.0 | −2.5 | −0.5 | −1.5 | 2.5 | 0.5 | 0.5 | 0.5 | 0.5 |
|   | α | β | α | α | α | γ | γ | α | α |

Fig. 29

| Index | Interest degree threshold value |
|---|---|
| Degree of health | −0.5 |
| Degree of time to spare | −2.0 |
| Family budget | 1.5 |

Fig. 33

| User name | Interest degree threshold value |
|-----------|-------------------------------|
| A | −1.0 |

*Fig. 34*

| User name | Content kind number |
|---|---|
| A | 00, 02, 10, 20, 21, 22 |

Fig. 38

| User name | Receiving apparatuses identification number |
|---|---|
| A | ID(A1),ID(A2) |
| B | ID(B1) |
| C | ID(C1),ID(C2),ID(C3) |
| Y | ID(Y1) |
| Z | ID(Z1) |

Fig. 39

| User name | Period | Receiving apparatuses identification number |
|---|---|---|
| A | 1999/08/01~1999/08/31 | ID(A1),ID(A2) |
| A | 1999/09/01~1999/09/30 | ID(A1) |
| B | No period limit | ID(B1) |
| C | No period limit | ID(C1),ID(C2),ID(C3) |
| Y | No period limit | ID(Y1) |
| Z | No period limit | ID(Z1) |

Fig. 40

| User name | Content kind number | | | | | | | | | |
|---|---|---|---|---|---|---|---|---|---|---|
| | 00 | 01 | 02 | 03 | 10 | 11 | 20 | 21 | 22 |
| A | 1.0 | -2.5 | -0.5 | -1.5 | 2.5 | 0.5 | 0.5 | 0.5 | 0.5 |
| B | 0.5 | -0.5 | 1.5 | 2.5 | 0.5 | -0.5 | -1.5 | -0.5 | 2.5 |
| C | 0.0 | -0.5 | -1.5 | 0.5 | 0.5 | -0.5 | 2.5 | -0.5 | 2.5 |
| Y | -0.5 | 0.5 | -0.5 | -1.5 | 2.5 | 0.5 | -0.5 | 0.5 | -2.5 |
| Z | 0.5 | -1.5 | -0.5 | 1.5 | -0.5 | -0.5 | 0.5 | 2.5 | 1.5 |

Fig. 41

| User name | Content kind number | | | | | | | | | |
|---|---|---|---|---|---|---|---|---|---|---|
| | 00 | 01 | 02 | 03 | 10 | 11 | 20 | 21 | 22 |
| A | 1.0 α | -2.5 α | -0.5 α | -1.5 β | 2.5 α | 0.5 α | 0.5 γ | 0.5 β | 0.5 β |
| B | 0.5 β | -0.5 β | 1.5 α | 2.5 α | 0.5 α | -0.5 α | -1.5 α | -0.5 γ | 2.5 β |
| C | 0.0 α | -0.5 α | -1.5 α | 0.5 α | 0.5 α | -0.5 α | 2.5 α | -0.5 α | -2.5 α |
| Y | -0.5 α | 0.5 α | -0.5 α | -1.5 γ | 2.5 γ | 0.5 γ | -0.5 β | 0.5 β | -1.5 β |
| Z | 0.5 α | -1.5 α | -0.5 α | 1.5 β | -0.5 β | -0.5 β | 0.5 γ | 2.5 γ | 1.5 γ |

Fig. 42

| User | Content kind number |
|------|---------------------|
| A    | 00, 10              |
| B    | 02, 03, 22          |

Fig. 43

| Group | Names of users belonging to group |
|---|---|
| G1 | A, B, C |
| G2 | A, Y, Z |

Fig. 44

| Group | 00 | 01 | 02 | 03 | 10 | 11 | 20 | 21 | 22 |
|---|---|---|---|---|---|---|---|---|---|
| | | | | | Content kind number | | | | |
| G1 | 0.5 | -1.1 | -0.1 | 0.5 | 1.1 | -0.1 | 0.5 | -0.1 | 0.1 |
| G2 | 0.3 | -1.1 | -0.5 | -0.5 | 1.5 | 0.1 | 0.1 | 1.1 | 0.1 |

Fig. 46

| Group | Content kind number |
|---|---|
| G1 | 10 |
| G2 | 10, 21 |

Fig. 48

| Common index | Interest degree threshold value |
|---|---|
| Busy | 0.5 |
| Sleepy | 0.5 |
| Unhealthy | 1.0 |
| Tired | 0.5 |
| No time | 1.0 |
| No money | 0.5 |
| Very poor | 1.0 |
| Wishing to have a holiday | 0.5 |
| Lonely | -0.5 |

Fig. 49

| Common index | Interest degree threshold value A |
|---|---|
| Busy | 0.0 |
| Sleepy | 0.0 |
| Unhealthy | 0.0 |
| Tired | 0.0 |
| No time | 1.0 |
| No money | 0.0 |
| Very poor | 0.0 |
| Wishing to have a holiday | 0.0 |
| Lonely | 0.0 |

Fig. 50

| Common index | Interest degree threshold value | | |
|---|---|---|---|
| | A | B | C |
| Busy | 0.0 | 0.5 | 0.0 |
| Sleepy | 0.0 | 0.0 | 0.0 |
| Unhealthy | 0.0 | 0.0 | 0.0 |
| Tired | 1.0 | 0.0 | 0.0 |
| No time | 0.0 | 0.0 | 0.0 |
| No money | 0.0 | 0.0 | 0.0 |
| Very poor | 0.0 | 0.0 | 0.0 |
| Wishing to have a holiday | 0.0 | 0.0 | -0.5 |
| Lonely | 0.0 | 0.0 | 0.0 |

Fig. 52

| User | Interest degree threshold value |
|------|-------------------------------|
| A    | 1.0                           |

Fig. 53

| Group | Interest degree threshold value |
|---|---|
| G1 | 1.0 |

*Fig. 54*

| User | Content kind number |
|---|---|
| A | 10 |

*Fig. 55*

| Group | Content kind number |
|---|---|
| G1 | 10 |

TRANSMITTING AND RECEIVING SYSTEM, TRANSMITTING APPARATUS AND RECEIVING APPARATUS

CROSS-REFERENCE TO RELATED APPLICATIONS

This application is based upon application Nos. 2000-232760 and 2001-219506 filed in Japan, the contents of which are hereby incorporated by reference.

BACKGROUND OF THE INVENTION

1. Field of the Invention

The present invention relates to a network system, a broadcasting system, etc. for carrying out the management of data transmission and reception and data storage (or data accumulation).

2. Description of the Related Arts

Transmitting means by broadcasting and wired networks are available as means for delivering data to an indefinite number of users. In recent years, digital broadcasting via satellite waves has been put to practical use, and the transmission of video and audio contents, data and the like through multiple channels has been realized. In addition, digital broadcasting via terrestrial waves has become active for practical use. Furthermore, contents can be received through receiving apparatuses, such as television sets, home video systems or personal computers. Still further, media for accumulating (or writing) data are increasing in capacity and diversity.

Various proposals have been made for data storage (or accumulation) methods by utilizing the characteristics of the above-mentioned broadcasting systems, receiving apparatuses and storage (or accumulation) media. Furthermore, various proposals have also been made for storage (or accumulation) methods for data transmitted through digital wired networks.

For example, a proposal has been made wherein data provided from public telephone lines is received and accumulated, and unnecessary data is deleted on the judgment on the taste of the user of a storage medium (Japanese Laid-open Patent Publication No. Hei 10-91686). Furthermore, a proposal has been made wherein, from a substitute apparatus for accumulating all broadcast data, data is captured automatically on the basis of the judgment on the taste of a person on a storage medium used by the person. When data is transferred or copied from a receiving apparatus with stored data to a receiving apparatus having a storage medium on which data transmitted via a broadcasting systems or a digital wired network is not accumulated, the data is transferred from the receiving apparatus through a removable storage medium or via a network.

When storing data transmitted by a transmitting apparatus by using automatic storage means on the basis of judgment on the personal taste of a user, judgment wherein a standard based on fixed personal attributes not subjected to time-series changes is used as a standard for judgment on the personal taste of a user depending on daily living environments is made. Hence, in the case of the above-mentioned data storage, the personal taste cannot always be judged properly, whereby data not conforming to the personal taste at a certain time was accumulated automatically in some cases.

Furthermore, in the case of automatic storage of data on the basis of the judgment on the personal taste, the judgment on the taste of plural persons was not carried out, and data was not able to be accumulated or shared automatically and simultaneously among plural persons. Hence, just as in the case of data transfer and copying among plural receiving apparatuses, in order to share data among plural persons, data desired to be shared was stored on storage media removable from receiving apparatuses, and data to be shared was sent by exchanging storage media among plural persons or via a network.

SUMMARY OF THE INVENTION

The present invention is intended to solve the above-mentioned problems. In other words, the present invention is intended to automatically accumulate data conforming to the taste of a person and to automatically accumulate data for plural persons simultaneously.

In addition, the present invention is intended to judge the personal taste of a user depending on daily living environments and to automatically accumulate data conforming to the personal taste at a certain time in the case when data transmitted by a transmitting apparatus is accumulated by automatic storage means on the basis of the judgment on the personal taste of a user.

Furthermore, the present invention is intended to automatically accumulate and share data among plural persons by carrying out judgment on the taste of a group formed of plural persons.

Still further, the present invention is intended to automatically accumulate data conforming to the dynamic taste of a group formed of plural persons.

Still further, the present invention is intended to accumulate data by a specific request from a person and to transmit the data from the transmitting apparatus so that the data is automatically accumulated and shared among plural persons constituting a group.

The present invention provides a transmitting apparatus for transmitting a storage identifier for identifying a storage medium and data.

Still further, the present invention provides a receiving apparatus comprising a receiving section for receiving a storage (or accumulation) identifier for identifying a storage medium and data, and a storage control section for accumulating the data received by the receiving section on the storage medium identified by the storage identifier received by the receiving section.

In accordance with the above-mentioned invention, the receiving apparatus receives the storage identifier and the data transmitted from the transmitting apparatus. When the storage identifier and the data are transmitted so as to correspond to each other, the data received can be accumulated on the storage (or accumulation) medium identified by the received storage (or accumulation) identifier. Even if the correspondence relation between the storage identifier and the data is unknown at the time of the reception, the received data can be accumulated on the storage medium identified by the received storage identifier on the basis of the correspondence relation specified in the receiving apparatus by an appropriate method. Hence, data that may be used, can be accumulated automatically on a storage medium that may use the data.

It is sufficient that the storage identifier can only identify one or two or more storage media on which data should be accumulated, and the storage identifier can identify, for example, the kind (type) of storage medium (tape, hard disk, etc.), the inherent number (production number, etc.) of the storage medium, the installation place of the storage medium, etc.

The storage control section may perform operation for accumulating data on a storage medium by itself, or may control other devices, apparatuses, etc. so that data is accumulated on a storage medium.

Furthermore, the present invention provides a receiving apparatus comprising a receiving section for receiving data and a data identifier for identifying the data, a storage control information storage section for storing (or keeping) one or more pieces of storage control information having a storage identifier for identifying a storage medium and the data identifier as a pair, a storage identifier acquisition section for acquiring the storage identifier paired with the data identifier received by the above-mentioned receiving section from the above-mentioned storage control information storage section, and a storage control section for accumulating the data received by the above-mentioned receiving section on the storage medium identified by the storage identifier acquired by the above-mentioned storage identifier acquisition section.

In accordance with the above-mentioned invention, after receiving the data and the data identifier, the receiving apparatus acquires accumulated information from the data identifier which has been received on the basis of the storage control information. The received data is then accumulated on the storage medium identified by the acquired storage identifier. Hence, data that may be used can be accumulated automatically on a storage medium that may use the data.

The storage control information storage section may be a temporary memory (RAM, register, etc.) or a permanent memory, such as a ROM.

The present invention provides a transmitting apparatus for transmitting a storage (or accumulation) identifier for identifying a storage medium, a receiving apparatus identifier for identifying a receiving apparatus, and data.

Furthermore, in accordance with the present invention, the receiving apparatus identified by the receiving apparatus identifier can accumulate the received data on the storage medium identified by the received storage identifier when the receiving apparatus identifier is received. In other words, the transmitting apparatus can transmit data after specifying which storage medium of which receiving apparatus is used for data storage.

The present invention provides a receiving apparatus comprising a receiving section for receiving a storage identifier, a first receiving apparatus identifier and data, a receiving apparatus identifier storage section for storing (or keeping) a second receiving apparatus identifier, a receiving apparatus identifier acquisition section for acquiring the above-mentioned second receiving apparatus identifier, a judgment (or determination) section for judging as to whether the first receiving apparatus identifier received by the above-mentioned receiving section and the second receiving apparatus identifier acquired by the above-mentioned receiving apparatus identifier acquisition section have a certain relation therebetween, and a storage control section for accumulating the data received by the above-mentioned receiving section on the storage medium identified by the storage identifier received by the above-mentioned receiving section when the judgment result at the above-mentioned judgment section is that "there is a certain relation."

Furthermore, in the present invention, when the received first receiving apparatus identifier and the second receiving apparatus identifier for identifying the receiving apparatus itself have a certain relation therebetween, the receiving apparatus accumulates received data. The certain relation is a relation wherein one or two or more receiving apparatuses identified by the first receiving apparatus identifier include the second receiving apparatus identifier for identifying the receiving apparatus itself. In other words, the certain relation is not limited to a relation wherein the first receiving apparatus identifier completely coincides with the second receiving apparatus identifier. For example, in a case wherein the second receiving apparatus identifier has eight bytes, in which the first four bytes are used as a region identifier for specifying a region and the last four bytes are allocated only to the receiving apparatus, when the first receiving apparatus identifier is information for specifying only the region identifier formed of the first four bytes, if the first receiving apparatus identifier coincide with the first four bytes of the second receiving apparatus identifier, it may be regarded as "a certain relation therebetween."

The receiving apparatus identifier storage section may store the second receiving apparatus identifier temporarily. Furthermore, it is not necessary that the number of the second receiving apparatus identifier is fixed to one for one receiving apparatus. For example, the second receiving apparatus identifier stored on the receiving apparatus identifier storage section may be changeable by interchanging IC cards or by temporarily storing (or memorizing) data. Still further, the second receiving apparatus identifier may be changed depending on the position (or location) where the receiving apparatus is put.

The present invention provides a management apparatus comprising an attribute information group storage section for storing (or keeping) an attribute information value group having one or more attribute information values which are values of attribute information used as information capable of having plural values, a data group storage section for storing (or keeping) plural pieces of data, a data acquisition regulation storage section for storing (or keeping) a data acquisition regulation which is a regulation for acquiring data wherein one or more attribute information values are used as parameters, and a data acquisition section for acquiring one or more pieces of data from the above-mentioned data group storage section with respect to the one or more attribute information values stored (or kept) on the above-mentioned attribute information group storage section, on the basis of the data acquisition regulation stored (or kept) on the above-mentioned data acquisition regulation storage section.

Furthermore, in the present invention, an attribute information value group is accumulated on the attribute information group storage section by an appropriate method. The attribute information value group may be accumulated temporarily, or the attribute information values may be changeable. The data acquisition regulation is a function wherein the attribute information values are parameters, for example. Alternatively, the data acquisition regulation may be information wherein correspondences are established between the attribute information values used as parameters and data in a table. In this case, the table functions as a data group storage section. Furthermore, when the data acquisition regulation is given as a function wherein the attribute information values are parameters, and when the function can have a finite number of values (data), the function functions as a data group storage section. Still further, the data group storage section may be a temporary memory, such as a RAM or a register, or a permanent memory, such as a ROM or a DVD-ROM. All the storage sections in accordance with the present invention are similar to the data group storage section. In other words, all the storage sections in accordance with the present invention may be a temporary memory, such as a RAM or a register, or may be a permanent memory, such as a ROM or a DVD-ROM.

The management apparatus in accordance with the present invention further comprises an attribute information receiving section for receiving one or more attribute information values used as information capable of having plural values, and an attribute information recording section for recording one or more attribute information values received by the above-mentioned attribute information receiving section in the above-mentioned attribute information group storage section.

The management apparatus in accordance with the present invention further comprises a data transmitting section for transmitting one or more pieces of data acquired by the above-mentioned data acquisition section.

In the management apparatus in accordance with the present invention, the above-mentioned attribute information receiving section also receives a terminal identifier, and the above-mentioned data transmitting section also transmits the above-mentioned terminal identifier.

The present invention provides a broadcasting apparatus comprising a data receiving section for receiving one or more pieces of data transmitted by the data transmitting section in the management apparatus, a terminal identifier storage section for storing (or keeping) a terminal identifier for identifying a terminal, a terminal identifier acquisition section for acquiring the terminal identifier stored (or kept) on the above-mentioned terminal identifier storage section, and a data broadcasting section for broadcasting the one or more pieces of data received by the above-mentioned data receiving section and the terminal identifier acquired (or gained) by the above-mentioned terminal identifier acquisition section.

Furthermore, the broadcasting apparatus in accordance with the present invention broadcasts data determined on the basis of an attribute information value from a terminal and broadcasts the terminal identifier for identifying the terminal, whereby the terminal can selectively receive the data. Broadcasting is to transmit information to an indefinite number of persons. Furthermore, the broadcasting apparatus may convert the terminal identifier data received from the data acquisition apparatus into an appropriate form and may broadcast them. For example, a signal corresponding to the received terminal identifier may be added to a content signal corresponding to the received data, and then transmitted.

The present invention provides a broadcasting apparatus comprising a data receiving section for receiving a terminal identifier and one or more pieces of data transmitted by the data transmitting section in the management apparatus, a terminal identifier storage section for storing (or keeping) the terminal identifier received by the above-mentioned data receiving section, a terminal identifier acquisition section for acquiring the terminal identifier stored (or kept) on the above-mentioned terminal identifier storage section, and a data broadcasting section for broadcasting the one or more pieces of data received by the above-mentioned data receiving section and the terminal identifier acquired by the above-mentioned terminal identifier acquisition section.

The broadcasting apparatus in accordance with the present invention further comprises a group terminal storage section for storing (or keeping) one or more pieces of group terminal information having one terminal identifier and other one or more terminal identifiers as a pair, and a group terminal acquisition section for acquiring one or more terminal identifiers paired with the terminal identifier broadcast by the above-mentioned data broadcasting section from the above-mentioned group terminal storage section, wherein the above-mentioned data broadcasting section also broadcasts the one or more terminal identifiers acquired by the above-mentioned group terminal acquisition section.

In accordance with the present invention, the terminals belonging to a group can receive the same data.

The present invention provides a management apparatus comprising a terminal attribute information value group storage section for storing two or more terminal attribute information value groups wherein an attribute information value group and a terminal identifier are used as a pair, a data group storage section for storing (or keeping) plural pieces of data, a data acquisition regulation storage section for storing (or keeping) a data acquisition regulation which is a regulation for acquiring data wherein one or more pieces of attribute information are used as parameters, and a data acquisition section for acquiring one or more pieces of data from the above-mentioned data group storage section by using attribute information values constituting plural attribute information value groups included in two or more terminal attribute information value groups stored (or kept) on the above-mentioned terminal attribute information value group storage section, on the basis of the above-mentioned data acquisition regulation.

Furthermore, in the present invention, in a case when plural persons use one terminal for example, a terminal identifier may be allocated to each person who uses the terminal.

The management apparatus in accordance with the present invention further comprises a terminal attribute information value group receiving section for receiving two or more terminal attribute information value groups, and a terminal attribute information value group recording section for recording two or more terminal attribute information value groups received by the above-mentioned terminal attribute information value group receiving section in the above-mentioned terminal attribute information value group storage section.

The management apparatus in accordance with the present invention further comprises a data transmitting section for transmitting one or more pieces of data acquired by the above-mentioned data acquisition section.

The management apparatus in accordance with the present invention further comprises a data transmitting section for transmitting one or more pieces of data acquired by the above-mentioned data acquisition section, wherein the above-mentioned data transmitting section also transmits two or more terminal identifiers included in two or more terminal attribute information value groups received by the above-mentioned terminal attribute information value group receiving section.

The present invention provides a broadcasting apparatus wherein the data transmitting section in the management apparatus comprises a data receiving section for receiving one or more pieces of data having been transmitted and two or more terminal identifiers having been transmitted, and a data broadcasting section for broadcasting the one or more pieces of data received by the above-mentioned data receiving section and the two or more terminal identifiers received thereby.

The present invention provides a data storage (accumulation) method wherein in a case when one receiving apparatus receives and accumulates data, other receiving apparatuses automatically receive and accumulate the broadcast of the same data.

The present invention provides a receiving apparatus comprising a data receiving section for receiving data and data identification information (for example, channel numbers, times, program names) which is information for identifying the data, a data storage (accumulation) section for accumulating the data, a stored (accumulated) data identification information storage section for storing (or keeping) the data identification information which is information for identifying the data accumulated in the above-mentioned data storage section, a data storage (accumulation) control section for giving an instruction of accumulating the data received by the above-mentioned data receiving section on the above-mentioned data storage section on the basis of the data identification information stored (or kept) on the above-mentioned stored data identification information storage section, and a data identification information transmitting section for transmitting the data identification information stored (or kept) on the above-mentioned accumulated data identification information storage section.

Furthermore, in the present invention, the receiving apparatus accumulates (or writes) the data identified by the data identification information stored (or kept) on the accumulated data identification information storage section on the data storage section. Since the data identification information stored (or kept) on the accumulated data identification information storage section is transmitted by the data identification information transmitting section, it is possible to transmit (directly or indirectly) the kind of data accumulated by the receiving apparatus to any other receiving apparatus. Hence, data can be stored in cooperation among plural receiving apparatuses. For example, plural receiving apparatuses can accumulate the same data, or reversely, data to be accumulated can be prevented from being accumulated on other transmitting apparatuses, or can be deleted if stored (or kept). In the transmission of the data identification information by the data identification information transmission section, the cooperation among the receiving apparatuses can be attained easily before data is accumulated by the data storage section; however, the cooperation is not limited to this, but may be done after data storage (or accumulation).

The receiving apparatus in accordance with the present invention further comprises a receiving apparatus identifier storage section for storing (or keeping) a receiving apparatus identifier for identifying the receiving apparatus, and a receiving apparatus identifier acquisition section for acquiring the receiving apparatus identifier stored (or kept) on the above-mentioned receiving apparatus identifier storage section, wherein the above-mentioned data identification information transmitting section also transmits the receiving apparatus identifier acquired by the above-mentioned receiving apparatus identifier acquisition section.

Since the receiving apparatus in accordance with the present invention also transmits the receiving apparatus identifier for identifying the receiving apparatus in addition to the data identification information, any other receiving apparatus can recognize which receiving apparatus accumulates which data. Hence, it is easy for any other receiving apparatus to selectively receive and use the data identification information from the receiving apparatuses in cooperation (or association).

The receiving apparatus in accordance with the present invention further comprises a transmission destination information storage section for accumulating one or more pieces of transmission destination information which is information indicating a transmission destination, and a transmission destination information acquisition section for acquiring one or more pieces of transmission destination information stored (or kept) on the above-mentioned transmission destination information storage section, wherein the above-mentioned data identification information transmitting section transmits data identification information to the transmission destination indicated by the transmission destination information acquired by the above-mentioned transmission destination information acquisition section.

Furthermore, in the present invention, a receiving apparatus can specify a transmission destination and can transmit data identification information (and a receiving apparatus identifier). Hence, in any other receiving apparatus, it is not necessary to make judgment as to whether data identification information is transmitted from a receiving apparatus used in cooperation or not, whereby the data identification information can be used easily.

The present invention provides a receiving apparatus comprising a data receiving section for receiving data and data identification information which is information for identifying the data, a data storage (accumulation) section for accumulating the data received by the above-mentioned data receiving section, and a data identification information transmitting section for transmitting the data identification information which is information for identifying the data accumulated in the above-mentioned data storage section. The data identification information corresponds to information including information indicating channel numbers, broadcasting times, program names, etc. for example. The data identification information may be anything, provided that it is information for identifying data, such as programs.

Furthermore, a receiving apparatus in accordance with the present invention can transmit what kind of data the receiving apparatus accumulates, to any other receiving apparatus. Hence, data can be accumulated in cooperation among plural receiving apparatuses.

The receiving apparatus in accordance with the present invention further comprises a receiving apparatus identifier storage section for storing (or keeping) a receiving apparatus identifier for identifying the receiving apparatus, and a receiving apparatus identifier acquisition section for acquiring the receiving apparatus identifier stored (or kept) on the above-mentioned receiving apparatus identifier storage section, wherein the above-mentioned data identification information transmitting section also transmits the receiving apparatus identifier acquired by the above-mentioned receiving apparatus identifier acquisition section.

Furthermore, since the receiving apparatus in accordance with the present invention also transmits the receiving apparatus identifier for identifying the receiving apparatus in addition to the data identification information, any other receiving apparatus can recognize which receiving apparatus accumulates which data. Hence, it is easy for any other receiving apparatus to selectively receive and use the data identification information from the receiving apparatus(es) used in association.

The receiving apparatus in accordance with the present invention further comprises a transmission destination information storage section for storing (or keeping) one or more pieces of transmission destination information, and a transmission destination information acquisition section for acquiring the one or more pieces of transmission destination information stored (or kept) on the above-mentioned transmission destination information storage section, wherein the above-mentioned data identification information transmitting section transmits data identification information to the transmission destination indicated by the transmission destination information acquired by the above-mentioned transmission destination information acquisition section.

Furthermore, in the present invention, a receiving apparatus can specify a transmission destination and can transmit data identification information (and a receiving apparatus identifier). Hence, in any other receiving apparatus, it is not necessary to make judgment as to whether data identification information is transmitted from a receiving apparatus used in association or not, whereby the data identification information can be used easily.

The present invention provides an output apparatus comprising a receiving section for receiving a receiving apparatus identifier transmitted from a receiving apparatus and data identification information transmitted therefrom, a group receiving apparatus information storage section for storing (or keeping) one or more pieces of group receiving apparatus information having one receiving apparatus identifier and other one or more receiving apparatus identifiers as a pair, a group receiving apparatus identifier acquisition section for acquiring one or more receiving apparatus identifiers paired with the receiving apparatus identifier received by the above-mentioned receiving apparatus, from the aforementioned group receiving apparatus information storage section, and an output section for outputting one or more receiving apparatus identifiers acquired by the above-mentioned group receiving apparatus identifier acquisition section.

Furthermore, the output apparatus in accordance with the present invention extracts other receiving apparatuses (or another receiving apparatus) grouped with one receiving apparatus identified by the received receiving apparatus identifier, on the basis of the group receiving apparatus information, and it outputs the receiving apparatus identifier(s) for identifying the extracted other receiving apparatuses (or another receiving apparatus). Since the output apparatus manages (or administers) the group relation among the receiving apparatuses, the receiving apparatus(es) do not require judgment as to group relation. Hence, the construction of the receiving apparatuses can be simplified The output section can output the receiving apparatus identifier in various forms. For example, the receiving apparatus identifier may be recorded on a recording medium. Alternatively, the receiving apparatus identifier may be transmitted to only a specific target (for example, a broadcasting station or the receiving apparatus identified by the receiving identifier) or to target(s) other than the specific target. The receiving apparatus identifier may be output without specifying any output destination. In other words, the output has a concept including recording on a recording medium, display on a screen, printing to a printer, transmission via a wired or wireless network.

In the broadcasting apparatus in accordance with the present invention, the above-mentioned output section also outputs data identification information received by the above-mentioned receiving section.

In accordance with the present invention, data commonly used among the receiving apparatuses can be easily recognized by any other receiving apparatus.

In the output apparatus in accordance with the present invention, the above-mentioned output section outputs one or more receiving apparatus identifiers and the data identified by the data identification information received by the above-mentioned receiving section in relation to each other.

The receiving apparatus in accordance with the present invention can make recognition as to whether received data is to be accumulated one other receiving apparatuses (or another receiving apparatus) in a group or not. Hence, the receiving apparatuses in the group can accumulate data in cooperation (or association). For example, when data received by any other receiving apparatus is accumulated, a receiving apparatus different from the receiving apparatus can accumulate the data, or, reversely, can withhold storage (or accumulation) to prevent overlapped storage in the group.

The present invention provides a receiving apparatus comprising a data receiving section for receiving data and data identification information (for example, channel numbers, times, program names) which is information for identifying the data, a data output section for outputting the data received by the above-mentioned data receiving section, and a data identification information transmitting section for transmitting the data identification information (the data identification information received by the data receiving section) which is information for identifying the data when the data is output by the above-mentioned data output section.

In accordance with the present invention, when received data is output (for example, when seen, when heard or when printed), the receiving apparatus transmits data identification information for identifying the data. Hence, the fact that the receiving apparatus has outputted data can be transmitted to any other apparatus except the receiving apparatus. By using this, cooperation (or association) among the receiving apparatuses can be realized, and any additional data can be transmitted, for example.

The receiving apparatus in accordance with the present invention further comprises a receiving apparatus identifier storage section for storing (keeping) a receiving apparatus identifier for identifying the receiving apparatus, and a receiving apparatus identifier acquisition section for acquiring the receiving apparatus identifier stored (or kept) on the above-mentioned receiving apparatus identifier storage section, wherein the above-mentioned data identification information transmitting section also transmits the receiving apparatus identifier acquired by the above-mentioned receiving apparatus identifier acquisition section.

In the present invention, since a receiving apparatus identifier for identifying a receiving apparatus that has outputted data is also transmitted, the receiving apparatus that has outputted the data can be specified, whereby cooperation (or association) among the receiving apparatuses, additional data transmission, etc. can be attained easily.

The receiving apparatus in accordance with the present invention further comprises a transmission destination information storage section for storing one or more pieces of transmission destination information which is information indicating a transmission destination, and a transmission destination information acquisition section for acquiring one or more pieces of transmission destination information stored (or kept) on the above-mentioned transmission destination information storage section, wherein the above-mentioned data identification information transmitting section transmits data identification information to the transmission destination indicated by the transmission destination information acquired by the above-mentioned transmission destination information acquisition section.

In accordance with the present invention, a receiving apparatus can specify a transmission destination and can transmit data identification information (and a receiving apparatus identifier). Hence, in any other receiving apparatus, it is not necessary to make judgment as to whether data identification information is transmitted from a receiving apparatus used in cooperation (or association) or not, whereby the data identification information can be used easily.

The present invention provides an output apparatus comprising a receiving section for receiving a receiving apparatus identifier and data identification information transmitted from a receiving apparatus, a group receiving apparatus information storage section for storing (keeping) one or more pieces of group receiving apparatus information having one receiving apparatus identifier and other one or more receiving apparatus identifiers as a pair, a group receiving apparatus identifier acquisition section for acquiring the one or more receiving apparatus identifiers paired with the receiving apparatus identifier received by the above-mentioned receiving apparatus from the above-mentioned group receiving apparatus information storage section, and an output section for outputting the one or more receiving apparatus identifiers acquired by the above-mentioned group receiving apparatus identifier acquisition section.

The output apparatus in accordance with the present invention also outputs the data identification information received by the above-mentioned receiving section.

In the output apparatus in accordance with the present invention, the above-mentioned broadcasting section outputs one or more receiving apparatus identifiers and the data identified by the data identification information received by the above-mentioned receiving section in relation to each other.

BRIEF DESCRIPTION OF THE DRAWINGS

These and other objects and features of the present invention will become clear from the following description taken in conjunction with the preferred embodiments thereof with reference to the accompanying drawings.

FIG. 3 is a view showing content kind numbers (content sort numbers);

FIG. 6 is a view showing a receiving apparatus control information table;

FIG. 7 is a view showing a modification of the receiving apparatus control information table shown in FIG. 6;

FIG. 13 is a view showing a accumulation medium identification table;

FIG. 26 is a view showing a receiving apparatus identification number table;

FIG. 27 is a view showing a personal fixed interest degree data table;

FIG. 28 is a view showing a modification of the personal fixed interest degree data table shown in FIG. 27;

FIG. 29 is a view showing a personal interest degree index data table;

FIG. 33 is a view showing a personal interest degree threshold value data table;

FIG. 34 is a view showing a transmission content kind number (or sort number);

FIG. 38 is a view showing a terminal identification number table;

FIG. 39 is a view showing terminal identification numbers and usage periods in a user control table;

FIG. 40 is a view showing a personal fixed interest degree data table;

FIG. 41 is a view showing a modification of the personal fixed interest degree data table shown in FIG. 40;

FIG. 42 is a view showing a personal accumulation content kind number table;

FIG. 43 is a view showing a group management data table;

FIG. 44 is a view showing a group fixed interest degree data table;

FIG. 46 is a view showing a group accumulation content kind number table;

FIG. 48 is a view showing a personal interest degree depending on common indexes;

FIG. 49 is a view showing a personal interest degree data table;

FIG. 50 is a view showing a group interest degree data table;

FIG. 52 is a view showing a personal interest degree threshold value;

FIG. 53 is a view showing a group interest degree threshold value;

Figure 54:
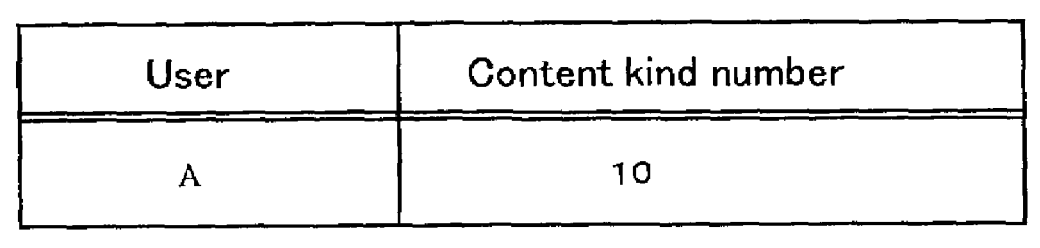

FIG. 54 is a view showing a personal accumulation content kind data table;

FIG. 55 is a view showing a group storage content kind data table;

DETAILED DESCRIPTION OF THE PREFERRED EMBODIMENTS

Figure 1:
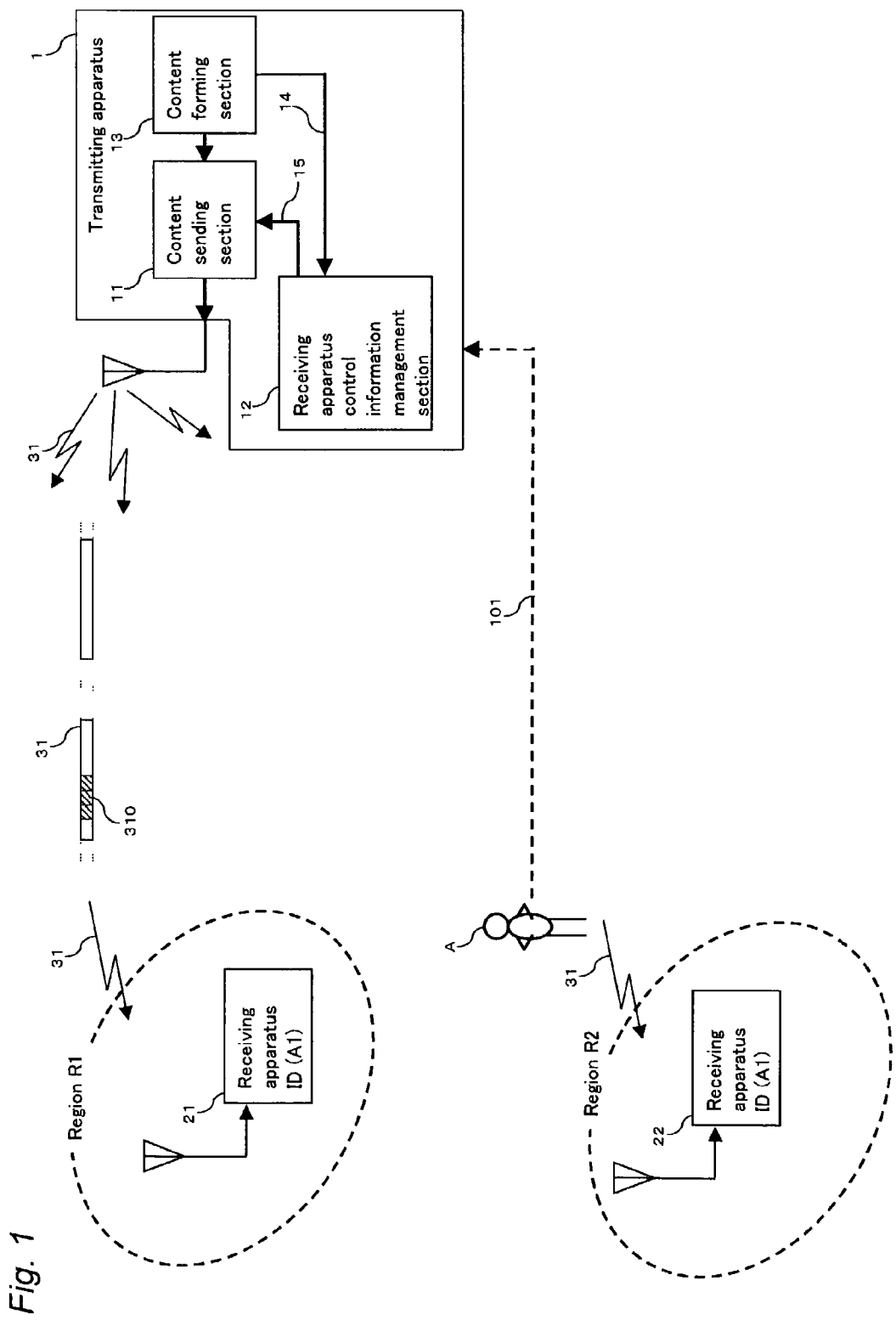
FIG. 1 is a view showing a basic construction in accordance with a first embodiment of the present invention.

Before the description of the preferred embodiments according to the present invention proceeds, it is to be noted that like or corresponding parts are designated by like reference numerals throughout the accompanying drawings.

Embodiments of the present invention will be described below referring to the drawings.

First Embodiment

First, a first embodiment will be described by using FIG. 1 to FIG. 20. FIG. 1 is a view showing a basic construction of a transmitting and receiving system in accordance with this embodiment of the present invention. First, the principle of the transmitting and receiving system of the present invention will be described referring to FIG. 1. The transmitting and receiving system of FIG. 1 comprises a transmitting apparatus 1, a receiving apparatus 21 installed in a home or office in a region designated by a region R1 and obtained by division as a minimum administrative district unit, and a similar receiving apparatus 22 in a region designated by a region R2. A receiving apparatus control information management section 12 is attached to the transmitting apparatus 1. Letter A designates a user of the receiving apparatus 21 and the receiving apparatus 22 installed in the region R1 and the region R2, respectively.

The regions R1 and R2 may be regions based on homes, school districts, commercial facilities, etc. or regions based on logical concepts, instead of regions based on the administrative district unit. Furthermore, the regions R1 and R2 may be the same region or may be different regions.

The transmitting apparatus 1 sends a broadcast stream 31 with receiving apparatus control information. For example, the transmitting apparatus 1 sends a broadcast stream that uses an MPEG2 transport stream used in a current digital satellite broadcast. The transmitting apparatus 1 sends the broadcast stream 31, thereby transmitting contents to the receiving apparatus 21 and the receiving apparatus 22.

Although an example by using wireless broadcasting is described as an example of data transmission, data transmission by using a wired network or the like may be used. Furthermore, although contents are taken as an example of data to be sent, any data, such as simple character information, may be taken.

The broadcast stream 31 is, for example, a broadcast stream into which a conditional access packet 310 including information for controlling the receiving apparatuses is inserted. This broadcast stream is a broadcast stream that uses an MPEG2 transport stream, and this broadcast stream is a broadcast stream into which the conditional access packet 310 having a unique packet identification number can be inserted in addition to section information, such as video and audio elementary packets and electronic program guide.

The conditional access packet 310 has a system identification number for each application so as to be able to be used for various applications. The construction of the conditional access packet 310 conforms to the specifications stipulated according to the system identification number. The conditional access packet 310 is formed on the basis of information registered in the receiving apparatus control information management section 12 of the receiving apparatus 1 and is inserted into the broadcast stream 31.

The receiving apparatus control information management section 12 is a management section for managing information sent from existing communication means 101 (a telephone, FAX, etc.) to the transmitting apparatus 1 by the user A who uses a plurality of receiving apparatuses. The receiving apparatus control information management section 12 is realized by a recording medium, such as a hard disk or a DVD-RAM.

The receiving apparatus 21 and the receiving apparatus 22 are identified by receiving apparatus identification numbers. The transmitting apparatus 1 manages the receiving apparatus identification numbers. The receiving apparatus control information management section 12 stores information sent from the receiving apparatus 21 and the receiving apparatus 22 in a management table or the like according to the receiving apparatus identification numbers of the receiving apparatus 21 and the receiving apparatus 22. By the receiving apparatus control information management section 12, contents designated by the user A or contents conforming to the content kind designated by the user A are accumulated (or written) simultaneously and automatically on receiving apparatus(es) designated by the user A. Hence, it is possible to realize service wherein contents are shared by the receiving apparatus 21 and the receiving apparatus 22 installed in the region R1 and the region R2 physically distant from each other.

The above-mentioned receiving apparatus identification numbers have the same meanings as receiving apparatus identifiers. The receiving apparatus identification numbers may be those used to identify the receiving apparatuses according to not only numerals but also other information, such as alphabetic characters. This applies to the following descriptions in a similar way.

The above-mentioned contents have the same meanings as data. This applies to the following descriptions in a similar way. The kinds of contents are concepts included in data identifiers. This applies to the following descriptions in a similar way. The data identifiers are used to identify data and used to identify not only the kinds of data but also individual pieces of data.

The broadcast stream 31 into which the conditional access packet 310 including information for controlling the receiving apparatuses is inserted, is sent from the transmitting apparatus 1, reaches the region R1 and the region R2, and is received by the receiving apparatus 21 installed in the region R1 and used by the user A and the receiving apparatus 22 installed in the region R2 and used by the user A. The receiving apparatuses 21 and 22 have receiving apparatus identification numbers ID (A1) and ID (A2), respectively.

In the receiving apparatuses 21 and 22, a decoder capable of decoding the broadcast stream 31 to be received operates at all times. The receiving apparatuses 21 and 22 retrieves and extracts the conditional access packet 310 from packets to be decoded sequentially. The extracted conditional access packet is decoded, and the packet 310 having the system identification number including information for controlling the receiving apparatuses is taken out.

Next, the receiving apparatus 21 extracts the conditional access packet conforming to the receiving apparatus identification number ID (A1) allocated to itself. In addition, the receiving apparatus 22 extracts the conditional access packet 310 conforming to the receiving apparatus identification number ID (A2) allocated to itself. The receiving apparatuses 21 and 22 finally decode and decipher information for controlling the receiving apparatus included in the extracted conditional access packet 310. On the basis of the result of the decipherment, the contents designated by the information for controlling the receiving apparatuses can be recorded automatically on kinds of storage (or accumulation) media designated by the receiving apparatuses 21 and 22 among the storage media managed by the receiving apparatuses 21 and 22. The timings when the contents are recorded automatically by the two receiving apparatuses may be almost simultaneous or different. The information indicating the kind of storage medium, included in the conditional access packet, is an example of a storage (or accumulation) identifier.

The kind of the storage medium is designated by an identifier for identifying the storage medium. More specifically, the storage (or accumulation) medium identifier is managed by the transmitting apparatus. Then, in the transmitting apparatus, the storage medium identifier is added to the information for controlling the receiving apparatus, thereby forming the conditional access packet 310. Then, in the transmitting apparatus, the conditional access packet 310 is inserted into the broadcast stream 31. By the above-mentioned operations, it is possible to designate the kind of storage medium.

Furthermore, the storage identifier may identify not only the type of storage medium but also each individual of storage medium.

The details of each of the above-mentioned apparatuses will be described below. The receiving apparatus 1 of FIG. 1 has a content forming section 13 for forming contents and a content sending section 11 for transmitting the contents, as basic construction sections, and is provided with the receiving apparatus control information management section 12 therebetween.

Figure 2:
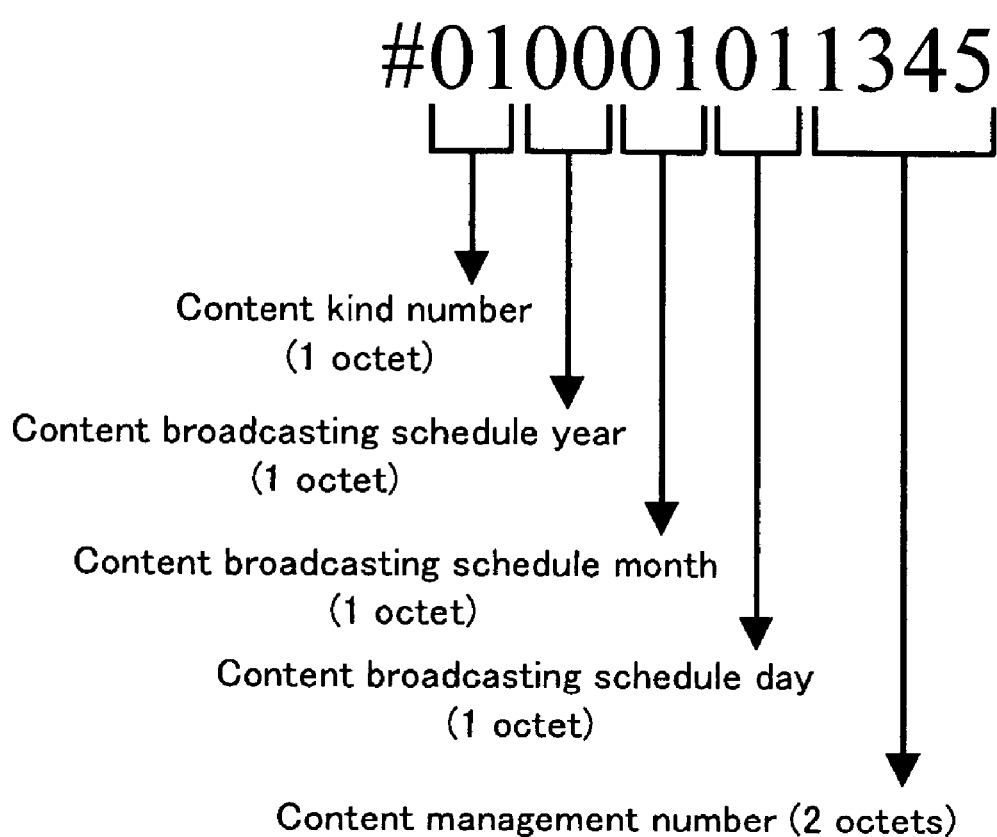
FIG. 2 is a view showing the specifications of content numbers.

The receiving apparatus control information management section 12 receives a content forming information signal 14 from the content forming section 13, and finally sends a descriptor signal 15 including the information for controlling the receiving apparatuses to the content sending section 11. The content forming section 13 generates content numbers daily for all contents to be formed so as to be transmitted and assigns the numbers to the contents. The content numbers are generated by obtaining date/time information from a timer (not shown, provided in the content forming section). FIG. 2 shows an example of specifications of a content number. The above-mentioned content number is an example of the above-mentioned data identifier.

A content number is formed of six octets. The two low-order octets designate management numbers sequentially assigned to contents to be transmitted in a day. The next three octets designate date information. Hence, the content number is a number unique to each content. The head one octet of the content number is a content kind number. The content kind number is a number for classifying contents to be transmitted. FIG. 3 shows the classification of contents and numbers assigned to the respective kinds.

Figure 4:
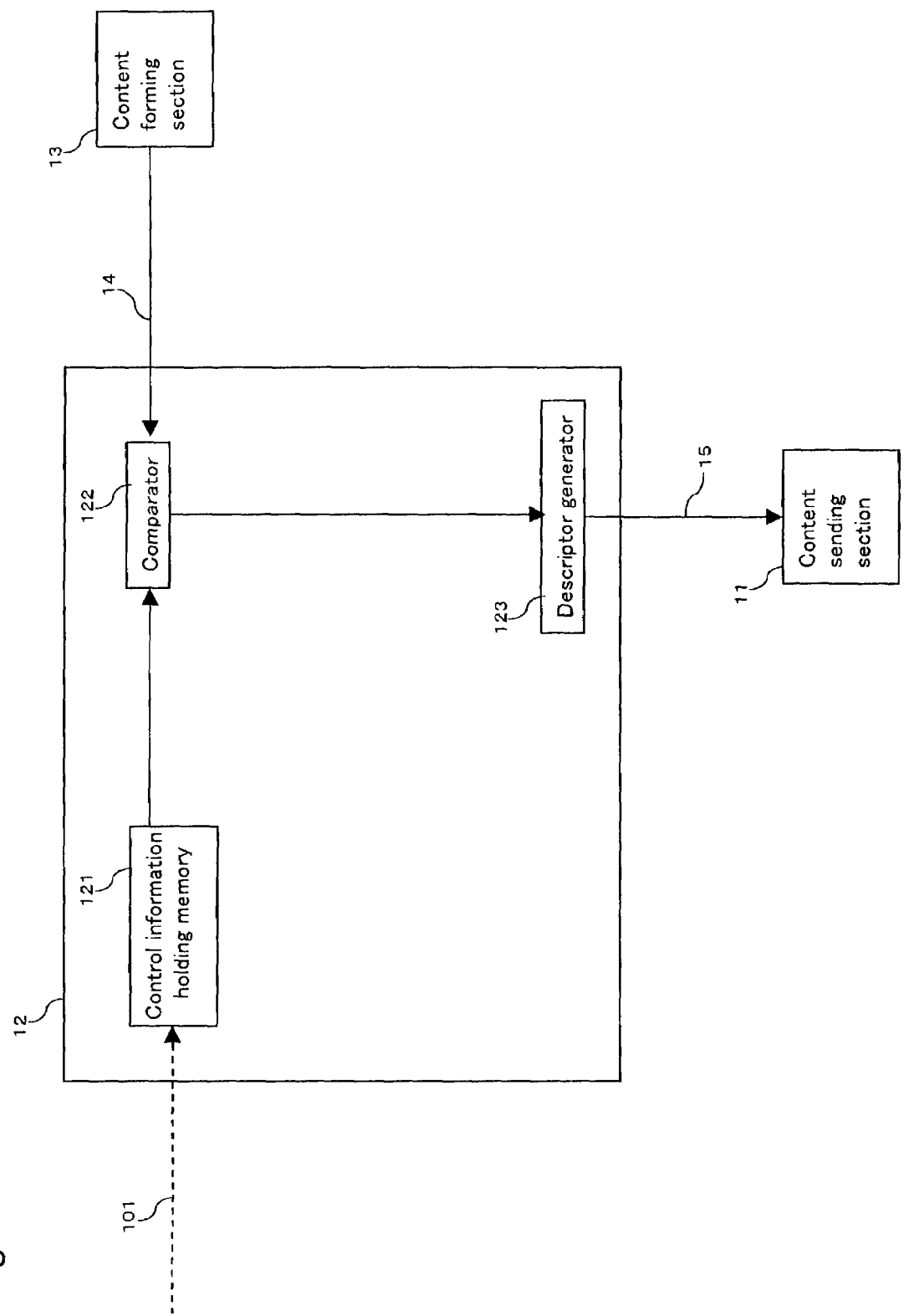
FIG. 4 is a view showing the construction of a receiving apparatus control information management section.

FIG. 4 shows a construction of the receiving apparatus control information management section 12. The receiving apparatus control information management section 12 comprises a control information holding memory 121, a comparator 122 and a descriptor generator 123. The control information holding memory 121 accumulates the receiving apparatus control information table shown in FIG. 6. The receiving apparatus control information table has the names of users who use service for automatically accumulating (or writing) contents to be transmitted in a plurality of receiving apparatuses, the identification numbers of the receiving apparatuses to be designated and used by the users, usage periods, content numbers desired to be accumulated automatically or content kind numbers.

Figure 5:
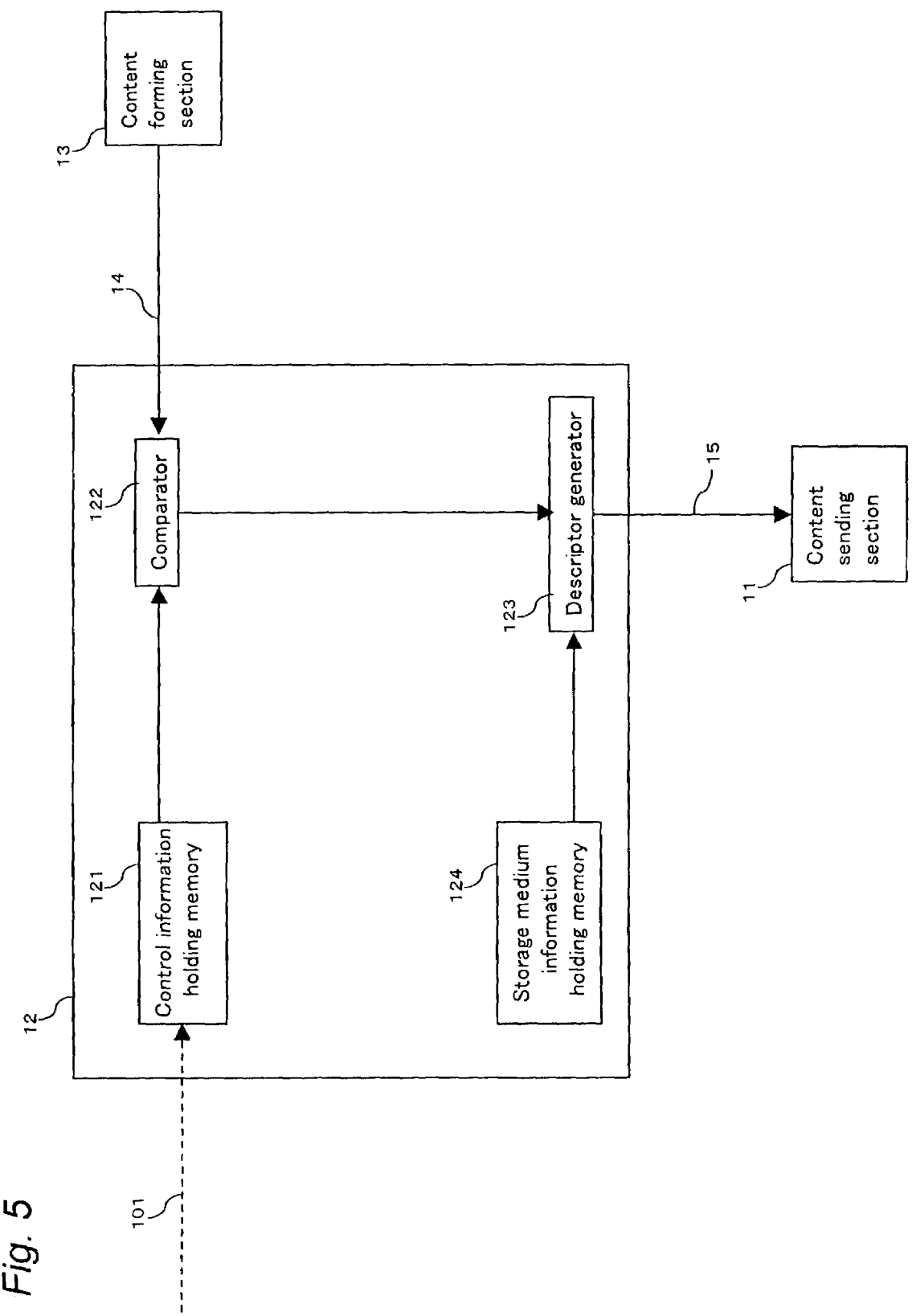
FIG. 5 is a view showing the construction of a modification of the receiving apparatus control information management section shown in FIG. 4.

When the identifier for identifying a storage medium is managed on the side of the transmitting apparatus, and when a storage medium corresponding to the kind of content or content number is determined on the transmission side so as to control the receiving apparatuses, a storage medium information holding memory 124 is provided additionally as shown in FIG. 5. The storage medium information holding memory 124 holds the content kind number representing the kind of each content and a storage identifier as a pair as shown in FIG. 13. Furthermore, a table wherein a content number and a storage identifier are held as a pair may also be used.

The user A asks the manager of the transmitting apparatus 1 shown in FIG. 1 to register user information by using existing communication means, such as a telephone, facsimile, CATV or wireless communication. The manager of the transmitting apparatus 1 registers the user information in the receiving apparatus control information table by making additions or modifications in the receiving apparatus control information table accumulated on the control information holding memory 121. For example, the user A sends, for example, the name of the user A, the identification numbers of a plurality of receiving apparatuses to be used by the user A and to be serviced, i.e., of the receiving apparatus 21 and the receiving apparatus 22, the period of the service, the number of a content desired to be accumulated automatically or a content kind number to the manager of the transmitting apparatus 1.

Furthermore, when the registration is realized by managing the identifier for identifying a storage medium, by delivering the identifier to the descriptor generator 123 and by inserting the identifier into the broadcast stream 31, the storage identifier designated by the user A is corresponded to each content kind number or each content number and is registered as user information in the receiving apparatus control information table as shown in FIG. 7.

Figure 14:
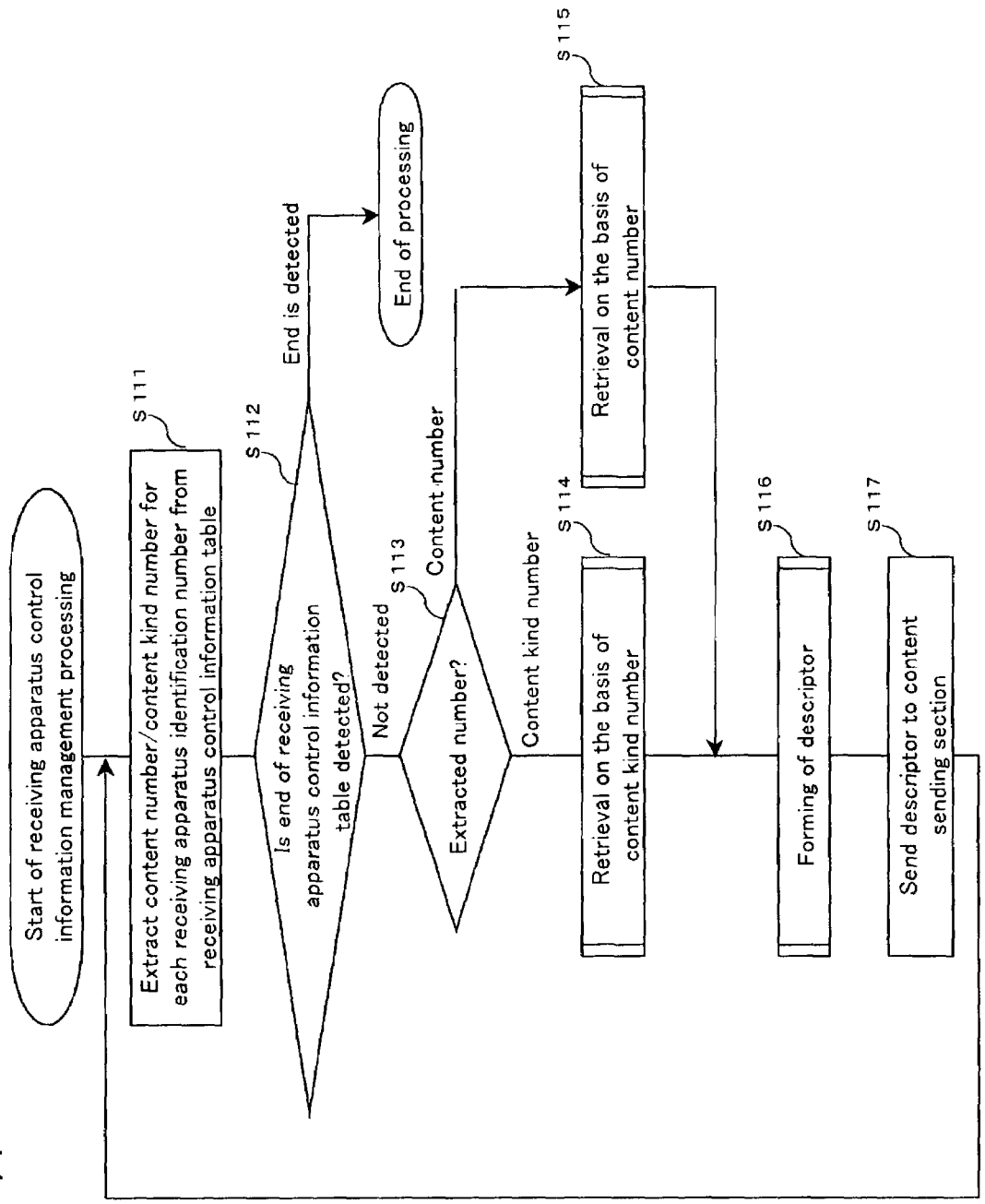
FIG. 14 is a view showing a procedure (or step) for receiving apparatus control information management processing.

An information generating procedure for controlling the receiving apparatus by using the receiving apparatus control information management section 12 of FIG. 4 will be described by using the flowcharts shown in FIG. 14 to FIG. 18. In the flowchart of FIG. 14, at step S111, the comparator 122 acquires the identification number of the receiving apparatus and the content number or content kind number corresponding thereto from the receiving apparatus control information table on the control information holding memory 121. At step S113, discrimination is made between the content number and the content kind number. At step S115, when the acquired number is the content number, the content corresponding thereto is retrieved from the content group formed by the content forming section 13 on the basis of the content number. At step S114, when the acquired number is the content kind number, the content including the content kind number corresponding thereto is retrieved from the content group formed by the content forming section 13 on the basis of the content kind number. Next, at step S116, the content number of the content obtained by retrieval and the receiving apparatus identification number of the receiving apparatus for accumulating (or writing) the content are sent to the descriptor generator 123. The descriptor generator 123 forms a descriptor from the content number and the receiving apparatus identification number. At step S117, the descriptor is sent to the content sending section 11. The above-mentioned processing is repeated until the end of the receiving apparatus control information table accumulated (or written) on the control information holding memory 121 is detected (at step S112).

Furthermore, when a storage (or accumulation) identifier for designating a storage (or accumulation) medium is also transmitted together with the descriptor, the storage identifier may be designated by the user and determined by the above-mentioned communication means, or may be input on the side of the transmitting apparatus as necessary.

When the user designates a storage medium, the descriptor generator 123 also acquires the storage identifier designated by the user by using the receiving apparatus control information table. The descriptor generator 123 adds the storage identifier to the content number and the receiving apparatus identification number to form a descriptor, and sends the descriptor to the content sending section 11.

The above-mentioned storage identifier is a piece of information constituting the user information to be sent by the above-mentioned communication means.

When a storage medium is designated automatically on the transmission side, the descriptor generator 123 acquires each content kind number or the storage identifier corresponding to a content number from the table on the storage medium information holding memory 124 of FIG. 5 to form a descriptor, and sends the descriptor to the content sending section 11.

The content sending section 11 encodes the contents sent from the content forming section 13 and the descriptor sent from the receiving apparatus control information management section 12 into an MPEG2 transport stream and sends it out as the broadcast stream 31 shown in FIG. 1.

Figure 15:
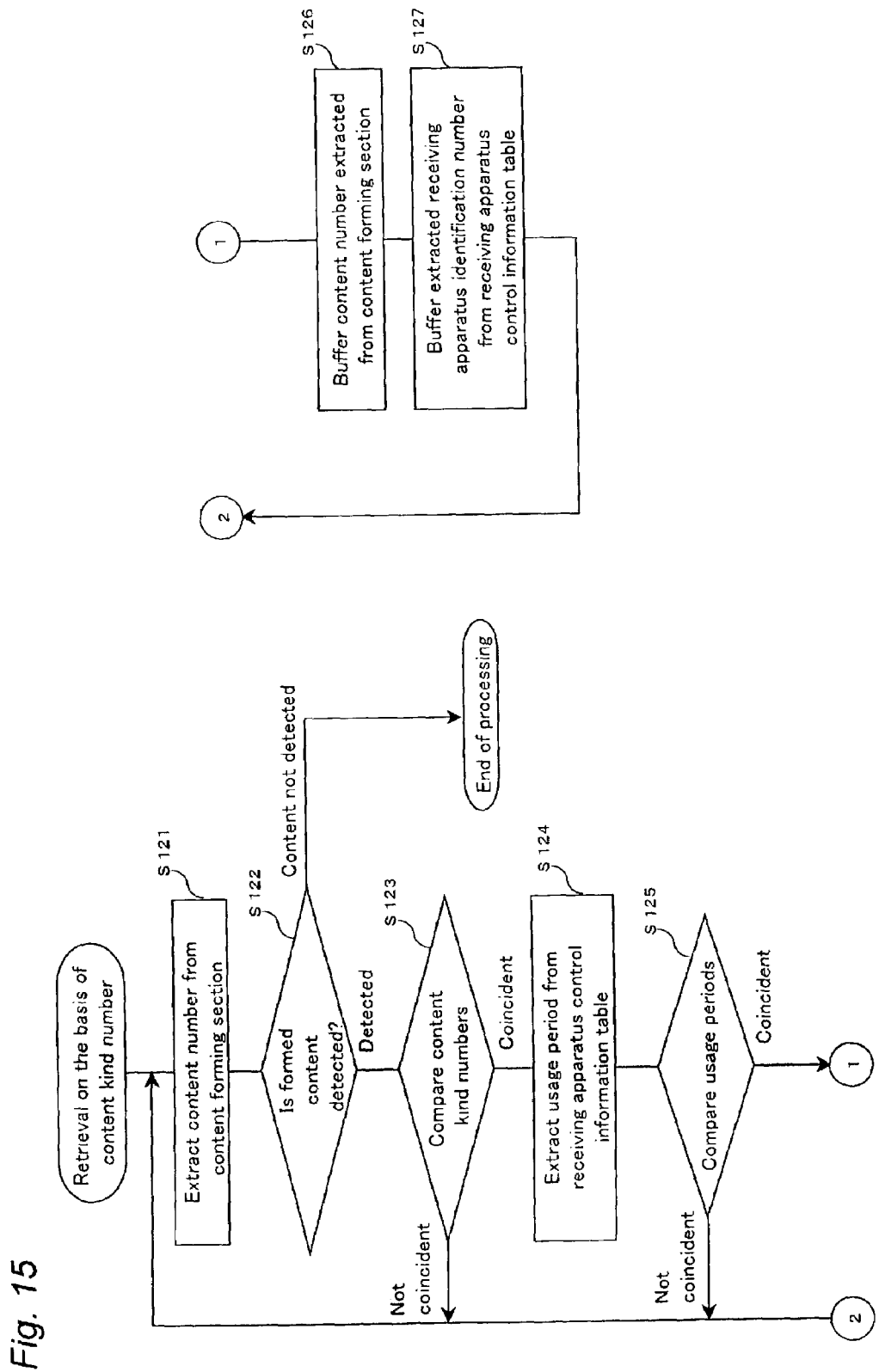
FIG. 15 is a view showing a procedure for retrieval processing depending on content kind number.
Figure 16:
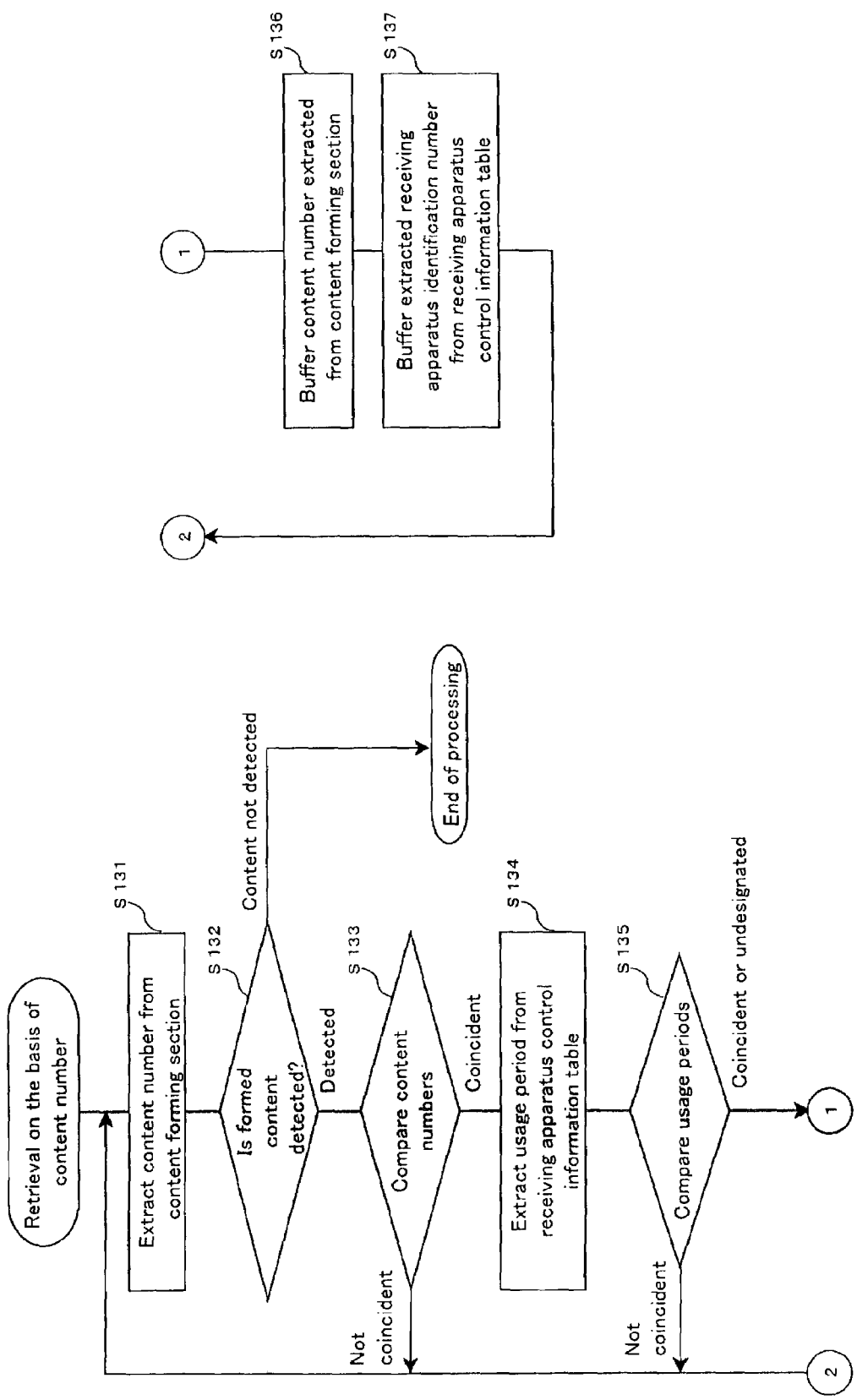
FIG. 16 is a view showing a procedure for retrieval processing depending on content number.

Next, retrieval processing on the basis of a content kind number and retrieval processing on the basis of a content number will be described by using the flowcharts of FIG. 15 and FIG. 16. At step S121 or S131, the comparator 122 sequentially acquires the content numbers of formed contents from the content forming section 13. At step S123, the acquired content number is compared with the content number acquired from the receiving apparatus control information table on the control information holding memory 121. In the case of retrieval processing on the basis of the content kind number, only the content kind numbers are compared (at step S133).

In the case of a noncoincidence, a usage period is acquired from the receiving apparatus control information table on the control information holding memory 121 (at step S124 or S134), and the usage period is compared with the date information included in the content number (at step S125 or S135). In the case of coincidence in the usage periods, the content number and the receiving apparatus identification number are buffered (at steps S126 and S127 or steps S136 and S137).

Furthermore, when a storage medium is designated on the transmission side, a storage identifier is also acquired from the receiving apparatus control information table and is buffered at step S127 or S137.

Still further, when a storage medium is determined automatically on the sending side, each content kind number or the storage identifier corresponding to a content number is acquired from the table on the storage medium information holding memory 124 and buffered at step S127 or S137.

The above-mentioned processing is repeated until the end of the contents formed by the content forming section 13 is detected (at step S122 or S132).

Figure 8:
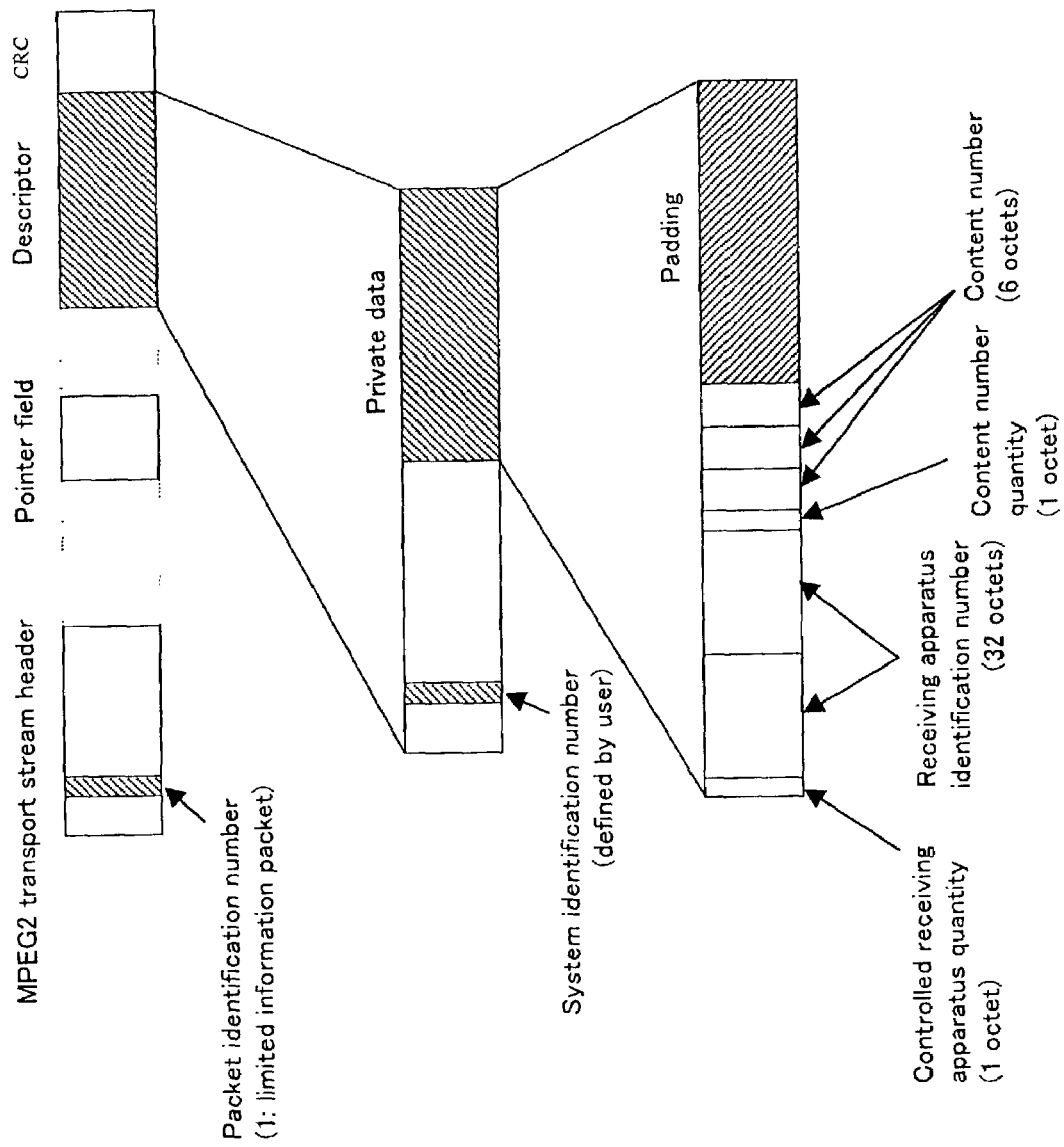
FIG. 8 is a view showing the specifications of a descriptor including receiving apparatus control information.

Next, the details of the descriptor generated by the descriptor generator 123 will be described by using FIG. 8. A descriptor is generated as a factor of the conditional access packet (packet identification number 1) of the MPEG2 transport stream to be generated. This descriptor has a unique system identification number and a private data field. This system identification number indicates that the descriptor is a control information descriptor for realizing service for automatically accumulating contents to be transmitted in a plurality of receiving apparatuses. The private data has one octet controlled receiving apparatus quantity region, and the identification numbers of receiving apparatuses to which contents are accumulated, corresponding to the quantity of the receiving apparatuses indicated in this region, are accumulated. Each of the receiving apparatus identification number is formed within 32 octets. One octet content number quantity region is accumulated immediately after the region wherein the receiving apparatus identification numbers are accumulated. Corresponding to the quantity (or number)

given in the content number quantity region, the content numbers of the contents to be accumulated automatically, are accumulated. The content number is formed of six octets.

Figure 9:
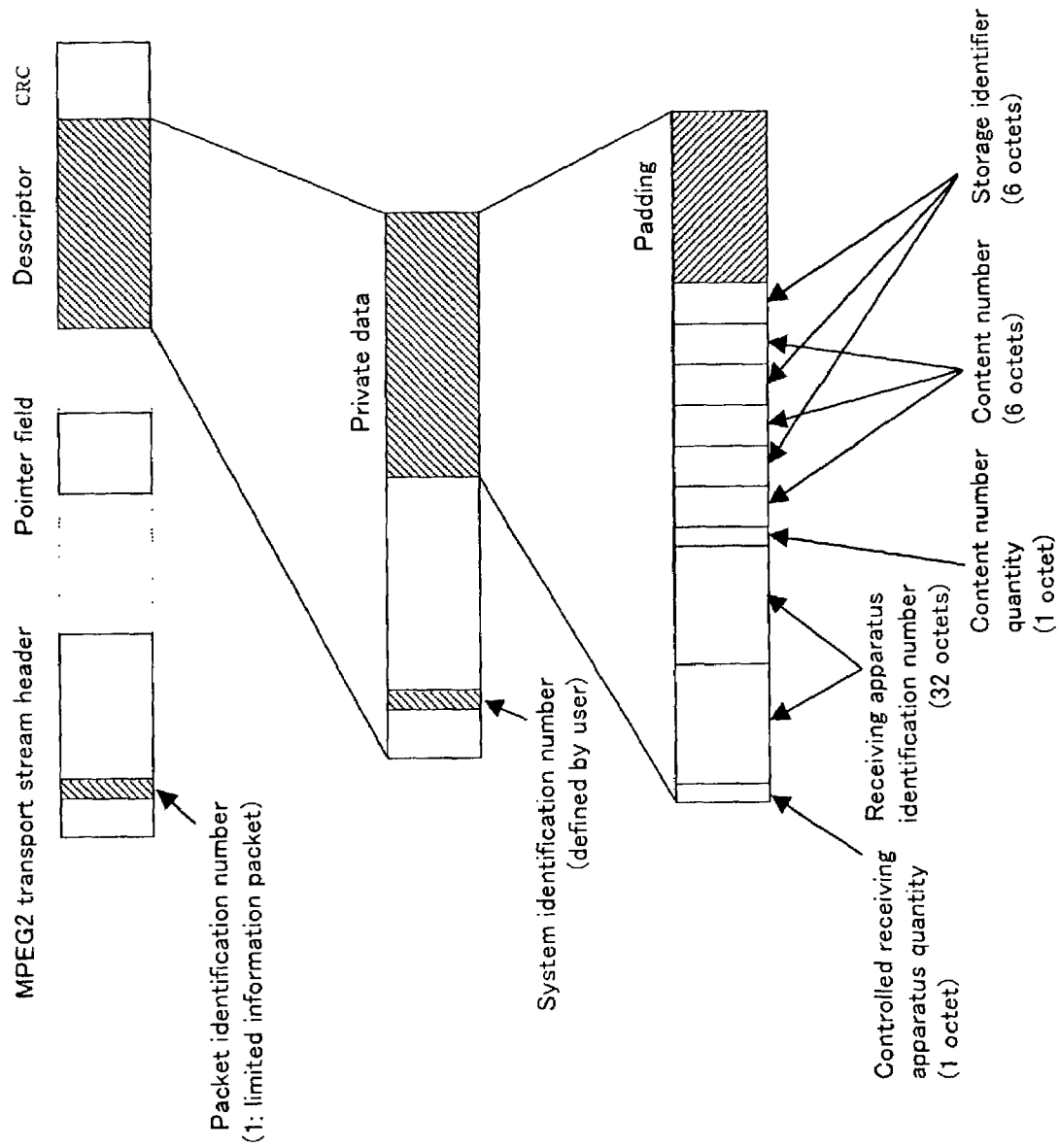
FIG. 9 is a view showing the specifications of a modification of the descriptor including receiving apparatus control information shown in FIG. 8.

Furthermore, when a storage medium is designated on the transmission side, storage identifiers are stored in regions next to the region wherein the content number is accumulated as shown in FIG. 9. The remaining portion of the private region is padded.

Figure 17:
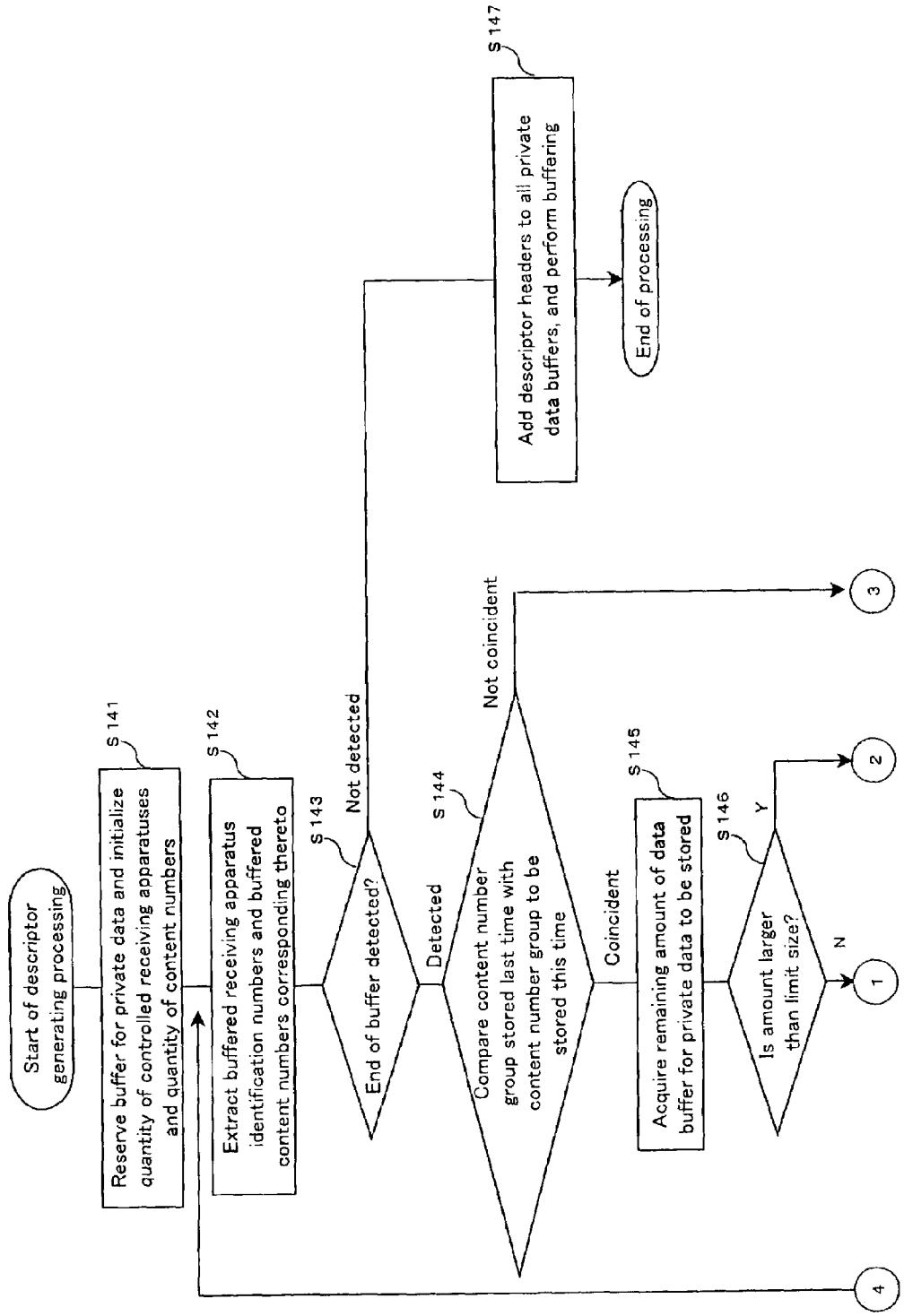
FIG. 17 is a view (first half) showing a procedure for descriptor generation processing.
Figure 18:
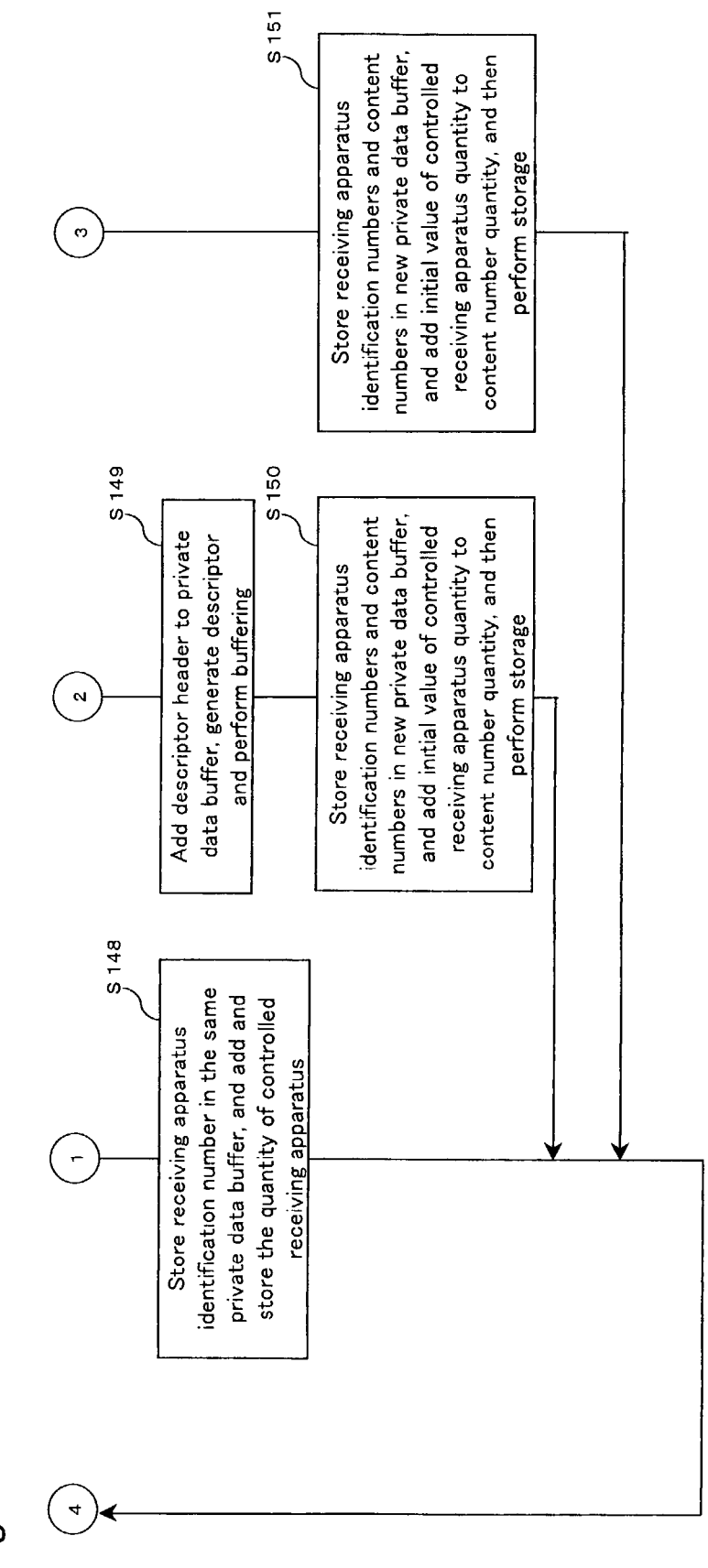
FIG. 18 is a view (latter half) showing a procedure for descriptor generation processing.
Figure 19:
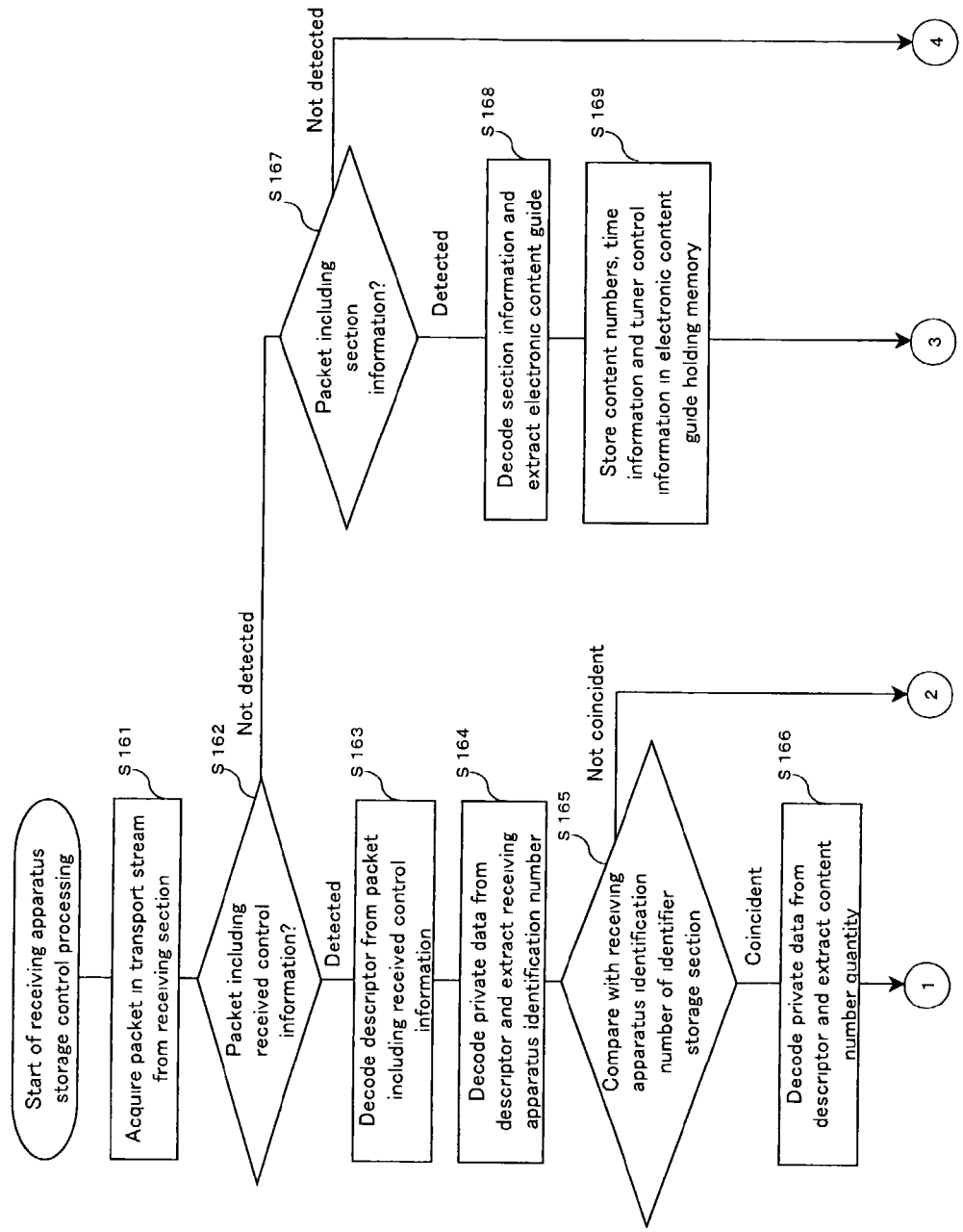
FIG. 19 is a view (first half) showing a procedure for receiving apparatus accumulation control processing.
Figure 20:
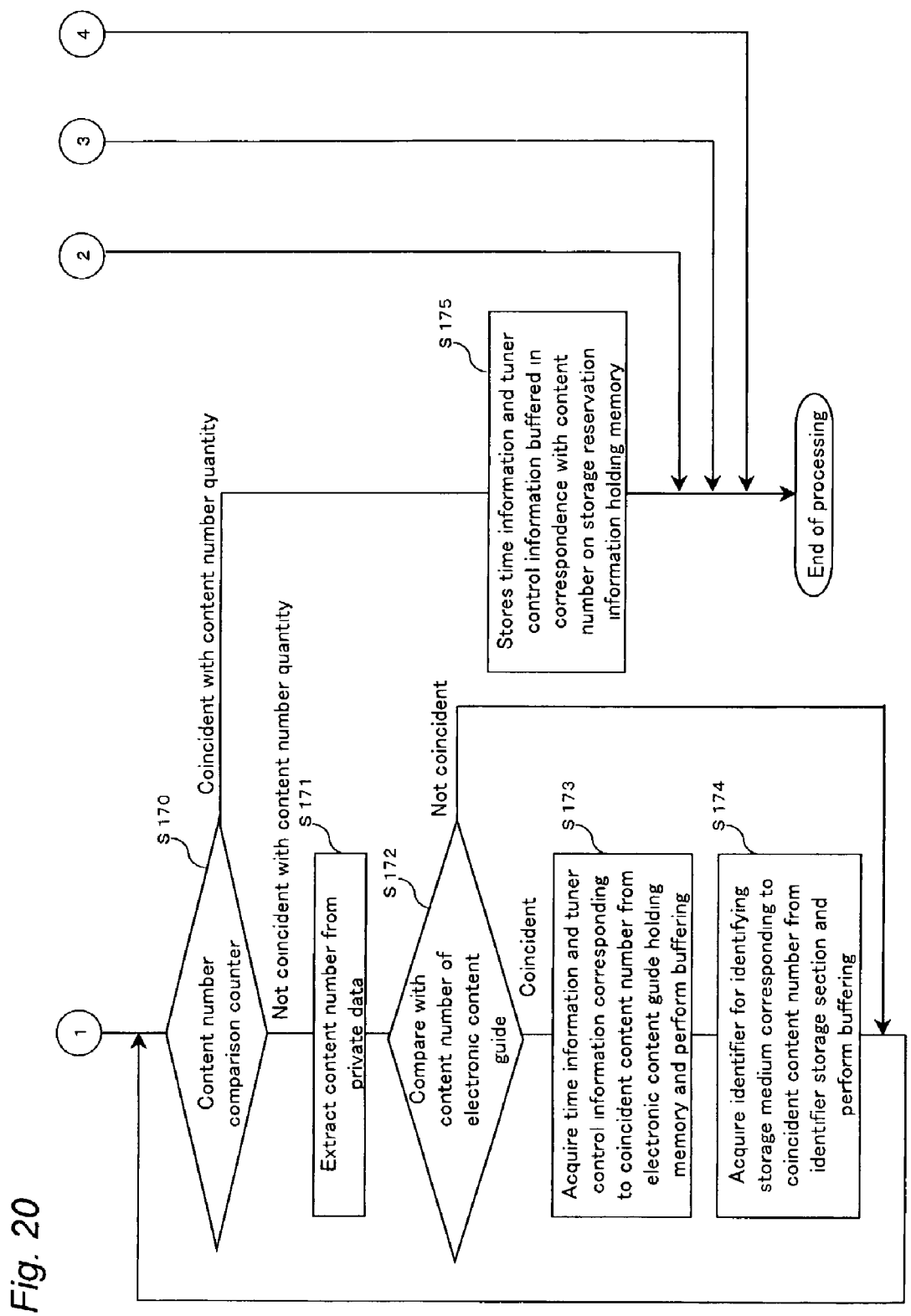
FIG. 20 is a view (latter half) showing a procedure for receiving apparatus accumulation control processing.

Descriptor generating processing will be described by using the flowcharts of FIGS. 17 and 18. At step S141, the descriptor generator 123 reserves a buffer for buffering private data and initializes a counter for counting the quantity (or number) of controlled receiving apparatuses and the quantity (or number) of content numbers. At step S142, the comparator 122 sequentially acquires the buffered receiving apparatus identification numbers and the content numbers corresponding thereto. Furthermore, when storage media are designated on the transmission side, storage identifiers are also acquired sequentially. At step S144, the content number group to be accumulated this time on the private data buffer is compared with the content number group having already been stored (or kept) on another private buffer.

When these number groups coincide with each other, the remaining amount of the corresponding private buffer is acquired (at step S145). At step S146, the acquired remaining amount of the buffer is judged. When the amount is less than its limit, a receiving apparatus identification number is additionally accumulated on the private buffer, the quantity is added to the counter for counting the quantity of the controlled receiving apparatuses and accumulated (at step S148). When the remaining amount of the buffer is insufficient, a descriptor header is added to the corresponding private data buffer to generate a descriptor, and the descriptor is buffered (step S149). Furthermore, at step S150, a new private data buffer is reserved, and the initial value of the quantity of the controlled receiving apparatuses, the receiving apparatus identification numbers, the quantity of content numbers matching to the content numbers to be accumulated and content numbers are accumulated.

Furthermore, when a storage medium is designated on the transmission side, a storage identifier is also extracted at step S142. Still further, at step S150, the storage identifier is stored for each content number.

When the content number group to be accumulated this time does not coincide with the content number group having already been stored (or kept) on another private buffer, a new private data buffer is reserved (or secured), and the initial value of the quantity of the controlled receiving apparatuses, the receiving apparatus identification numbers, the quantity of content numbers matching to the content numbers to be accumulated and content numbers are accumulated (at step S151). Still further, when a storage medium is designated on the transmission side, a storage identifier is stored for each content number. The above-mentioned processing is repeated until the end of the buffer accumulated on the comparator 122 is detected (at step S143). When the end of the buffer is detected, descriptor headers are added to all the private data buffers kept on the descriptor generator 123 to generate descriptors (at step S147).

The descriptor generator 123 sends the buffered descriptor to the content sending section 11 by using the descriptor signal 15 shown in FIG. 4. The content sending section 11 forms the received descriptor into the conditional access packet 310, and it is inserted into the broadcast stream 31.

Figure 10:
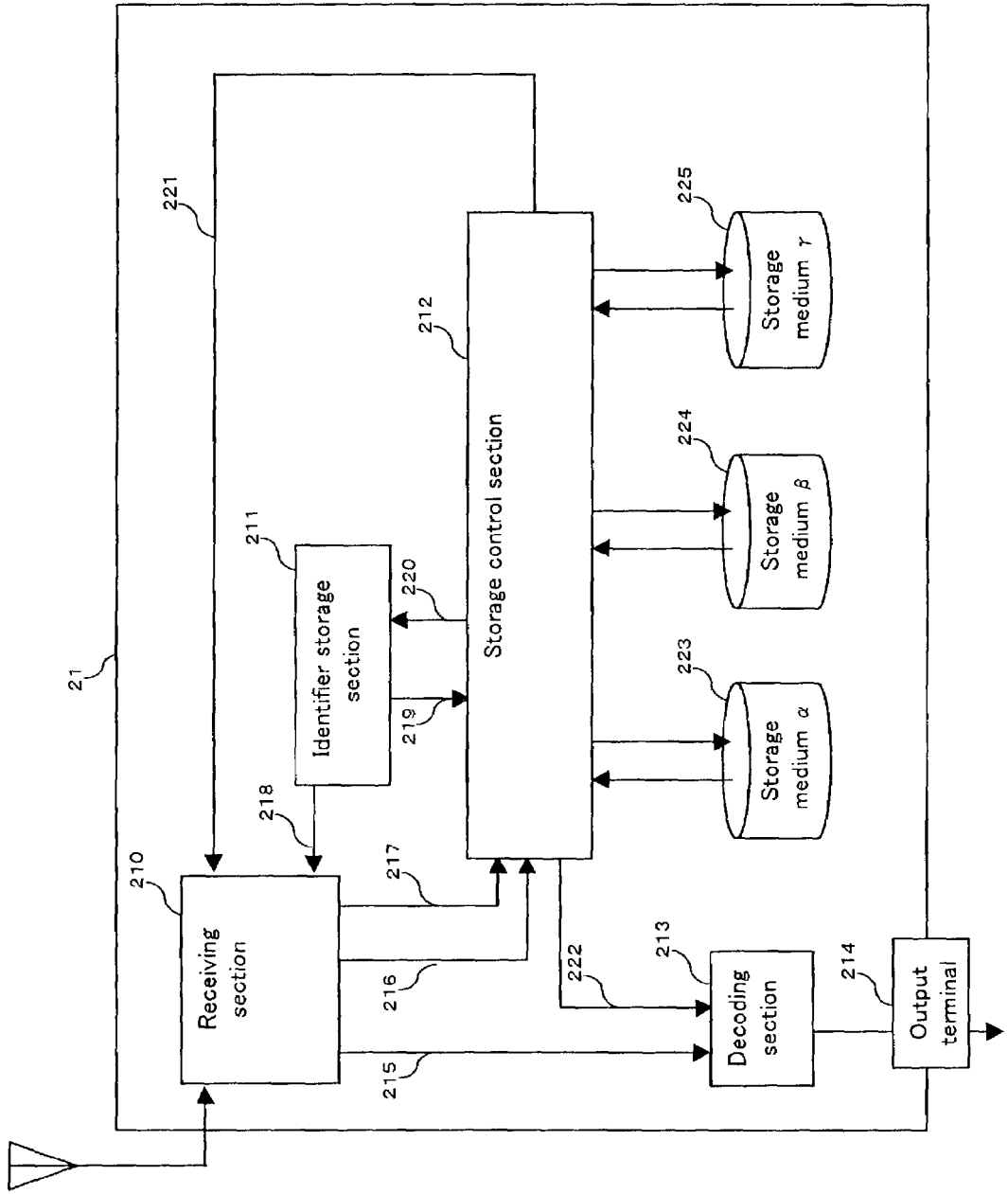
FIG. 10 is a view showing the basic construction of a receiving apparatus.

Next, the construction of the receiving apparatuses 21 and 22 for receiving the broadcast stream 31 is shown in FIG. 10. The receiving apparatus comprises a receiving section 210 capable of receiving the broadcast stream 31 at all times, a storage (or accumulation) control section 212 for carrying out control for accumulating contents on the basis of the receiving apparatus control information, plural kinds of storage media 223, 224 and 225 connected to the storage control section 212, an identifier storage section 211 for holding a storage medium selection table including storage identifiers for identifying receiving apparatus identification numbers, kinds of storage media and individual storage media, and a decoding section 213 for decoding a content sent from the receiving section 210 via a passage 215 and a content read from a storage medium and sent via a passage 222.

Figure 11:
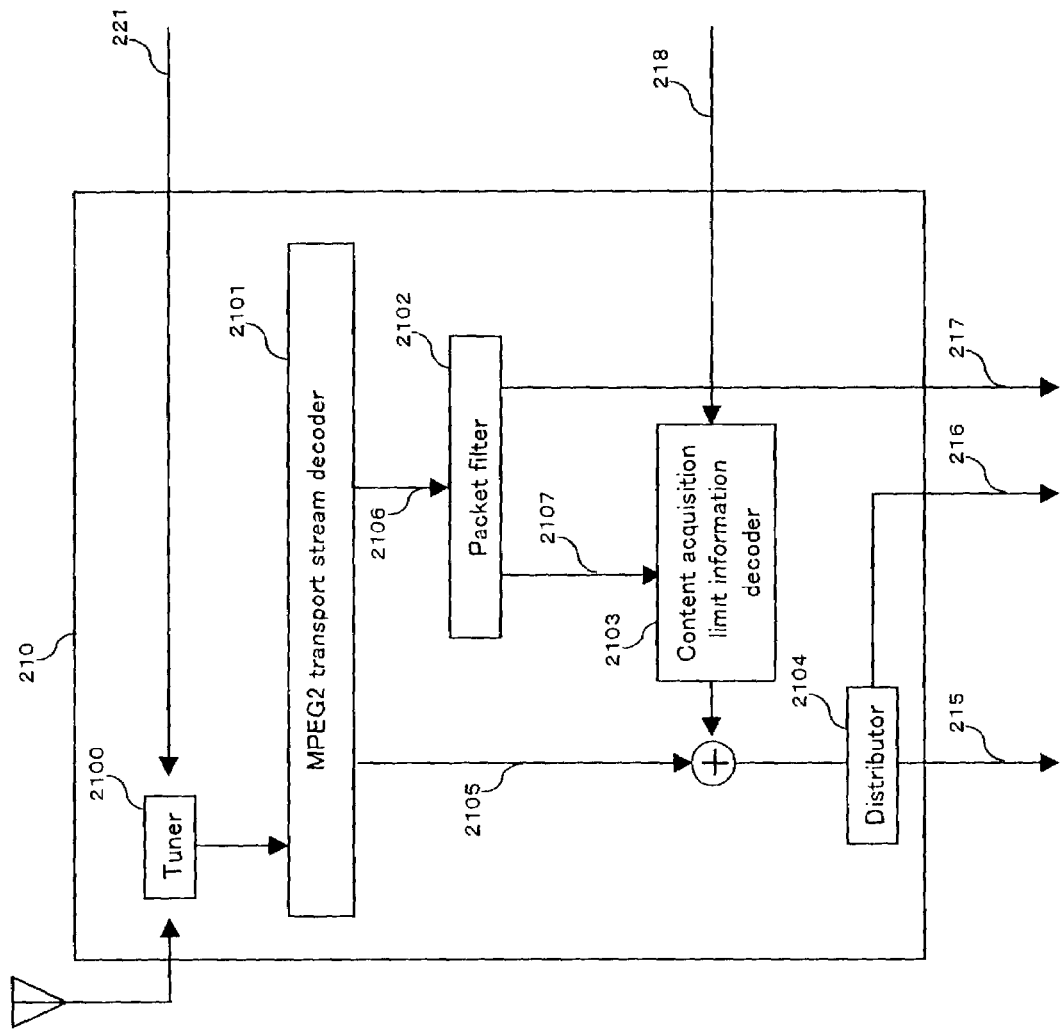
FIG. 11 is a view showing the construction of the receiving section of the receiving apparatus.

The details of the receiving section 210 is shown in FIG. 11. The receiving section 210 comprises a tuner 2100, an MPEG2 transport stream decoder 2101, a packet filter 2102, a content acquisition limit information packet decoder 2103 and a distributor 2104. The tuner 2100 receives the broadcast stream 31 and decodes it by using the MPEG2 transport stream decoder 2101. Among the decoded streams, the stream including contents is sent to a passage 2105 and other streams are sent to a passage 2106. The streams sent to the passage 2106 are filtered by the packet filter 2102. Only the packet including content acquisition limit information is filtered by the packet filter 2102, and decoded by the content acquisition limit information packet decoder 2103. Other packets are output to a passage 2117.

According to the result of the comparison between the decoded result of the content acquisition limit information packet and the limit information acquired from the passage 218, the output of the content stream sent to the passage 2105 is controlled. In the case of output, the content stream is distributed by the distributor 2104 and sent from the passage 215 to the decoder 213 and also sent from the passage 216 to the storage control section 212. The control of the tuner 2100 is possible by control by the user of the receiving apparatus and by control from the storage control section 212 via a passage 221.

Figure 12:
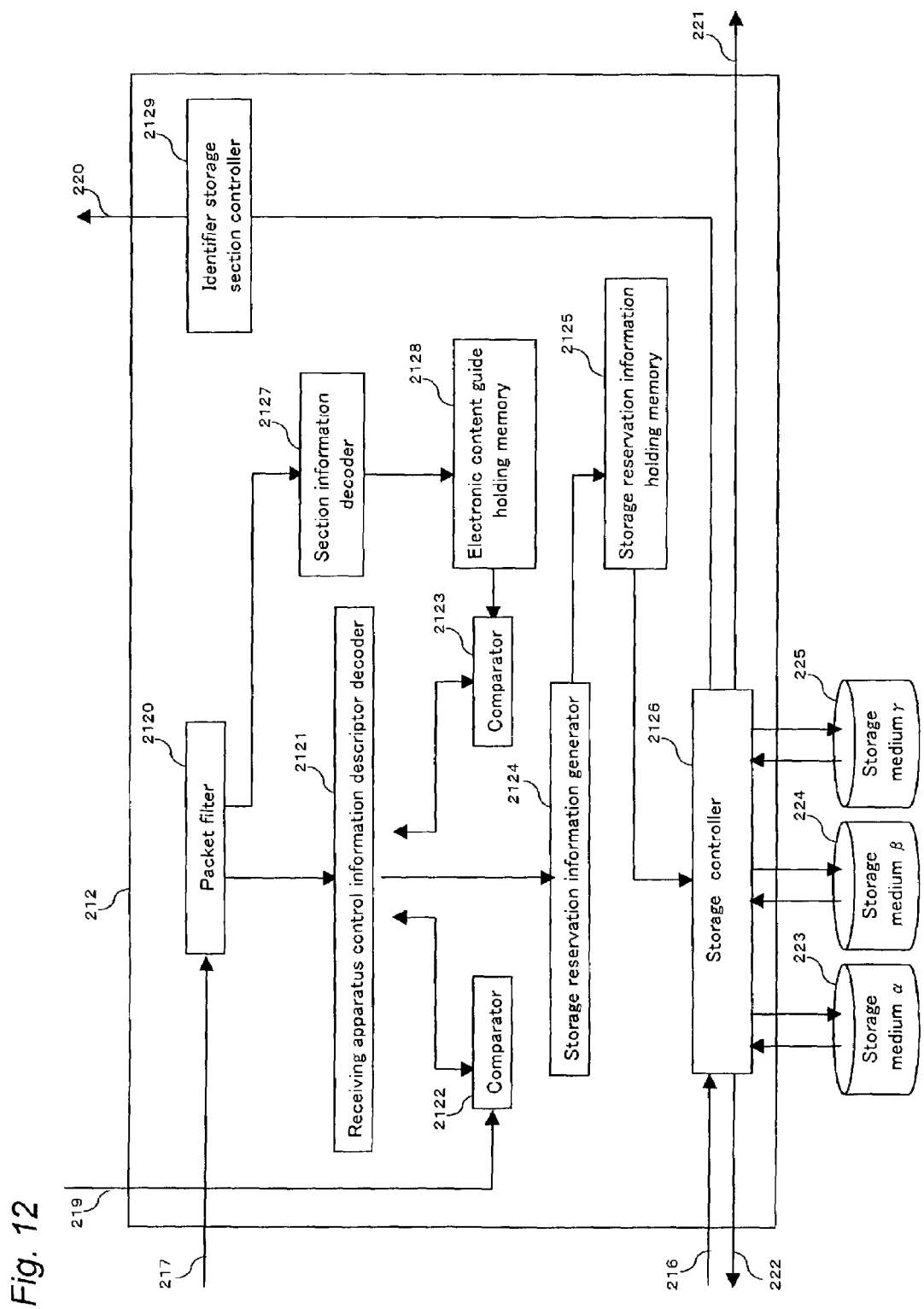
FIG. 12 is a view showing the construction of the accumulation control section of the receiving apparatus.

The construction of the storage control section 212 is shown in FIG. 12. Furthermore, receiving apparatus storage (or accumulation) control processing will be described by using the charts shown in FIGS. 19 and 20. A packet from the passage 217 is a packet output from the receiving section 210 and becomes the input to a packet filter 2120 (at step S161). When the packet filter 2120 detects a packet including section information (at steps S162 and S167), the packet is sent to a section information decoder 2127. The section information decoder 2127 extracts an electronic program guide from section information (at step S168). The electronic program guide includes content forming information, and this is used as a time standard for accumulating contents automatically. The content numbers, time information and tuner control information of all the formed and transmitted contents are acquired from the electronic program guide and stored on an electronic program guide holding memory 2128 (at step S169).

When the packet filter 2120 detects a packet including receiving apparatus control information (at step S162), the packet is sent to a receiving apparatus control information descriptor decoder 2121. The receiving apparatus control information descriptor decoder 2121 decodes the descriptor (at step S163). Furthermore, private data is decoded, and a receiving apparatus identification number to be controlled is extracted from the private data (at step S164). The acquired receiving apparatus identification number is sent to a comparator 2122. The comparator 2122 compares the receiving apparatus identification number acquired from the receiving apparatus control information descriptor decoder 2121 with the unique receiving apparatus identification number acquired from the identifier storage section 211 via a passage 219 (at step S165).

When the receiving apparatus identification numbers coincide with each other, the receiving apparatus control information descriptor decoder 2121 acquires a content number quantity and a content number from the decoded private data (at steps S166 and S171). The content number is then sent to the comparator 2123. The comparator 2123 compares the content number with all content numbers obtained from the electronic program guide stored on the electronic program guide holding memory 2128 (at step S172).

When a coincident content number is detected, the content time information and tuner control information corresponding thereto are acquired from the electronic program guide and sent to the receiving apparatus control information descriptor decoder 2121. The receiving apparatus control information descriptor decoder 2121 sends the content number again to the comparator 2122 to select a storage identifier. The comparator 2122 acquires a storage identifier corresponding to the kind of the content from the storage (or accumulation) medium identification table in the identifier storage section 211 shown in FIG. 13 and sends it to the receiving apparatus control information descriptor decoder 2121. The receiving apparatus control information descriptor decoder 2121 buffers the storage identifier acquired from the comparator 2122, the time information of the content to be accumulated which is acquired from the comparator 2123 and tuner control information (at steps S173 and S174). The above-mentioned processing is repeated until the content number quantity extracted from the private data is reached (at step S170).

When the content number quantity is reached, the storage identifier, time information and tuner control information buffered in the receiving apparatus control information descriptor decoder 2121 are stored (or kept) on a storage reservation information holding memory 2125 (at step S175). A storage controller 2126 monitors the storage reservation information holding memory 2125 by using a timer. When the time coincides with the time information stored (or kept) on the storage (or accumulation) reservation information holding memory 2125, tuner control information corresponding to the time information is obtained, and the tuner 2100 of the receiving section 210 is controlled via the passage 221. A content stream is then obtained from the receiving section 210 via the passage 216. The storage (or accumulation) controller 2126 accumulates the content stream on one of storage media designated by the storage identifier stored on the storage reservation information holding memory 2125.

On the basis of the storage medium identification table shown in FIG. 13, the storage controller 2126 recognizes the storage medium having been connected, determines the kind of the medium and sends the storage identifier to an identifier storage section controller 2129. The identifier storage section controller 2129 determines the storage medium corresponding to the kind of the content and forms a storage medium identification table in the identifier storage section 211 via the passage 220.

The identifier storage section 211 may include a storage control information storage section. Furthermore, the above-mentioned identifier storage section 211 may include a receiving apparatus identifier storage section.

The above-mentioned storage (or accumulation) control section 212 may include the function of a storage identifier acquisition section. Furthermore, the above-mentioned storage control section 212 may include the function of a receiving apparatus identifier acquisition section.

In this embodiment, although it is explained that the receiving apparatus identifier is a number unique to a receiving apparatus, the identifier is not limited to this, but may be an identifier for a plurality of receiving apparatuses. For example, the receiving apparatus identifier may be a region identifier for identifying a region in which a receiving apparatus is present. Means for identifying a receiving apparatus by using a region identifier is similar to the case of a receiving apparatus identification number in accordance with this embodiment.

Figure 21:
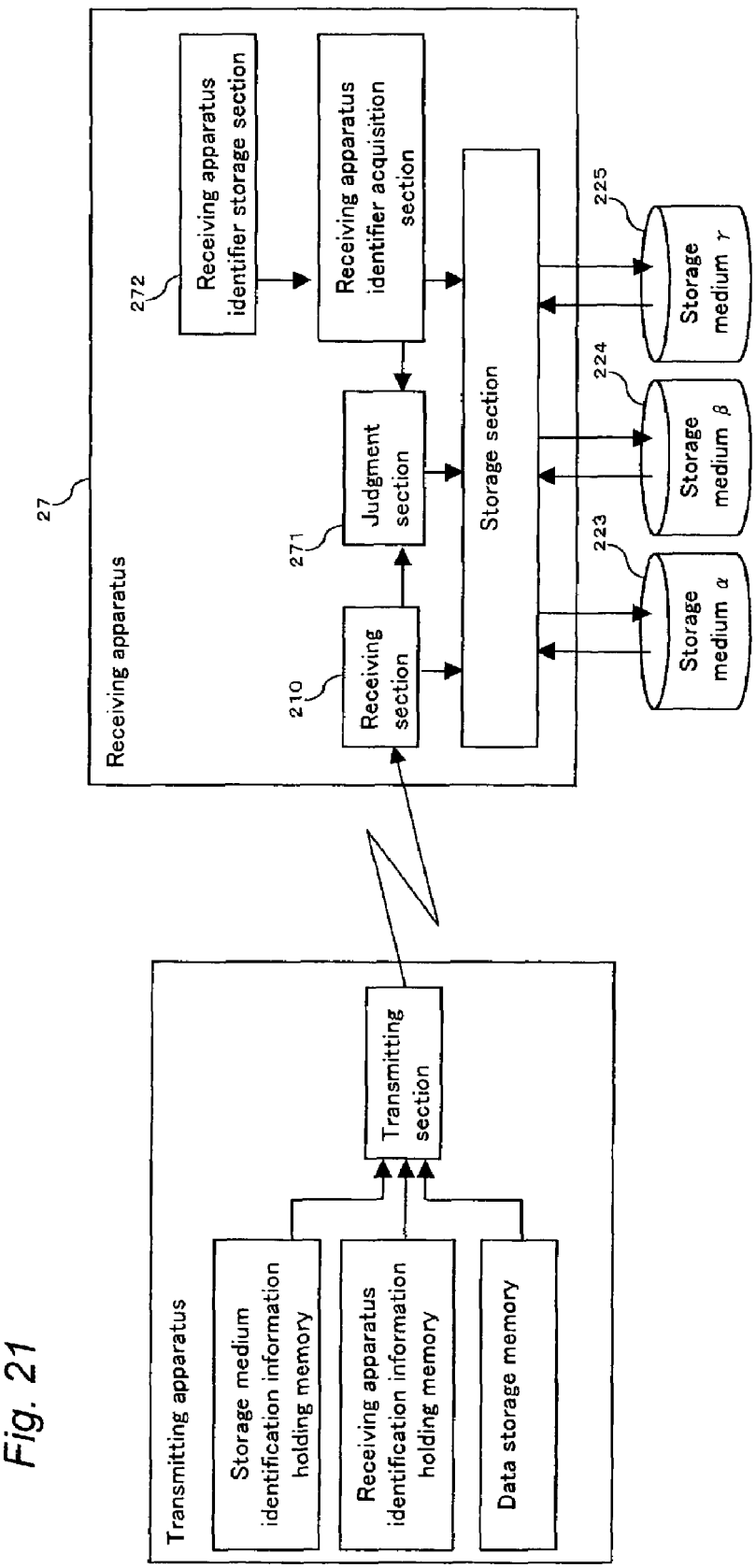
FIG. 21 is a view showing the basic construction of a modification of the receiving apparatus shown in FIG. 10.

Furthermore, a judgment section 271 for identifying a receiving apparatus may be independent as shown in FIG. 21. The above-mentioned judgment section 271 compares the receiving apparatus identifier, of the receiving apparatus itself, stored on a receiving apparatus identifier storage section 272, with a receiving apparatus identifier received by the receiving section 210. At this time, even when there is a partial coincidence, it may be judged that data to be received by the receiving section 210 is obtained. In other words, even when the two receiving apparatus identifiers do not coincide completely with each other, it may be judged that the data is obtained.

For example, when a receiving apparatus identifier is formed of eight bytes, the first four bytes are allocated to a region identifier for specifying a region and the last four bytes are allocated to each receiving apparatus, and when a first receiving apparatus identifier specifies only the region identifier formed of the first four bytes, and when the first and second receiving apparatus identifiers coincide with the first four bytes, it may be assumed that they have "a certain relation."

According to the first embodiment of the present invention described above, it is possible to accumulate a content designated by the user or the like on a plurality of receiving apparatuses connected to plural kinds of storage media automatically and simultaneously. It is possible to automatically accumulate the content specified by the user or the like on specified media automatically.

In this embodiment, although it is explained that the storage media are always connected securely to the storage controller 2126, it is not necessary that the storage media are always connected securely thereto, but a similar effect can be obtained even when the storage media are connected as necessary.

Furthermore, the storage medium identification table formed in the identifier storage section 211 is not limited to the storage medium selection table based on the kind of content, but the table can be formed as a table for selecting storage media according to data attributes, such as content size and transmission time zone.

Furthermore, the storage identifier is a unique fixed value for each storage medium. Still further, the selection of the storage medium connected to the receiving apparatus on the transmission side is made possible by making selection at the transmission apparatus 1, by adding the selection to the receiving apparatus control information and by inserting the information in the broadcast stream 31, other than the selection of a storage medium by using the storage control section 212.

The above-mentioned storage control operation in the receiving apparatus may be realized by a program readable by computers, and the program may be distributed by using recording media readable by computers. The transmitting and receiving system in accordance with this embodiment is explained by using broadcast streams; however, it is not limited to this, but it can be realized by using communication means, such as communication packets.

This embodiment is just an embodiment, and it is needless to say that other forms for embodying the invention in accordance with the claims are included in the present invention. This is applicable to the following embodiments similarly.

Second Embodiment

Figure 22:
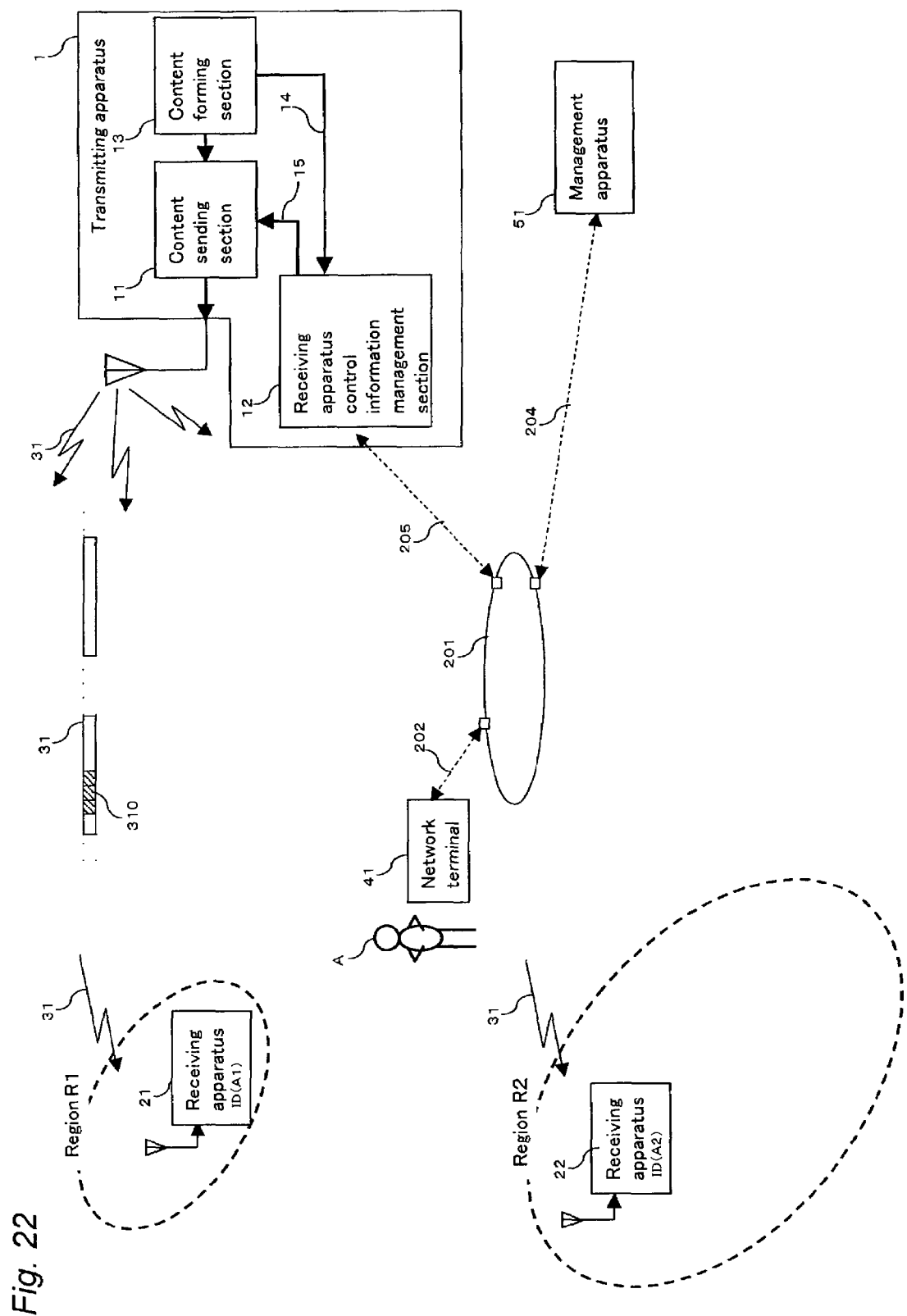
FIG. 22 is a view showing the basic in accordance with a second embodiment of the present invention.

A second embodiment of the present invention will be described below by using FIG. 22 to FIG. 26. FIG. 22 is a view showing a general construction of a broadcasting system in accordance with this embodiment wherein a recording apparatus user and a network apparatus are used. In FIG. 22, a transmitting apparatus 1 and a broadcast stream 31 with receiving apparatus control information have the same functions as those shown FIG. 1 used to explain the first embodiment. Furthermore, as explained in the first embodiment, the user A uses the receiving apparatus 21 having the receiving apparatus identification number ID (A1) and installed in the region R1 indicating a home or office in a region obtained by division as a minimum administrative district unit and the receiving apparatus 22 having the receiving apparatus identification number ID (A2) and installed in the region R2 indicating a home or office in a region obtained by division as a minimum administrative district unit, different from the region R1. Herein, by operation on a network apparatus 41 by the user A, connection is made to a management apparatus 51 via a telephone line 202, the Internet 201 and a telephone line 204, and information transmission and reception are carried out. Furthermore, the management apparatus 51 is connected to the receiving apparatus control information management section 12 of the transmitting apparatus 1 via the telephone line 204, the Internet 201 and a telephone line 205.

The regions R1 and R2 may be regions based on homes, school districts, commercial facilities, etc. or regions based on logical concepts, instead of regions based on the administrative district unit. Furthermore, the regions R1 and R2 may be the same region or may be different regions.

Figure 23:
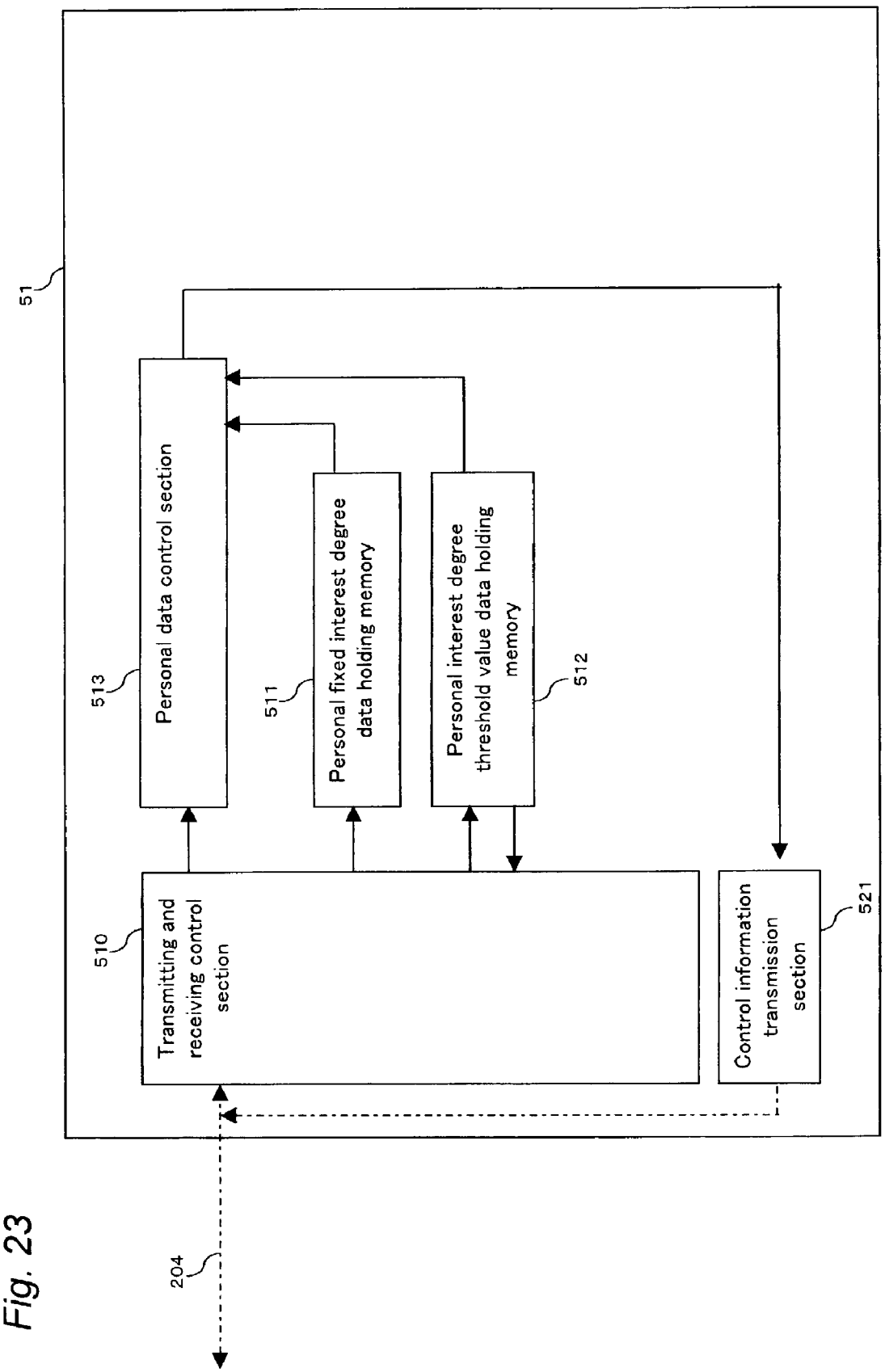
FIG. 23 is a view showing the construction of a management apparatus in accordance with the second embodiment of the present invention.

FIG. 23 shows the detailed construction of the management apparatus 51 of FIG. 22. In FIG. 23, the management apparatus 51 comprises a transmitting and receiving control section 510, a personal fixed interest degree data holding memory 511, a personal interest degree threshold value data holding memory 512, a personal data control section 513 and a control information transmission section 521.

Furthermore, the above-mentioned transmitting and receiving control section 510 is an example of the above-mentioned attribute information recording section. The above-mentioned personal interest degree threshold value data holding memory 512 is an example of the above-mentioned attribute information group storage section. The above-mentioned personal fixed interest degree data holding memory 511 is an example of a part of the above-mentioned data group storage section. The above-mentioned personal data control section 513 is an example of the above-mentioned data acquisition regulation storage section. The above-mentioned transmitting and receiving control section 510 is an example of the above-mentioned attribute information receiving section.

The transmitting and receiving control section 510 is connected to the network apparatus 41 of the user A via the telephone line 204, the Internet 201 and the telephone line 202 as shown in FIG. 22. Furthermore, the transmitting and receiving control section 510 is connected to the receiving apparatus control information management section 12 via the telephone line 204, the Internet 201 and the telephone line 205.

Next, the operation for registering personal information in the management apparatus 51 by the user who uses the receiving apparatus and the operation of the management apparatus 51 will be described by using FIG. 23. First, the information transmitted from the network apparatus 41 by the operation of the user A is received by the transmitting and receiving control section 510 via the telephone line 202, the Internet 201 and the telephone line 204. Furthermore, if the transmitted information is the initial registration data of the user A, the information is transmitted to the personal data control section 513. If the transmitted information is a piece of fixed interest degree information having a fixed interest relative to the data of the user A, the information is stored on the personal fixed interest degree data holding memory 511. The personal fixed interest degree data holding memory 511 is a fixed interest degree information storage section for storing a personal fixed interest degree data table. If the transmitted information is additional information for charging the fixed interest degree for the data of the user A, the transmitted information is registered in a personal interest degree index data table, described later, which is stored on the personal interest degree threshold value data holding memory 512. The personal data control section 513 is a storage (or accumulation) control section for carrying out at least one of selection of data to be accumulated on a storage (or accumulation) medium, and selection of a storage medium, from the personal fixed interest degree information and the additional information.

Figure 24:
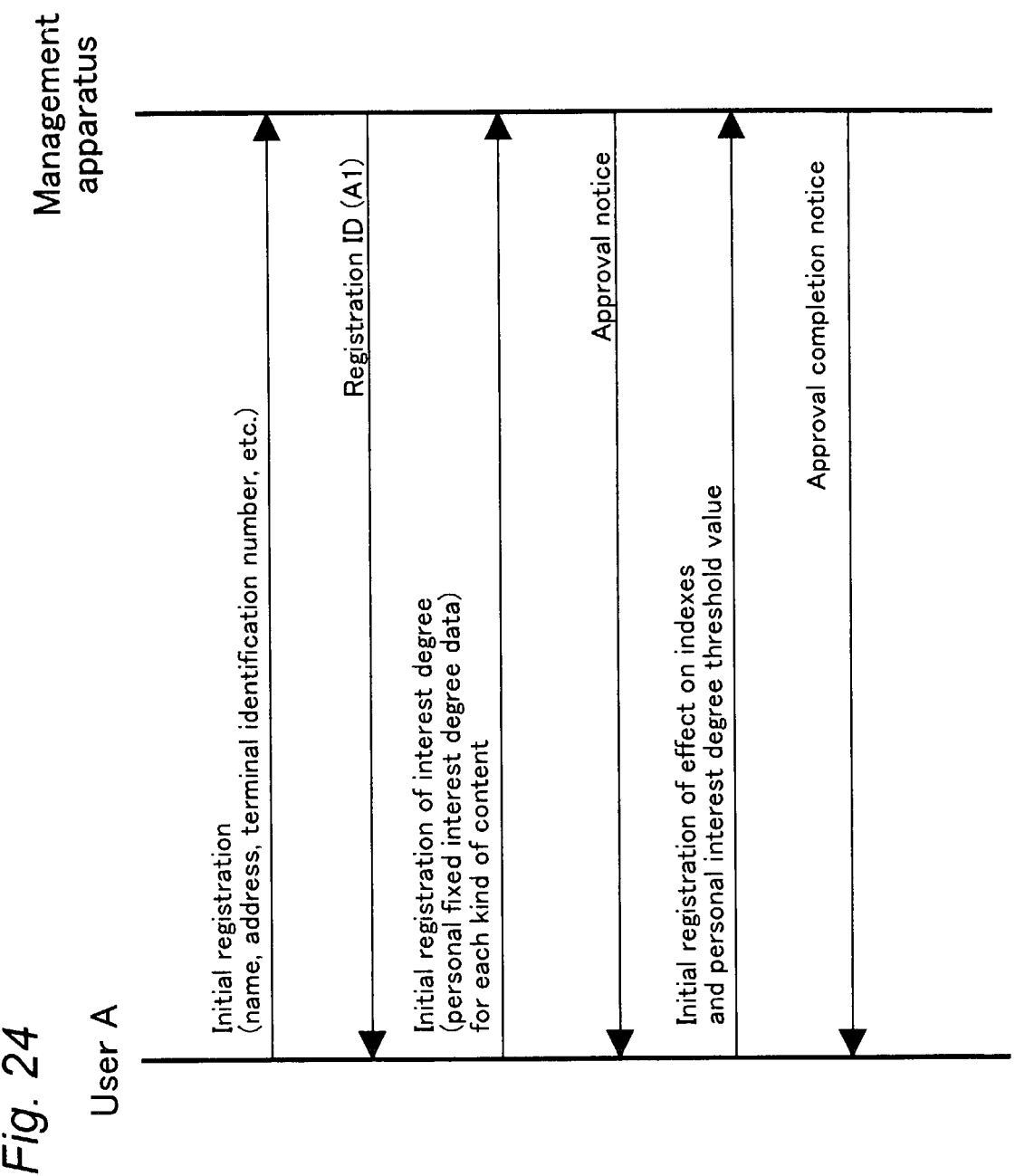
FIG. 24 is a view showing a flow of a procedure for registration to the management apparatus.

FIG. 24 is a view showing a flow of a procedure for registering the personal information of the user A in the management apparatus 51. At the time of the registration, the user A first transmits the personal information, such as his or her name, address and the receiving apparatus identification number of the receiving apparatus to be used. Initial registration is carried out by this transmission, and the registration ID (A1) is obtained from the management apparatus 51. At this time, the management apparatus 51 forms and manages (or administers) a receiving apparatus identification number table exemplified in FIG. 26. The receiving apparatus identification table shown in FIG. 26 indicates that the user A uses the receiving apparatuses having ID (A1) and ID (A2) as the receiving apparatus identification numbers and that these have been registered.

Next, the user A transmits an interest degree for each kind of content, i.e., personal fixed interest degree data, and registers the data in the management apparatus 51 and then receives an approval notice. At this time, the management apparatus 51 forms a personal fixed interest degree data table exemplified in FIG. 27, and controls the table by using the personal data control section 513. The personal fixed interest degree data table shown in FIG. 27, for example, indicates that the interest degree of the user A in content kind number 00 is "1.0" and that the interest degree in content kind number 01 is "−2.5."

Additional information for raising the selection accuracy of contents to be recorded automatically in a recording apparatus used by the user A will be exemplified herein. The user A determines a degree (hereafter, referred to as an index) indicating his or her daily living environments, i.e., his or her current mental conditions and physical conditions or his or her surrounding conditions, and transmits the index to the managing apparatus 51. The user registers this transmitted index in the managing apparatus 51. Also, by transmitting the index to the managing apparatus 51, the user A determines beforehand as to what kind of effect is given on the personal fixed interest degree in data, and also registers this in the managing apparatus 51 beforehand.

For example, when the user A judges the kind of content to be recorded automatically in a recording apparatus to be used, if the fixed interest degree for each kind of content having already been registered is larger than a certain value (the above-mentioned personal interest degree threshold value, 0.0 for example), it is judged that the content belonging to the corresponding kind of content is recorded automatically. As shown in FIG. 29, it is assumed that "the degree of health," "the degree of time to spare" and "family budget", for example, are determined as indexes, that "−1.5," "−2.0" and "+1.5" are determined respectively as personal interest degree threshold data and that these are registered. Furthermore, as exemplified in FIG. 28, it is assumed that, by transmitting the storage identifier of the storage (or accumulation) medium desired to be used by the user A for each kind of content to the managing apparatus 51 and by registering the storage (or accumulation) identifier therein, the storage medium or the kind of storage medium on which the content is accumulated can be designated.

Figure 25:
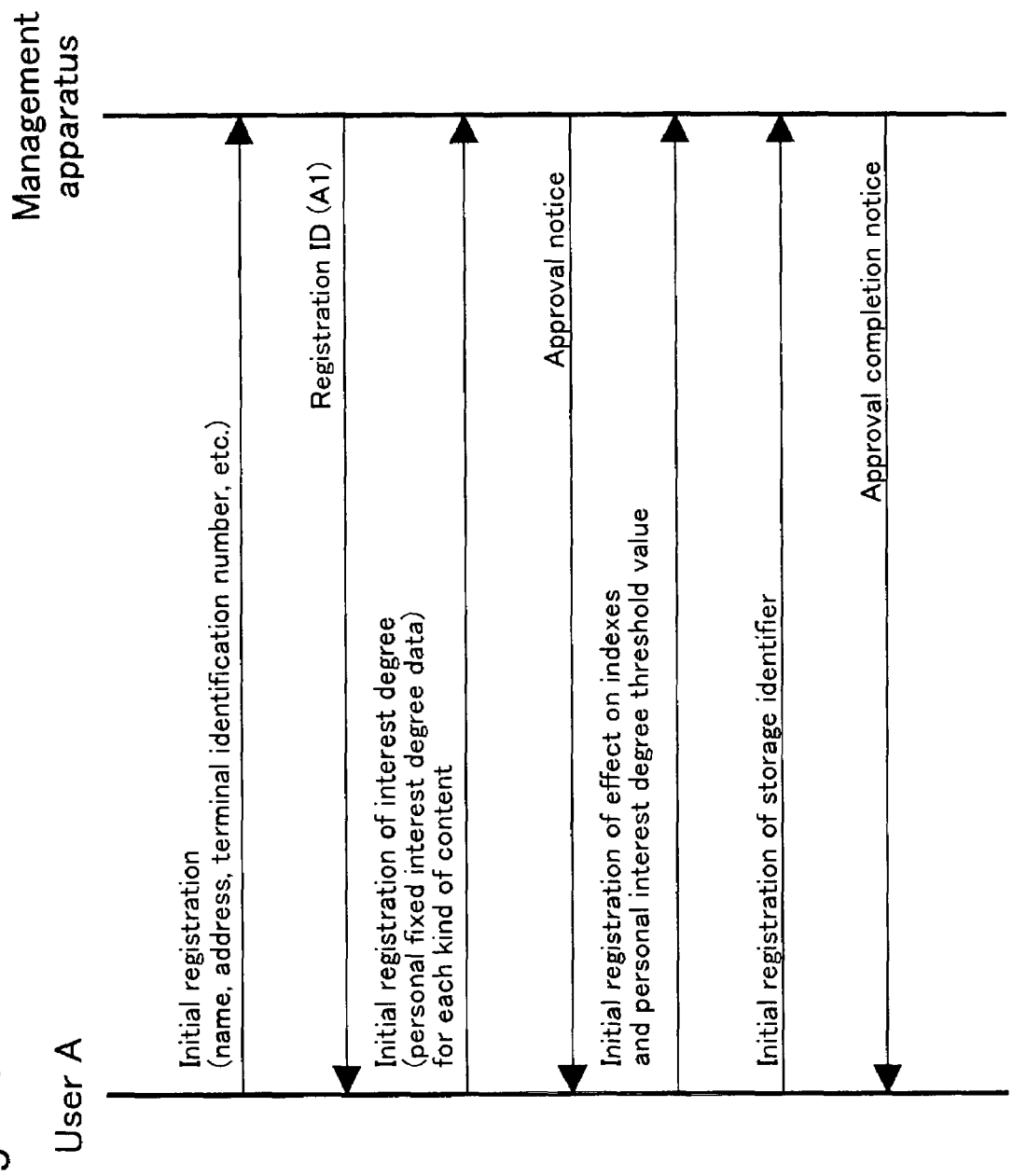
FIG. 25 is a view showing a flow of a procedure, for registration to the management apparatus, of a modification of the procedure shown in FIG. 24.
Figure 31:
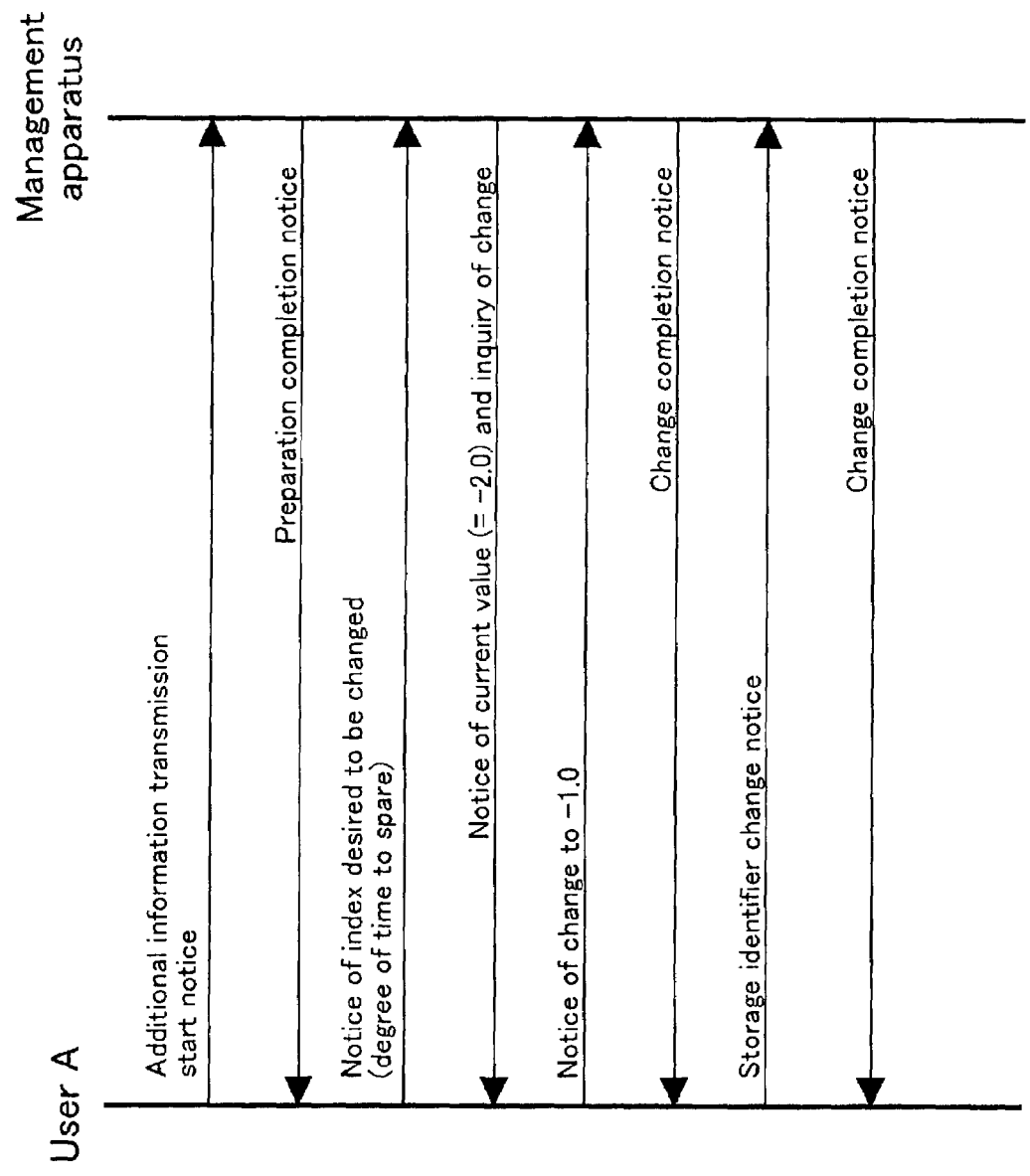
FIG. 31 is a view showing a flow of a procedure, for the change of personal interest degree threshold value data to the management apparatus, of a modification of the procedure shown in FIG. 30.

A method for designating the storage medium or the kind thereof is carried out by initialization in the managing apparatus 51 as shown in FIG. 25. Furthermore, a change is attained by issuing a change notice to the managing apparatus 51 as shown in FIG. 31.

In addition, by sending an index as necessary (for example, everyday) to the managing apparatus 51 (in other words, by transmitting additional information), the user A can change the personal interest degree threshold value data.

Figure 30:
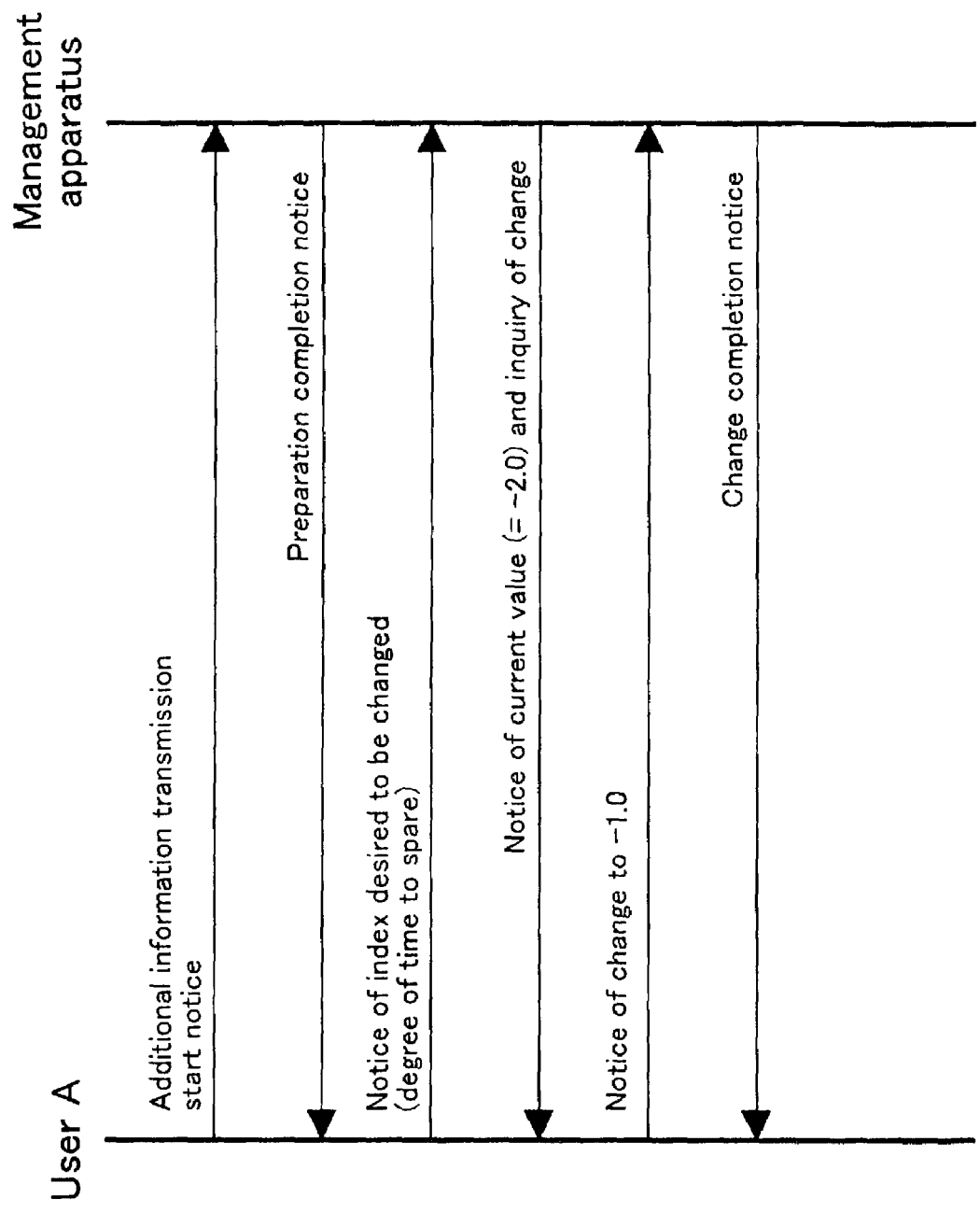
FIG. 30 is a view showing a flow of a procedure for the change of personal interest degree threshold value data to the management apparatus.

For example, as exemplified in FIG. 30, the user A operates the network apparatus 41 to notify transmission start to the managing apparatus 51, whereby the transmitting and receiving control section 510 of FIG. 23 reads the personal interest degree threshold value data table (exemplified in FIG. 29) stored (or kept) once on the personal interest degree threshold value data holding memory 512 and issues a preparation completion notice.

Next, the user A notifies an index desired to be changed, whereby the transmitting and receiving control section 510 makes an inquiry about the current value of the current personal interest degree threshold value data corresponding to the index and also makes an inquiry about how the value is desired to be changed. In response to the inquiries, the user A designates a value to change the value of the personal interest degree threshold value data. FIG. 30 shows an example wherein "the degree of time to spare" is changed from "−2.0" to "−1.0." Furthermore, when the storage medium on which contents are accumulated or the kind of the storage medium is desired to be changed, a notice of change of the storage identifier of the storage medium desired to be changed by the user A for each kind of content is transmitted to the managing apparatus 51 as shown in FIG. 31.

As described above, the managing apparatus 51 forms the receiving apparatus identification number table shown in FIG. 26, the personal fixed interest degree data table shown in FIG. 27 and the personal interest degree threshold value data table shown in FIG. 29. The receiving apparatus identification number table, the personal fixed interest degree data table and the personal interest degree threshold value data table are generated, the quantity (or number) of each table being equal to the number of the users managed by the managing apparatus 51; the receiving apparatus identification table is stored on the personal data control section 513, the personal fixed interest degree data table is stored on the personal fixed interest degree data holding memory 511, and the personal interest degree threshold value data table is stored on the personal interest degree threshold value data holding memory 512; and these tables are then managed.

Figure 32:
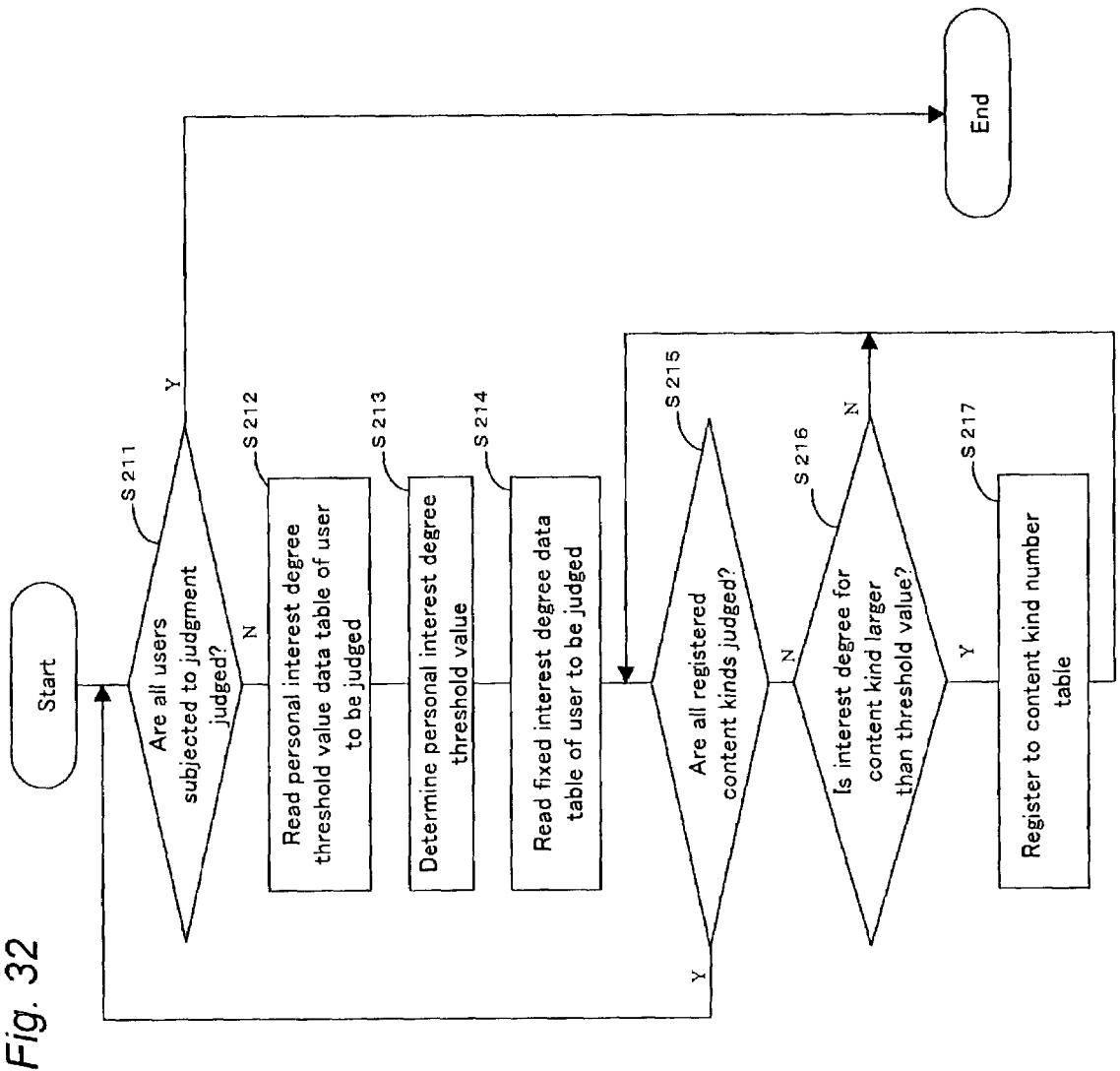
FIG. 32 is a view showing accumulation content judgment processing on the basis of the taste of a person.

A procedure for judging the kind of content to be automatically recorded in a recording apparatus to be used by the user A will be herein described in accordance with the construction of the management apparatus 51 shown in FIG. 23 and with the flowchart shown in FIG. 32. The personal data control section 513 of the management apparatus 51 starts judgment by determining a user to be judged at a predetermined timing and on the basis of a predetermined standard.

Next, the personal data control section 513 reads the personal interest degree threshold value data table (exemplified in FIG. 29) of the user to be judged, from the personal interest degree threshold value data holding memory 512 (at step S212). The personal data control section 513 determines the personal interest degree threshold value of the user to be judged, on the basis of the personal interest degree threshold value data table having been read (for example, on the basis of the average of the values of all items or on the basis of the sum of the values of all items) (at step S213). For example, the personal interest degree threshold value of the user A is determined as (−1.0) as shown in FIG. 33.

Next, the personal data control section 513 reads the personal fixed interest degree data table of the user to be judged, from the personal fixed interest degree data holding memory 511 (at step S214). Then, the personal data control section 513 compares the value of interest degree with the personal interest degree threshold value (−1.0) shown in FIG. 33 for each kind of content registered in the personal fixed interest degree data table as shown in FIG. 27 for example (at step S216).

When the value of the interest degree is larger than the personal interest degree threshold value, the personal data control section 513 judges that a content belonging to this kind of content should be recorded automatically in a recording apparatus to be used by the user A, and forms a transmission content kind number table by using the content kind number as shown in FIG. 34 (at step S217). As described above, for all users to be judged, the personal interest degree threshold value for each user is used to judge each kind of content.

In the end, the personal data control section 513 delivers control information including the information of the formed transmission content kind number table shown in FIG. 34 and the information of the receiving apparatus identification number table managed by each user shown in FIG. 26 to the control information transmission section 521, and the control information transmission section 521 issues a notice to the receiving apparatus control information management section 12 of the receiving apparatus 1 shown in FIG. 22 via the telephone line 204, the Internet 201 and the telephone line 205. As explained in the first embodiment, the receiving apparatus control information management section 12 determines a content desired to be recorded automatically in the recording apparatus to be used by the user, and the receiving apparatus 1 transmits the broadcast stream 31 with receiving apparatus control information.

As described above, when selecting a content to be recorded automatically in the recording apparatus used by the user, the selection standard of the kind can be made to accurately follow the change in taste due to the effect of daily living environments of the user. Hence, in comparison with the case wherein a content to be recorded automatically on the basis of only the fixed attribute standard (personal fixed interest degree data) that is not changed is judged, a content more strongly reflecting the current interest degree and the degree of content request of the user A is judged and can be accumulated on the desired storage medium.

In this embodiment, the management apparatus having the control information transmission section 521 for transmitting control information obtained from the personal data control section 513 is explained. Alternatively, a control information storage section for accumulating control information obtained from the personal data control section 513 may be provided. In this case, it may be possible that the control information stored (or kept) on the control information storage section is copied on a recording medium readable by computers and is transferred to the receiving apparatus control information management section 12.

Furthermore, in this embodiment, it is explained that the personal data control section selects data accumulated on a storage medium. Alternatively, plural storage media connected to the receiving apparatus of the user may be selected, as explained in the first embodiment.

Furthermore, in this embodiment, it is explained that a personal interest degree threshold value data table is formed and stored on the personal interest degree threshold value data holding memory. Alternatively, it is be possible to start the procedure for judging the kind of content to be recorded automatically in the recording apparatus to be used by the user by directly calculating a personal interest degree threshold value when the transmitting and receiving control section receives additional information and by immediately sending a notice to the personal data control section.

In this embodiment, the above-mentioned personal data control section 513 is explained as an example of the above-mentioned data acquisition regulation storage section. Furthermore, the data acquisition regulation stored on the above-mentioned data acquisition regulation storage section is a regulation determined by the following n parameters.

$y_n$ is a regulation determined by expression $f(x_1, x_2, \ldots, x_n)$.

The parameters and expressions for the above-mentioned relational expression in this embodiment are described below.

$y_n$ . . . a fixed interest degree for each kind of content $x_1$ . . . an interest degree threshold value for the degree of health $x_2$ . . . an interest degree threshold value for the degree of time to spare $x_3$ . . . an interest degree threshold value for family budget n . . . 3

$$f(x_1, x_2, \ldots, x_n) = (x_1 + \ldots + x_n)$$

$$y_n > f(x_1, x_2, \ldots, x_n)$$

The above-mentioned relational expression may be anything, provided that it designates a regulation.

This embodiment is just an embodiment, and it is needless to say that other forms for embodying the invention in accordance with the claims are included in the present invention.

Third Embodiment

Figure 35:
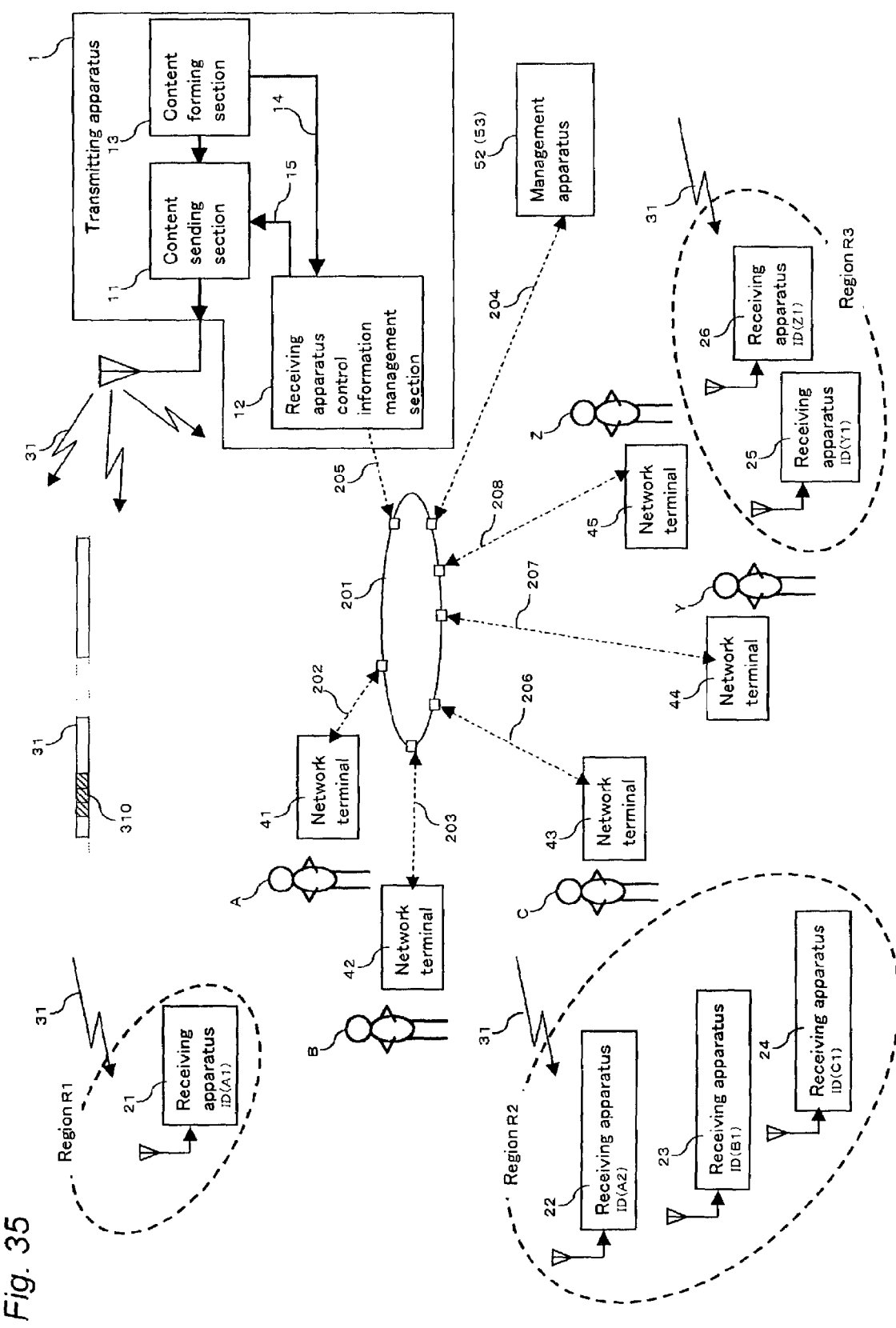
FIG. 35 is a view showing the basic construction in accordance with third and fourth embodiments of the present invention.

A third embodiment of the present invention will be described below by using FIG. 35 to FIG. 46. FIG. 35 is a view showing a general construction of a transmitting and receiving system in accordance with this embodiment wherein recording apparatus users and network apparatus are used. In FIG. 35, a transmitting apparatus 1 and a broadcast stream 31 with receiving apparatus control information have the same functions as those shown FIG. 1 used to explain the first embodiment. Furthermore, as explained in the second embodiment shown in FIG. 22, the user A uses the receiving apparatus 21 having the receiving apparatus identification number ID (A1) and installed in the region R1 indicating a home or office in a region obtained by division as a minimum administrative district unit and the receiving apparatus 22 having the receiving apparatus identification number ID (A2) and installed in the region R2 indicating a home or office in a region obtained by division as a minimum administrative district unit, different from the region R1.

A user B uses a receiving apparatus 23 having a receiving apparatus identification number ID (B1) and installed in the region R2, and a user C uses a receiving apparatus 24 having a receiving apparatus identification number ID (C1) and installed in the region R2.

Furthermore, a user Y uses a receiving apparatus 25 having a receiving apparatus identification number ID (Y1) and installed in a region R3 indicating a home or office in a region obtained by division as a minimum administrative district unit, different from the regions R1 and R2, and a user Z uses a receiving apparatus 26 having a receiving apparatus identification number ID (Z1) and installed in the same region R3 as that for the user Y.

The regions R1, R2 and R3 may be regions based on homes, school districts, commercial facilities, etc. or regions based on logical concepts, instead of regions based on the administrative district unit. Furthermore, the regions R1, R2 and R3 may be the same region or may be different regions.

Furthermore, the user A, the user B and the user C belong to a group having a group number G1, and the user A, the user Y and the user Z belong to a group having a group number G2, and the user A belongs to the groups G1 and G2. The same content kind number is recorded automatically in the receiving apparatuses used by the users belonging to the same group.

The user A operates the network apparatus 41, thereby connecting to a management apparatus 52 via the telephone line 202, the Internet 201 and the telephone line 204 and then transmitting and receiving information.

Furthermore, the user B, the user C, the user Y and the user Z operate a network apparatus 42, a network apparatus 43, a network apparatus 44 and a network apparatus 45, respectively, just like the user A, thereby connecting to the management apparatus 52 via the telephone line 203, the telephone line 206, the telephone line 207, the Internet 201 and the telephone line 204 and then transmitting and receiving information. Furthermore, the managing apparatus 52 is connected to the receiving apparatus control information management section 12 of the receiving apparatus 1 via the telephone line 204, the Internet 201 and the telephone line 205.

Figure 36:
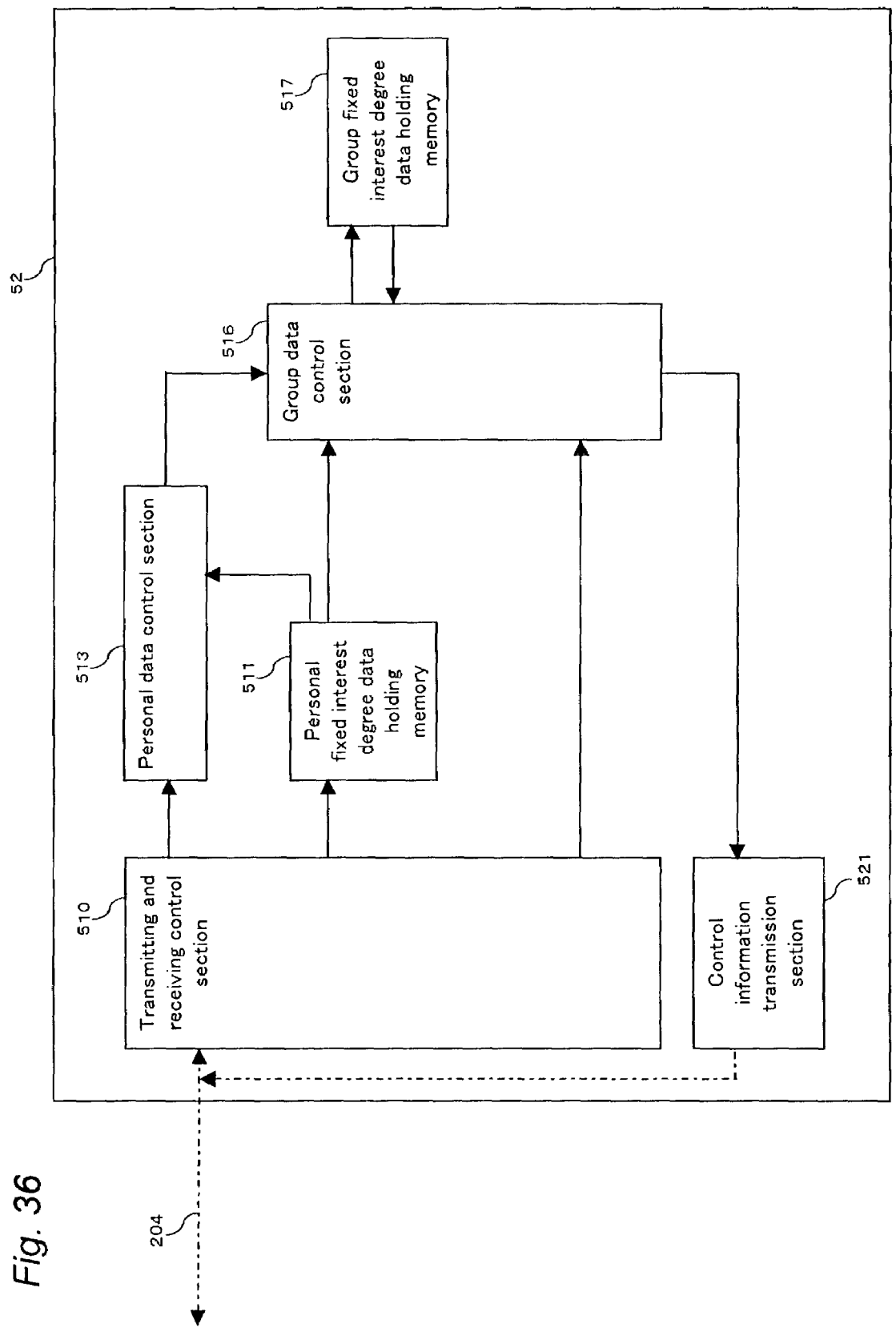
FIG. 36 is a view showing the construction of a management apparatus in accordance with the third embodiment.

Next, a procedure for registering personal information in the management apparatus 52 by the user who uses the receiving apparatus will be described by using FIG. 35 to FIG. 43. FIG. 36 shows a construction of the managing apparatus 52 in accordance with the third embodiment. In FIG. 36, the management apparatus 52 comprises a transmitting and receiving control section 510, a personal fixed interest degree data holding memory 511, a personal data control section 513, a group data control section 516, a group fixed interest degree data holding memory 517 and a control information transmission section 521. The group fixed interest degree data holding memory 517 is an example of a part of a data group storage section. In other words, the data group storage section may manage a plurality of interest degree data (attribute information values) of one person, or may manage a plurality of interest degree data (attribute information values) of plural persons. The group data control section 516 is an example of a data acquisition regulation storage section. The transmitting and receiving control section 510, the personal data control section 513 and the personal fixed interest degree data holding memory 511 have the same functions as those of the managing apparatus 51 of FIG. 23 used in the explanation of the second embodiment.

As shown in FIG. 35, the transmitting and receiving control section 510 is connected to the network apparatus 41 of the user A via the telephone line 204, the Internet 201 and the telephone line 202, to the network apparatus 42 of the user B via the telephone line 203, to the network apparatus 43 of the user C via the telephone line 206, to the network apparatus 44 of the user Y via the telephone line 207, to the network apparatus 45 of the user Z via the telephone line 208, and to the receiving apparatus control information management section 12 via the telephone line 204, the Internet 201 and the telephone line 205. The information transmitted from each network apparatus by the operation of each user is received by the transmitting and receiving control section 510 via the telephone line and the Internet 201. Furthermore, if the transmitted information is group registration information, the information is transmitted to the group data control section 516. The group data control section 516 registers a group name, extracts the personal fixed interest degree data of the user belonging to the group from the personal fixed interest degree data holding memory 511, generates group fixed interest degree data from the personal fixed interest degree data, and stores the group fixed interest degree data on the group fixed interest degree data holding memory 517. The personal fixed interest degree data, and the group fixed interest degree data will be described later in detail.

Figure 37:
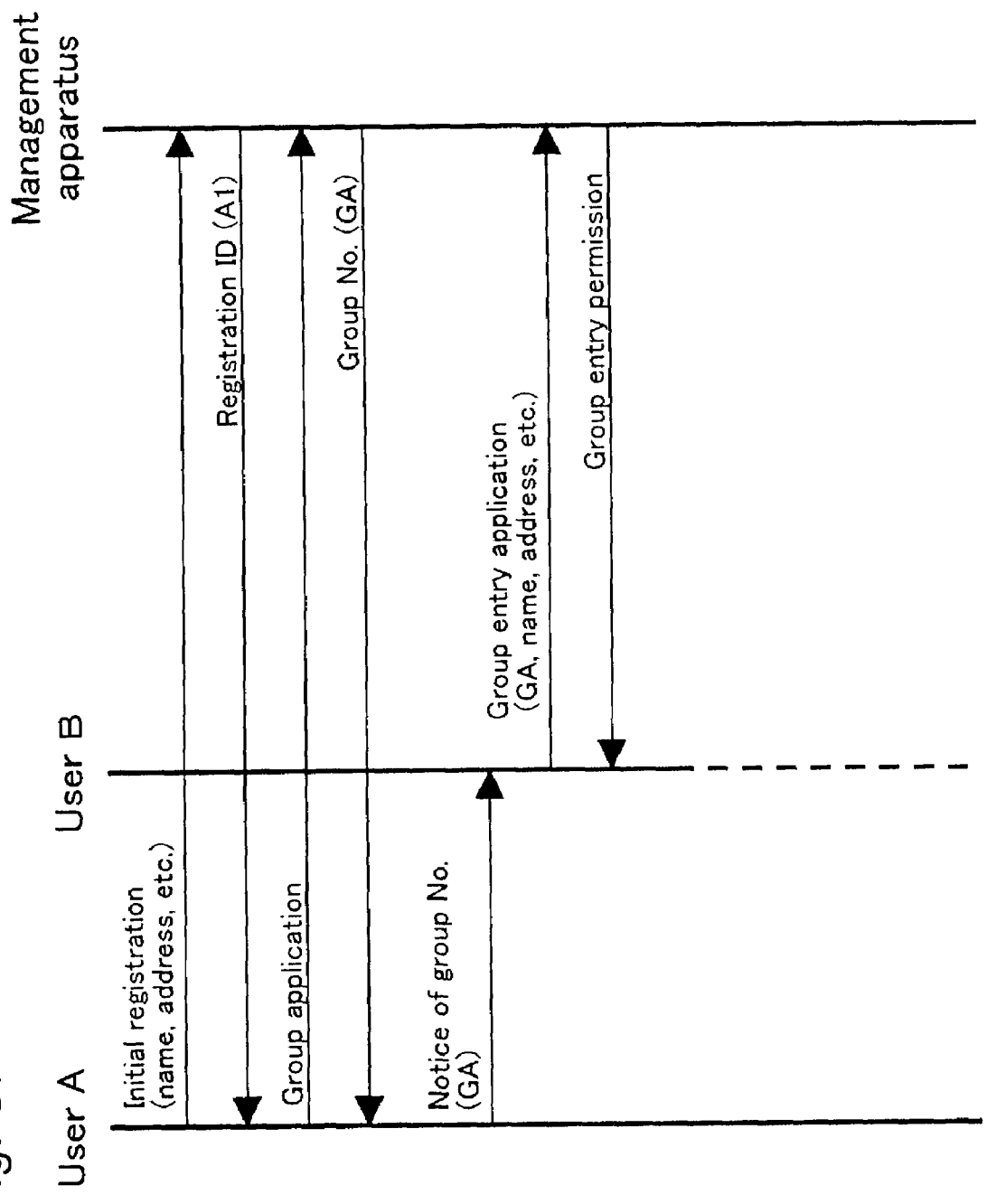
FIG. 37 is a view showing a flow of a procedure for user registration and group registration.

FIG. 37 is a view showing a flow of a procedure for registering a user and for registering a group in the management apparatus 52. In FIG. 37, the user A first transmits personal information, such as his or her name, address and the receiving apparatus identification number of the receiving apparatus to be used and predetermined information (hereafter, referred to as predetermined information), such as a usage period, to the managing apparatus, whereby initial registration is carried out, and the user obtains the registration ID (A1) and the registration ID (A2) from the managing apparatus 52. Since the user A installs the receiving apparatuses at two positions in the region R1 and the region R2 as explained in FIG. 35, the user A acquires two registration IDs. Furthermore, the user B can also acquire the registration ID (B1) by carrying out initial registration just as in the case of the user A, although this is not shown in FIG. 37.

Next, the user transmits an interest degree for each kind of content exemplified in FIG. 3, i.e., personal fixed interest degree data, registers the data in the management apparatus 52, and then receives an approval notice. At this time, the management apparatus 52 forms a personal fixed interest degree data table on the basis of the personal fixed interest degree data and carries out management (or administration). The personal fixed interest degree data table will be described later in detail.

Next, a procedure for carrying out group registration for the user A and the user B will be explained. When the user A applies for a group number to the managing apparatus, the managing apparatus 52 selects a group number from a group management table having already been prepared, determines an unassigned group number (G1), and forms a group management table. After determining the group number (G1) of the user A, the managing apparatus 52 registers the fact that the user A having joined the group number (G1) is registered in the personal fixed interest degree data of the user A described in FIG. 27, and notifies the group number (G1) to the user A. The user A notifies the group number (G1) notified by the managing apparatus 52 to the user B in order to carry out group registration so as to be grouped with the user B by whom the kind of content to be transmitted from the transmitting apparatus 1 is shared. In order to carry out grouping so as to belong to the same group to which the user A belongs, the user B applies for group entry to the managing apparatus 52 by transmitting the group number (G1) notified from the user A and predetermined information to the managing apparatus 52. After receiving the predetermined information and the grouping information, i.e., a group number, from the user B, the managing apparatus 52 refers to the group number from the group management table, confirms the group number (G1), registers the user B in the group G1, and renews the group management table. After the renewal of the group management table is carried out, the managing apparatus 52 refers to the personal fixed interest degree data of the user A and the user B belonging to the group number (G1), calculates group fixed interest degree data on the basis of the personal fixed interest degree data and forms a group fixed interest degree data table. Furthermore, after the group fixed interest degree data table is formed, the managing apparatus 52 notifies group entry permission to the user B, thereby completing group registration. The group fixed interest degree data table will be described later in detail. Furthermore, although not shown in FIG. 37, a method for applying for group entry of the user C into the group number G1 is similar to that for the user B.

As described above, the managing apparatus 52 shown in FIG. 35 registers and manages the receiving apparatuses of the users on the basis of the predetermined information sent from the users, forms a receiving apparatus identification number table for each user, receives personal fixed interest degree data indicating the interest degree for each kind of content from the user, forms a personal fixed interest degree data table, and carries out management. Furthermore, the managing apparatus 52 forms a group manages table and a group fixed interest degree data table on the basis of the grouping information from the users and carries out management. In addition, the managing apparatus 52 receives a storage (or accumulation) identifier identifying a storage (or accumulation) medium for content storage (or accumulation) per each kind of content and can carry out management.

FIG. 38 is a view showing a receiving apparatus identification number table. The receiving apparatus identification table indicates that the user A uses the receiving apparatuses having the registration ID (A1) and the registration ID (A2) as receiving apparatus identification numbers and that the user B uses the receiving apparatus having ID (B1) as a receiving apparatus identification number.

FIG. 39 shows a user management table. The user management table has information upon receiving apparatus identification numbers and usage periods. The management table indicates that the user A uses the receiving apparatuses having the registration ID (A1) and the registration ID (A2) as receiving apparatus identification numbers, that the receiving apparatuses 21 and 22 having the registration ID (A1) and the registration ID (A2) can carry out reception in the period from Aug. 1, 1999 to Aug. 31, 1999, and that only the receiving apparatuses 21 having the registration ID (A1) can carry out reception in the period from Sep. 1, 1999 to Sep. 30, 1999. Furthermore, the management table indicates that the user B uses the receiving apparatus 23 having the registration ID (B1) as a receiving apparatus identification number and that there is no limit in the usage period.

FIG. 40 is a view showing a personal fixed interest degree data table. In the personal fixed interest degree data table, the user's interest degrees for the content kind numbers explained in FIG. 36 is represented numerically in 11 steps from "−2.5" to "2.5" at 0.5 step intervals, in which "−2.5" means "not interested at all" and "2.5" means "very much interested." The personal fixed interest degree data table indicates that the user A's interest degree for the content kind number 00 is "1.0" and that user A's interest degree for the content kind number 01 is "−2.5." Furthermore, FIG. 41 indicates that the storage identifier of the storage medium designated by a user in the personal fixed interest degree data table can be managed for each kind of content.

FIG. 43 is a view showing a group management data table. The group management data table indicates that the users belonging to the group number "G1" are three persons, the user A, the user B and the user C.

FIG. 44 is a view showing a group fixed interest degree data table. The group fixed interest degree data table refers to the users belonging to a group according to the group management table and holds calculated numerals, i.e., the average values of the personal fixed interest degree data of the users according to the personal fixed interest degree data table. The group fixed interest degree data table indicates that the group number G1 has an interest degree of "0.5" for the content kind number 00 and has an interest degree of "1.1" for the content kind number 01, for example.

As described above, the management apparatus 52 stores the receiving apparatus identification number table shown in FIG. 38, the personal fixed interest degree data table shown in FIG. 40 or FIG. 41, the group management data table shown in FIG. 43 and the personal fixed interest degree data table shown in FIG. 44. In the receiving apparatus identification number table and the personal fixed interest degree data table, records (rows) corresponding to the number of users managed respectively by the management apparatus are stored, and in the group management data table and the group fixed interest degree data table, records (rows) corresponding to the number of groups controlled respectively by the management apparatus are stored. Furthermore, in FIG. 36, the receiving apparatus identification table is stored on the personal data control section 513 and managed, the personal fixed interest degree data table is stored on the personal fixed interest degree data holding memory 511 and managed, the group management table is stored on the group data control section 516 and managed, and the group fixed interest degree data table is stored on the group fixed interest degree data holding memory 517 and managed.

Figure 45:
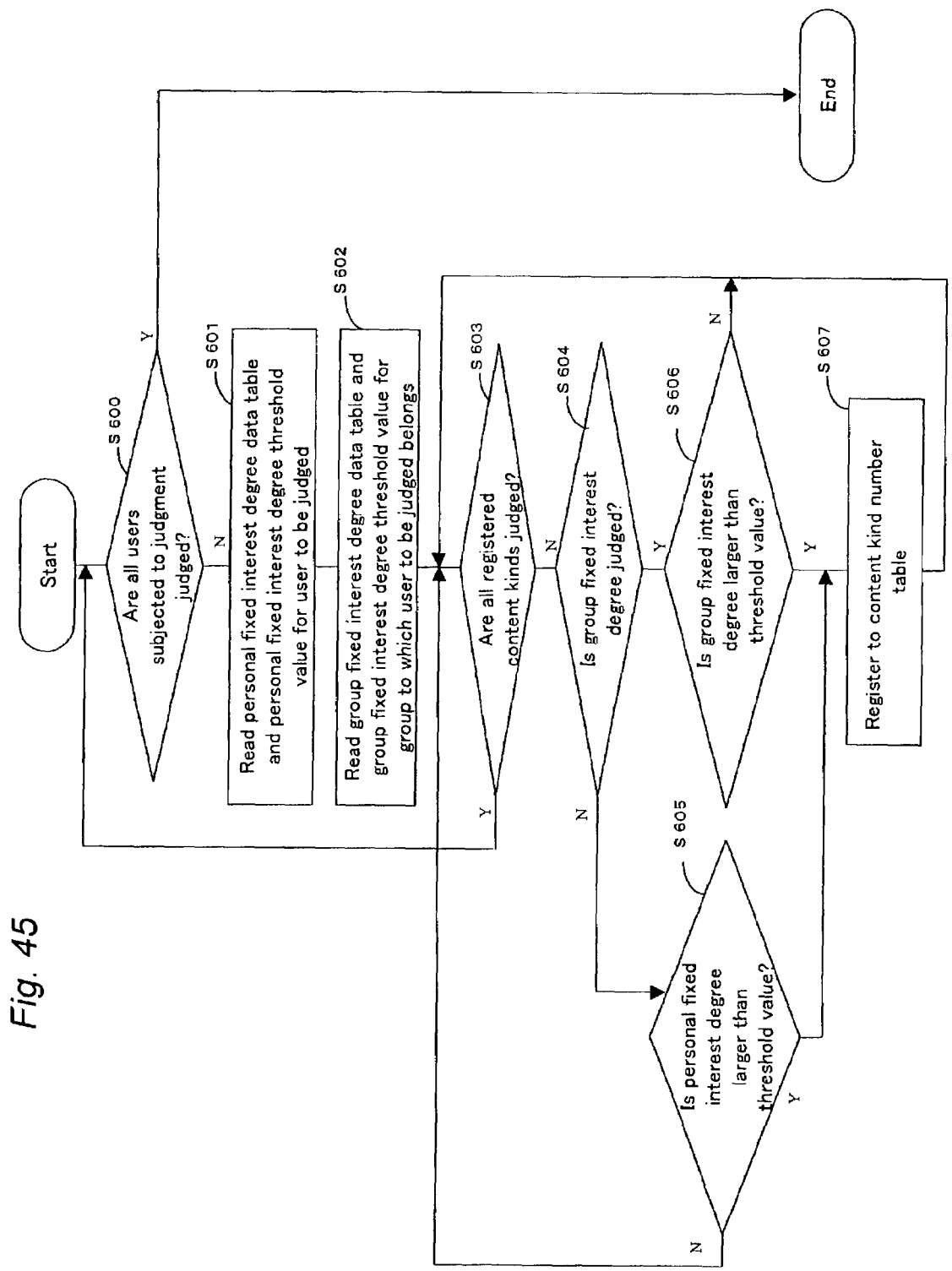
FIG. 45 is a view showing a flowchart indicating a procedure for a content kind judgment.

A procedure for judging the kind of content to be accumulated automatically on the storage (or accumulation) medium connected to the receiving apparatus used by the user A will be described herein. FIG. 45 is a view of a flowchart showing the procedure for judging the kind of content. In FIG. 45, at step S600, judgment starts by determining a user subjected to the judgment at a predetermined timing and on the basis of a predetermined standard. The judgment is carried out until the judgment for all the users to be judged is completed. At step S601, the personal data control section 513 reads the personal fixed interest degree data table for the user A to be judged from the personal fixed interest degree data holding memory 511 and also reads a personal fixed interest degree threshold value (0.5) preset by the personal data control section 513.

At step S602, the group data control section 516 reads a group fixed interest degree threshold value (0.0) from the group fixed interest degree data holding memory 517. This group fixed interest degree threshold value (0.0) is preset by the group fixed interest degree data table for the user A to be judged, shown in FIG. 44, and by the group data control section 516.

At step S603, on the basis of the personal fixed interest degree threshold value determined at step S601 and the group fixed interest degree threshold value determined at step S602, the judgment is carried out until the judgment for all the content kinds registered by the user to be judged and by the group to which the user belongs is completed. At step S604, in the case of the judgment on personal interest degree, the procedure advances to step S605; and in the case of the judgment on group fixed interest degree, the procedure advances to step S606. At step S605, the stored content kind is judged on the basis of the personal fixed interest degree threshold value determined at step S601. At step S606, the accumulated content kind is judged on the basis of the group fixed interest degree threshold value determined at step S602. Then, at step S607, the personal storage content kind judged at step S605 and the group storage content kind judged at step S606 are registered.

Figure 42:
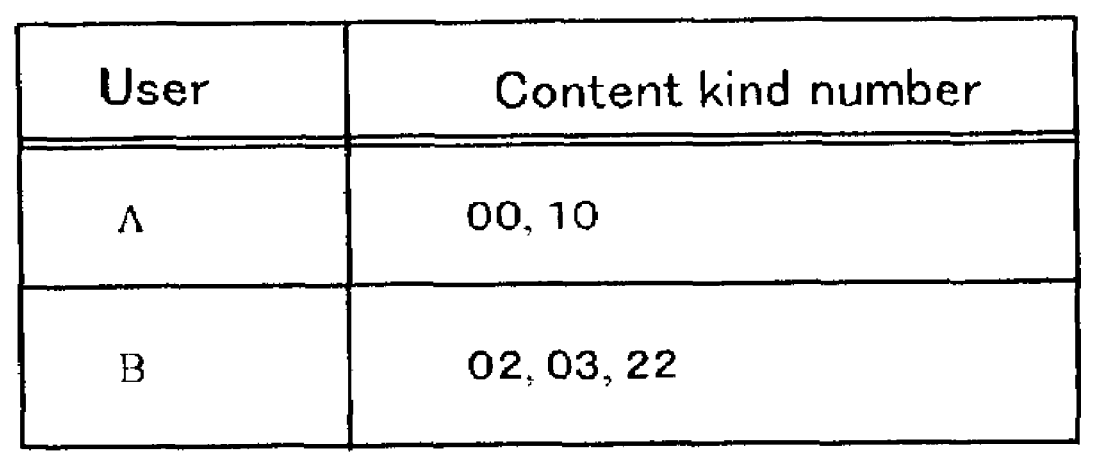

FIG. 42 is a view showing a personal storage content kind number table. The content kind numbers stored in this table are examples of the above-mentioned data identifier. The personal storage content kind number table shown in FIG. 42 shows the result of the judgment according to the personal fixed interest degree threshold value. The numbers of content kinds accumulated for the user A are "00" and "10," and the numbers of content kinds accumulated for the user B are "02," "03" and "22."

Figure 46:
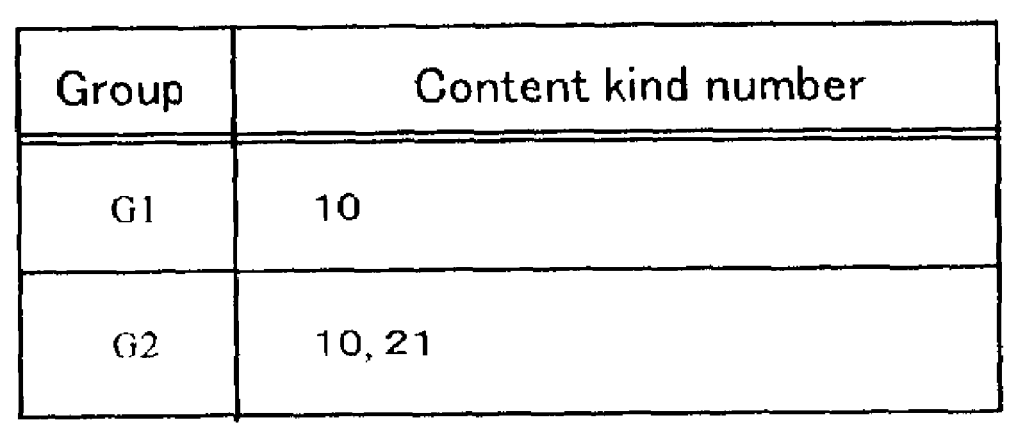

FIG. 46 is a view showing a group storage (or accumulation) content kind number table. As the result of the judgment depending on the group fixed interest degree threshold value, the group storage content kind number table indicates that the content number accumulated (or written) for the group number G1 is "10" and that the content numbers accumulated (or written) for the group number G2 are "10" and "21."

In this way, according to FIG. 42 and FIG. 46, the content kind numbers accumulated with respect to the user A, judged on the basis of the personal fixed interest degree threshold value, are "00" and "10," the content kind number accumulated with respect to the user A, judged on the basis of the group fixed interest degree threshold value, is "10," and the content kind number accumulated for the user A are "00" and "10."

As described above, the contents conforming to the personal fixed interest degrees and the contents conforming to the group fixed interest degrees for plural users can be accumulated on the basis of the judgment by the management apparatus that contents should be recorded automatically in the recording apparatuses used by the users by using the personal fixed interest degree threshold values and the group fixed interest degree threshold values.

In this way, control information including the information of the personal storage content kind number table stored (or kept) on the personal data control section 513, the information of the group storage content kind number table stored (or kept) on the group data control section 516 and the information of the receiving apparatus identification number table managed by the group data control section 516 is delivered to the control information transmission section 521. Furthermore, when controlling a storage identifier designated by a user, the group data control section 516 delivers control information including the storage identifier designated by the user according to the personal fixed interest degree data table to the control information transmission section 521. The control information transmission section 521 gives a notice to the receiving apparatus control information management section 12 of the transmitting apparatus 1 via the telephone line 204, the Internet 201 and the telephone line 205. As described in the above-mentioned first embodiment, the receiving apparatus control information management section 12 determines the content desired to be accumulated automatically on the storage medium connected to the receiving apparatus used by each user, and the transmitting apparatus 1 transmits a broadcast stream 31 with receiving apparatus control information.

Hence, in accordance with this embodiment, a content intended to be used by plural persons can be accumulated automatically for the plural persons who use the content.

In this embodiment, the above-mentioned personal data control section 513 and the above-mentioned group data control section 516 are explained, as an example of the above-mentioned data acquisition regulation storage section. Also, the data acquisition regulation held in the above-mentioned data acquisition regulation storage section is a regulation determined by the following n parameters.

$y_n$ is a regulation determined by expression $f(x_1, x_2, \ldots, x_n)$.

The parameters and expressions for the above-mentioned relational expression in this embodiment are described below.

$y_{an}$ . . . a fixed interest degree for each kind of content for the user A $$f(x_{a1}, x_{a2}, \ldots, x_{an}) = 0.5$$

$$y_{an} \geq f(x_{a1}, x_{a2}, \ldots, x_{an}) \quad \text{(Expression 3-1)}$$

$y_{bn}$, $y_{cn}$, $y_{yn}$ and $y_{zn}$ corresponding to the user B, the user C, the user Y and the user Z are also determined by a regulation similar to (Expression 3-1).

Regulations for calculating fixed interest degrees for content kinds for a group are as described below.

$y_{group00}$ . . . a fixed interest degree for content kind number 00 for a group $x_{group1} = y_{a00}$ . . . a fixed interest degree for content kind number 00 for the user A $x_{group2} = y_{b00}$ . . . a fixed interest degree for content kind number 00 for the user B $x_{group3} = y_{c00}$ . . . a fixed interest degree for content kind number 00 for the user C n=3

$$f(x_{group1}, x_{group2}, \ldots, x_{groupn}) = (y_{a00} + y_{b00} + y_{c00})/n$$

$$y_{group00} = f(x_{group1}, x_{group2}, \ldots, x_{groupn}) \quad \text{(Expression 3-2)}$$

$y_{group01}$, $y_{group02}$, . . . corresponding to the content kind numbers 01, 02, . . . are also calculated by a regulation similar to (Expression 3-2).

The judgment regulation of the fixed interest degree for the content kind of a group is as described below.

$y_{Gn} = y_{groupn}$ . . . a fixed interest degree for each content kind number of a group $$f(x_{G1}, x_{G2}, \ldots, x_{Gn}) = 0.0$$

$$y_{Gn} \geq f(x_{G1}, x_{G2}, \ldots, x_{Gn}) \quad \text{(Expression 3-3)}$$

A regulation similar to (Expression 3-3) applies to the case of other groups.

The above-mentioned relational expression may be anything, provided that it designates a regulation.

This embodiment is just an embodiment, and it is needless to say that other forms for embodying the invention in accordance with the claims are included in the present invention.

Although the personal fixed interest degree threshold value is 0.5 and the group fixed interest degree threshold value is 0.0 in the explanation of the flowchart of FIG. 45, the threshold values are not limited to these values. Even when a user sets desired values, similar effects can be obtained.

An embodiment other than the above-mentioned embodiments can also be attained if it bases on the group fixed interest degree threshold value.

The operation for the above-mentioned storage control in the receiving apparatus may be attained by a program readable by computers, and the program may be distributed as recording media readable by computers.

Fourth Embodiment

Fourth embodiment of the present invention will be described by using FIG. 47 to FIG. 55. Since the overall construction of the transmitting and receiving system is the same as that of the third embodiment shown in FIG. 35, the explanations of the same portions are omitted.

Figure 47:
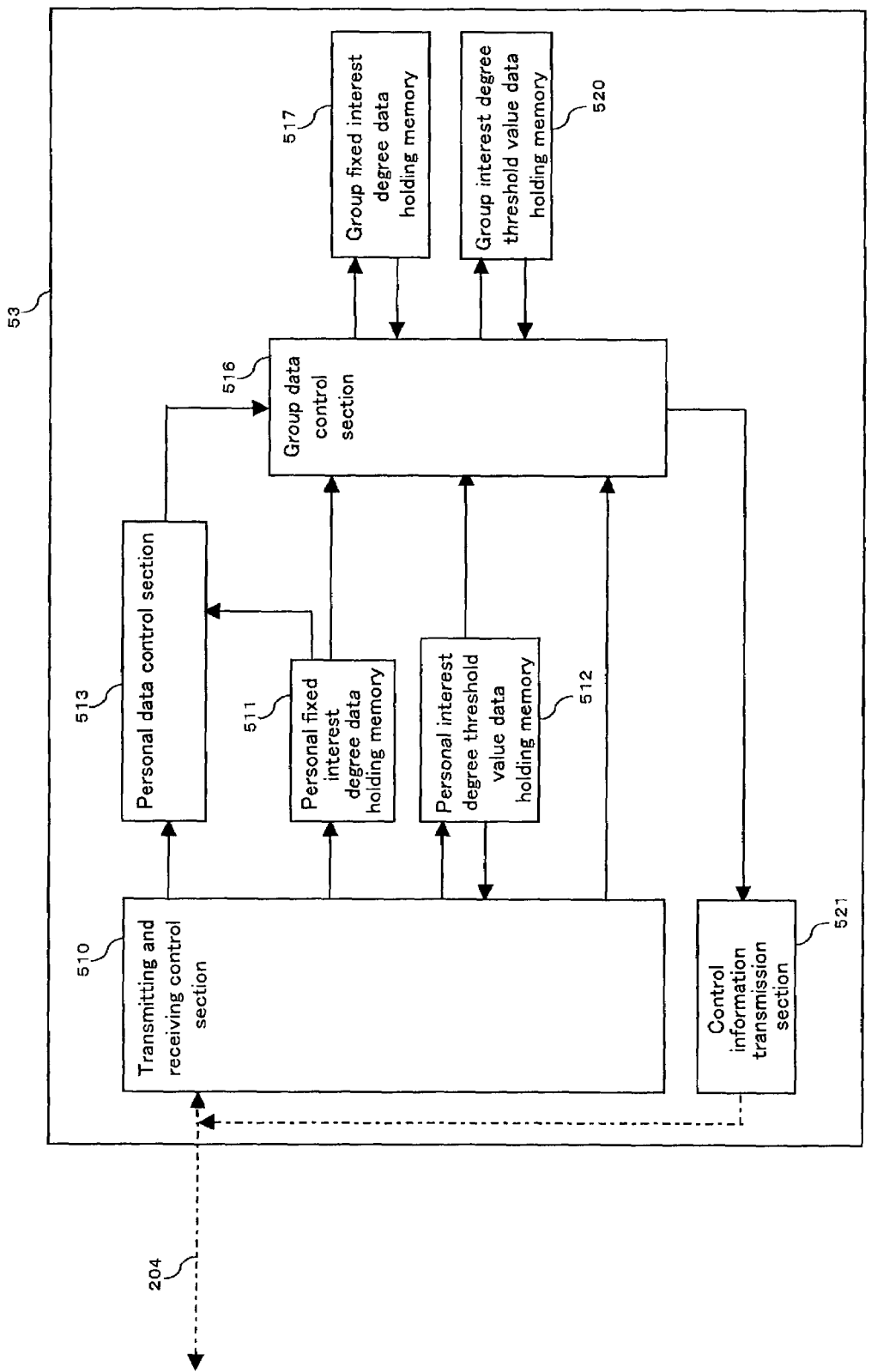
FIG. 47 is a view showing a second construction of the management apparatus in accordance with the fourth embodiment.

FIG. 47 is a view showing a construction of a management apparatus 53. In FIG. 47, the management apparatus 53 comprises a transmitting and receiving control section 510, a personal data control section 513, a personal fixed interest degree data holding memory 511, a group data control section 516, a control information transmission section 521, a group fixed interest degree data holding memory 517, a personal interest degree threshold value data holding memory 512 and a group interest degree threshold value data holding memory 520.

The transmitting and receiving control section 510, the personal data control section 513, the personal fixed interest degree data holding memory 511, the group data control section 516 and the group fixed interest degree data holding memory 517 have the same functions as those of the managing apparatus 52 of FIGS. 35 and 36 used in the explanation of the third embodiment.

As shown in FIG. 35, the transmitting and receiving control section 510 is connected to the receiving apparatus control information management section 12 via the telephone lines and the Internet. The information transmitted from each network apparatus by the operation of each user is received by the transmitting and receiving control section 510 via the telephone lines and the Internet 201.

If the transmitted information is registration information (additional information) for changing the personal interest degree threshold value as explained in FIG. 23, the transmitting and receiving control section 510 transmits the information to the personal data control section 513 and registers the information in the personal interest degree threshold value data table stored on the personal interest degree threshold value data holding memory 512; and if the transmitted information is personal fixed interest degree data, the transmitting and receiving control section 510 accumulates (or writes) the information in the personal fixed interest degree data table stored in the personal fixed interest degree data holding memory 511. Furthermore, the transmitting and receiving control section 510 also stores the storage (or accumulation) identifier designated by a user as registration information on the personal interest degree threshold value data table.

Also, if the transmitted information is group registration information, the transmitting and receiving control section 510 transmits the information to the group data control section 516 as explained in FIG. 36 in the third embodiment. The group data control section 516 registers the information transmitted to the group management data table; and if the transmitted information is group fixed interest degree data, the group data control section 516 accumulates the data on the group fixed interest degree data table stored on the group fixed interest degree data holding memory 517.

Furthermore, if the transmitted information is registration information for changing the group interest degree threshold value, the transmitting and receiving control section 510 transmits the information to the group data control section 516. The group data control section 516 registers the transmitted information in the group interest degree threshold value data table stored on the group interest degree threshold value data holding memory 520.

A method for determining the group interest degree threshold value data will be exemplified herein. The group interest degree threshold value data is used to enhance accuracy in the case of selecting accumulated contents.

In the second embodiment, as shown in FIG. 29, the personal interest degree threshold value is determined by an index to enhance the selection accuracy of the accumulated contents and transmitted to the management apparatus, and the index is registered to the management apparatus; however, in this embodiment, a personal interest degree threshold value is determined by using a common index as an index being common in a group as shown in FIG. 48. Still further, a group interest degree threshold value is determined from the personal interest degree threshold value of a group member.

FIG. 48 is a view showing personal interest degrees depending on common indexes which are registered in the management apparatus by a certain group. In FIG. 48, the common indexes of the certain group, such as "busy," "sleepy," "unhealthy," etc. and the personal interest degree threshold values of a person constituting the group, such as "0.5," "−0.5," "1.0," etc. are managed (or administered or controlled). The managed personal interest degree threshold values are registered as initial values, for example.

Furthermore, by notifying the common indexes to the management apparatus when necessary (for example, everyday) and by renewing the personal interest degree threshold values according to the common indexes, the user A can change the group interest degree threshold value data. This is shown in FIG. 49.

Still further, by registering the common indexes in the management apparatus 53, the user of the receiving apparatus determines what kind of effect is obtained for the personal interest degree threshold values beforehand.

FIG. 49 is a personal interest degree threshold value data table showing the personal interest degree threshold values according to the common indexes at a certain time for the user A. In FIG. 49, the user A shows a personal interest degree threshold value as a value of (1.0) by using a common index of "having no time."

FIG. 50 is a view showing a group interest degree threshold value data table to be stored on the group interest degree threshold value data holding memory 520 shown in FIG. 47. The group data control section 516 stores the group interest degree threshold value data table in the group interest degree threshold value data holding memory 520 on the basis of the group management table, which is managed by itself, from the personal interest degree threshold value data table according to the common indexes stored on the personal interest degree threshold value data holding memory 512, and it carries out management. The group interest degree threshold value data table shows that the personal interest degree threshold value data of all the users belonging to the group G1 is formed from the personal interest degree threshold value data table. In the group interest degree threshold value data table, the interest degree threshold value according to a common index of "having no time" is indicated as "1.0" for the user A, and the interest degree threshold value according to a common index "busy" is indicated as "0.5" for the user B. Furthermore, in the group interest degree threshold value data table, the interest degree threshold value for a common index "lonely" is indicated as "−0.5" for the user C. In this way, the table shows the interest degrees according to the common indexes for the persons belonging to the group.

FIG. 52 is a view showing the personal interest degree threshold value for a user belonging to the group G1. In FIG. 52, the personal interest degree threshold value for the user A is calculated from the total of the interest degree data for the respective common indexes shown in FIG. 49, and the view indicates that the result is "1.0." Also, FIG. 53 is a view showing a group interest degree threshold value. The group interest degree threshold value shown in FIG. 53 is calculated from the total of the interest degree data for each user according to the group interest degree threshold value data table, and further calculated from the total for all the users. FIG. 53 indicates the total of the personal interest degree threshold value "1.0" for the user A, the interest degree threshold value "0.5" for the user B and the interest degree threshold value "−0.5" for the user C.

Figure 51:
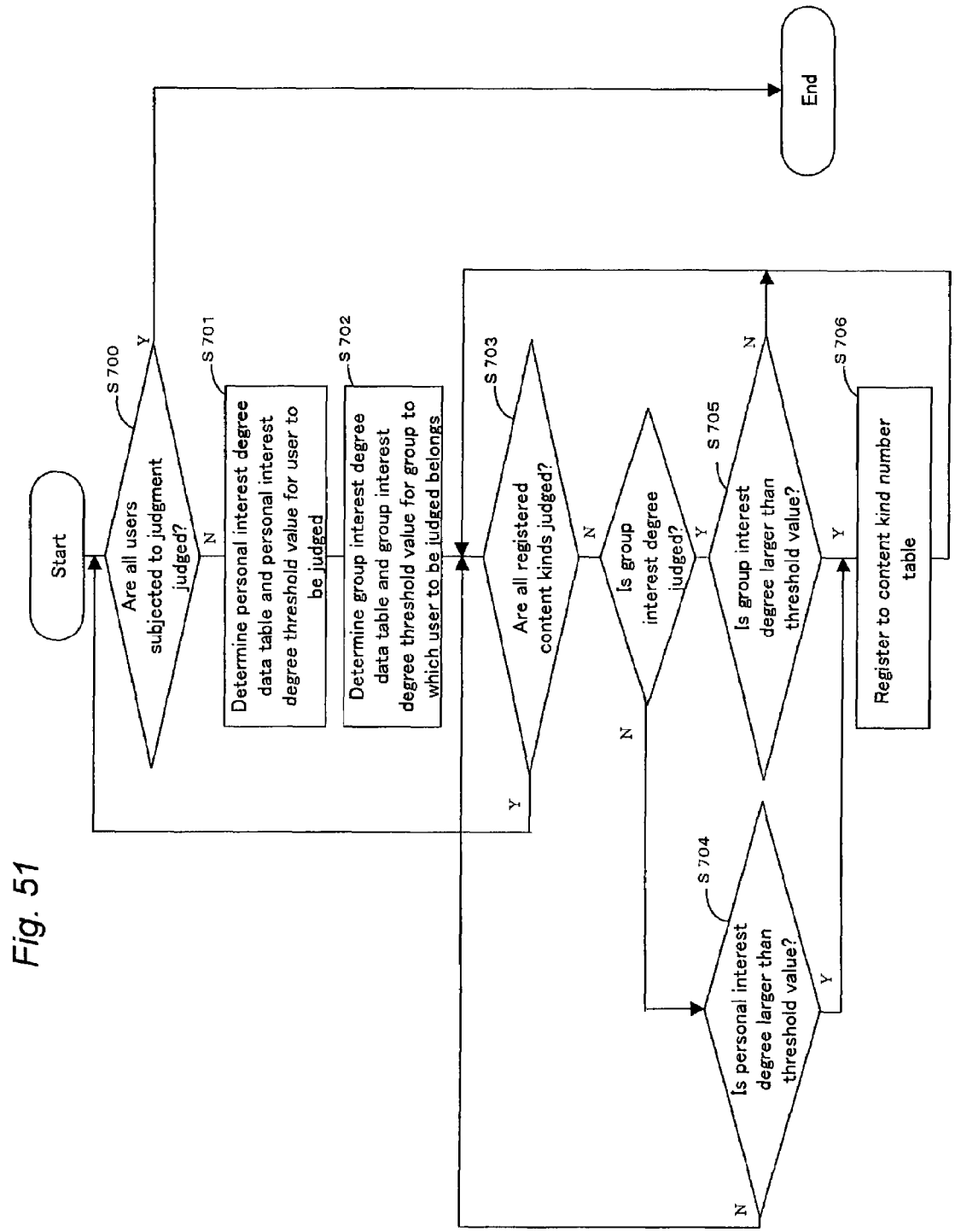
FIG. 51 is a view showing a flowchart indicating a procedure for content kind judgment.
Figure 57:
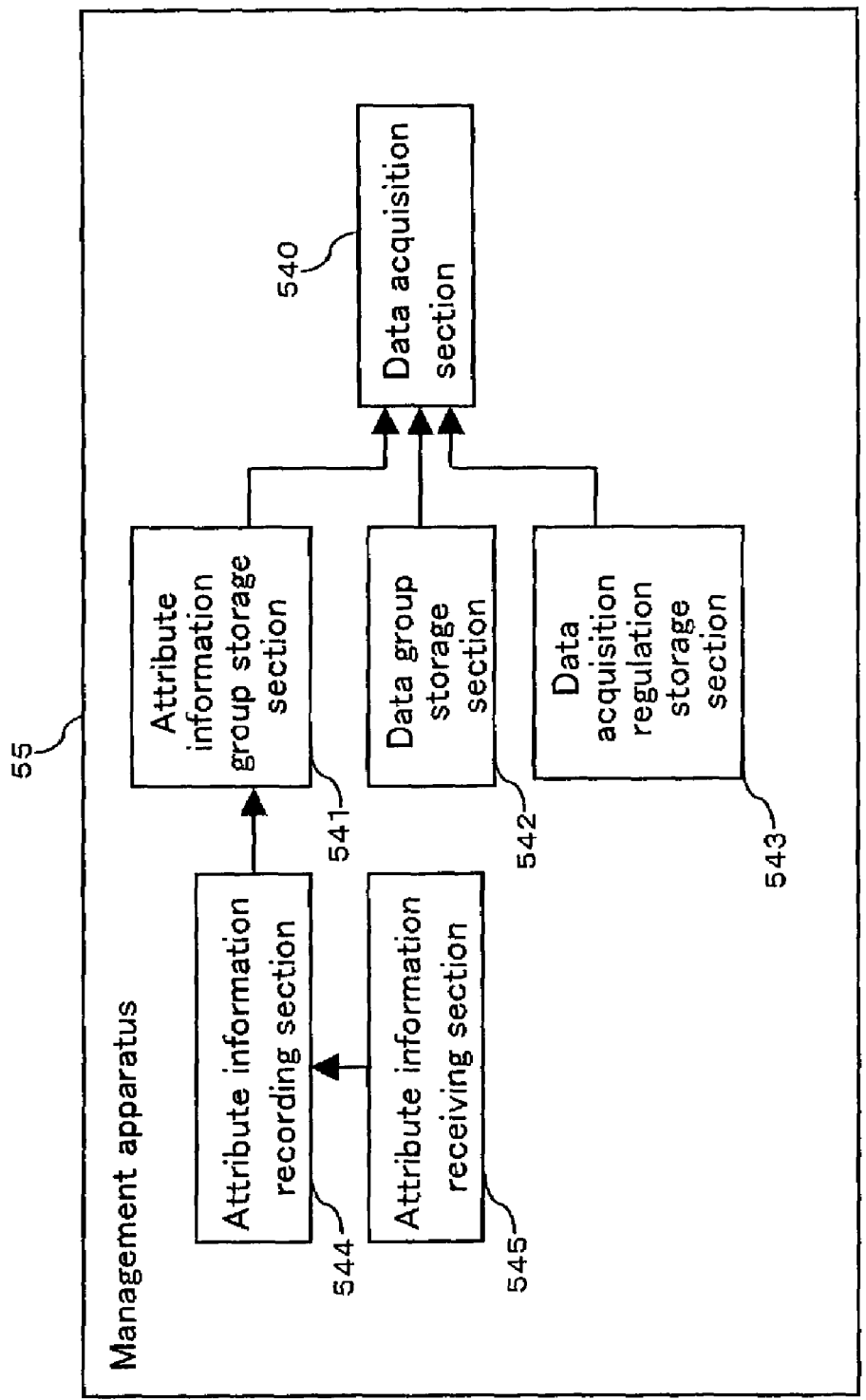
FIG. 57 is a view showing the basic construction of a modification of the management apparatus shown in FIG. 56.

FIG. 51 and FIG. 57 are flowcharts showing procedures for storage judgment (or accumulation determination) on the kind of content. In FIG. 51, at a predetermined timing, a user to be judged is determined on the basis of a predetermined standard and judgment starts. The judgment is carried out until the judgment for all the users to be judged is completed.

At step S701, a personal interest degree threshold value according to a common index is calculated from the personal interest degree threshold value data table according to the common indexes. At step S702, a group interest degree threshold value is calculated from the group interest degree threshold value data table. At step S700, storage judgment continues until the judgment for all the users constituting a group is completed. At step S703, the storage judgment for a content registered in the personal fixed interest degree data table of FIG. 40, described in the third embodiment, continues until all the contents are judged.

At step S704, the interest degree for a content registered in the personal fixed interest degree data table of FIG. 40, described in the third embodiment, is compared with the personal interest degree threshold value according to the common index shown in FIG. 52. Then, at step S704, judgment is made as to whether the interest degree for the content is larger than the personal interest degree threshold value. If the interest degree is larger, the procedure shifts to step S706; on the other hand, if not, the procedure shifts to step S703, and judgment for the next content having been registered is carried out. At step S706, the kind number of the content judged so as to be accumulated is stored on the personal storage content kind data table shown in FIG. 54.

At step S705, the interest degree for a content registered in the group fixed interest degree data table of FIG. 44, described in the third embodiment, is compared with the group interest degree threshold value shown in FIG. 53. A judgment is made as to whether the interest degree for the content is larger than the group interest degree threshold value. If the interest degree is larger, the procedure shifts to step S706 on the other hand; if not, the procedure shifts to step S703, and judgment for the next content having been registered is carried out. At step S706, the kind number of the content judged so as to be accumulated is stored on the group storage (or accumulation) content kind data table shown in FIG. 55.

In this embodiment, the above-mentioned personal data control section 513 and the above-mentioned group data control section 516 are explained as an example of the above-mentioned data acquisition regulation storage section. Also, the data acquisition regulation held in the above-mentioned data acquisition regulation storage section is a regulation determined by the following n parameters.

$y_n$ is a regulation determined by an expression $f(x_1, x_2, \ldots, x_n)$.

The parameters and expressions for the above-mentioned relational expression in this embodiment are described below.

$y_{an}$ ... a fixed interest degree for each kind of content for the user A $x_{a1}$ ... an interest degree threshold value for "busy"
$x_{a2}$ ... an interest degree threshold value for "sleepy"
$x_{a3}$ ... an interest degree threshold value for "unhealthy"
$x_{a4}$ ... an interest degree threshold value for "tired"
$x_{a5}$ ... an interest degree threshold value for "no time"
$x_{a6}$ ... an interest degree threshold value for "no money"
$x_{a7}$ ... an interest degree threshold value for "very poor"
$x_{a8}$ ... an interest degree threshold value for "wishing to have a holiday"
$x_{a9}$ ... an interest degree threshold value for "lonely"
n ... 9

$$f(x_{a1}, x_{a2}, \ldots, x_{an}) = (x_{a1} + \ldots + x_{an})$$

$$y_{an} \geq f(x_{a1}, x_{a2}, \ldots, x_{an}) \quad \text{(Expression 4-1)}$$

$y_{bn}$, $y_{cn}$, $y_{yn}$ and $y_{zn}$ corresponding to the user B, the user C, the user Y and the user Z are also determined by a regulation similar to (Expression 4-1).

Regulations for calculating fixed interest degrees for content kinds for a group are as described below.

$y_{group00}$ ... a fixed interest degree for content kind number 00 for a group $x_{group1} = y_{a00}$ ... a fixed interest degree for content kind number 00 for the user A $x_{group2} = y_{b00}$ ... a fixed interest degree for content kind number 00 for the user B $x_{group3} = y_{c00}$ ... a fixed interest degree for content kind number 00 for the user C n=3

$$f(x_{group1}, x_{group2}, \ldots, x_{groupn}) = (y_{a00} + y_{b00} + y_{c00})/n$$

$$y_{group00} = f(x_{group1}, x_{group2}, \ldots, x_{groupn}) \quad \text{(Expression 4-2)}$$

$y_{group01}$, $y_{group02}$, ... corresponding to the content kind numbers 01, 02, ... are also calculated by a regulation similar to (Expression 4-2).

The judgment regulation of the fixed interest degree for the content kind of a group is as described below.

$y_{Gn} = y_{groupn}$ ... a fixed interest degree for each content kind number of a group $x_{a1}$ ... an interest degree threshold value for "busy"
$x_{a2}$ ... an interest degree threshold value for "sleepy"
$x_{a3}$ ... an interest degree threshold value for "unhealthy"
$x_{a4}$ ... an interest degree threshold value for "tired"
$x_{a5}$ ... an interest degree threshold value for "no time"
$x_{a6}$ ... an interest degree threshold value for "no money"
$x_{a7}$ ... an interest degree threshold value for "very poor"
$x_{a8}$ ... an interest degree threshold value for "wishing to have a holiday"
$x_{a9}$ ... an interest degree threshold value for "lonely"

$x_{b1}$ to $x_{b9}$ and $x_{c1}$ to $x_{c9}$ are the interest degree threshold values according to the respective common indexes for each person, just as in the case of the user A.

m ... 9

$$f(x_{a1}, \ldots, x_{am}, x_{b1}, \ldots, x_{bm}, x_{c1}, \ldots, x_{cm})$$

$$= (x_{a1} + \ldots + x_{am} + x_{b1} + \ldots + x_{bm} + x_{c1} + \ldots + x_{cm})$$

$$y_{Gn} \geq f(x_{a1}, \ldots, x_{am}, x_{b1}, \ldots, x_{bm}, x_{c1}, \ldots, x_{cm}) \quad \text{(Expression 4-3)}$$

A regulation similar to (Expression 4-3) also applies to the case of other groups.

The above-mentioned relational expression may be anything, provided that it designates a regulation.

As described above, by using the personal interest degree threshold values corresponding to daily changing living environments according to the common indexes of each user and by using the group interest degree threshold values for a group to which the user belongs, judgment is made as to whether contents should be accumulated automatically on storage (or accumulation) media. Hence, the contents conforming to the personal interest degrees and the living environments and the contents conforming to the group interest degrees for plural users can be stored.

In this way, control information including the information of the personal storage content kind number table formed by the personal data control section 513, the information of the group storage content kind number table formed by the group data control section 516 and the information of the receiving apparatus identification number table managed by itself is delivered to the control information transmission section 521, and the control information transmission section 521 gives a notice to the receiving apparatus control information management section 12 of the transmitting apparatus 1 via the telephone line 204, the Internet 201 and the telephone line 205. The receiving apparatus control information management section 12 determines the content desired to be accumulated automatically on the storage medium connected to the receiving apparatus used by each user, and the transmitting apparatus 1 transmits a broadcast stream 31 with receiving apparatus control information.

Furthermore, the control information including the storage (or accumulation) identifier designated by a user according to the personal fixed interest degree data table of FIG. 41 in the third embodiment is delivered to the control information transmission section 521, whereby the storage (or accumulation) medium can be designated and controlled on the transmission side.

As described above, in accordance with the fourth embodiment of the present invention, at the time of selecting a content to be accumulated automatically on a storage medium, it is possible to allow the content kind selection standard to accurately follow changes in taste owing to the effect of daily living environments of a user; and it is thus possible to carry out content judgment by more strongly reflecting the current interest degree and content request degree of the user in comparison with the case wherein a content to be accumulated automatically is judged on the basis of the unchanged fixed attribute standard (the personal fixed interest degree data).

Furthermore, video/audio contents and other data contents to be accumulated are not limited to personal uses, but in some cases when used by plural persons they are used more effectively as contents for the unification of topics of conversation. Considering such cases, an effect that one content can be used effectively by plural persons is attained.

As described above, in accordance with the fourth embodiment of the present invention, by simultaneously accumulating contents on entertainment, such as movies, music and dramas, it is possible to unify topics of conversation among grouped users; furthermore, by simultaneously accumulating contents on auctions, games amongst opponents, etc., it is possible to easily realize the original purposes of the contents. Still further, in the case of contents on shopping, a user of the receiving apparatus in a group gives a notice that the user has ordered a commodity via a accumulated content and that he/she has been fully satisfied, to a user of another receiving apparatus. The user, of the receiving apparatus, having received the notice is stimulated and tries to order a similar commodity. Since the contents on shopping have already been stored (or kept) at this time on the storage medium connected to the receiving apparatus to be used by the receiving apparatus user, the user can place an order immediately. For example, a guide advertisement for a group tour is a typical example of this.

A method for determining storage for the user A was explained in the embodiment of the present invention; likewise, storage is possible in a similar way for the user B, the user C, the user Y and the user Z. Furthermore, in FIG. 35, a group is formed of six persons: the user A, the user B, the user C, the user Y and the user Z; and a similar embodiment can be attained regardless of the number of users.

Also, the operation for storage (or accumulation) control in the receiving apparatus described above may be realized by a program readable by computers, and the program may be delivered via recording media readable by computers.

In the explanations of the second, third and fourth embodiments of the present invention, contents (hereafter referred to as data) are managed in the receiving apparatus 1; however, the present invention is not limited to this. Data may be managed on the side of the management apparatus 51 (52, 53).

Embodiments in this case will be described by using FIGS. 56, 57 and 58.

Figure 56:
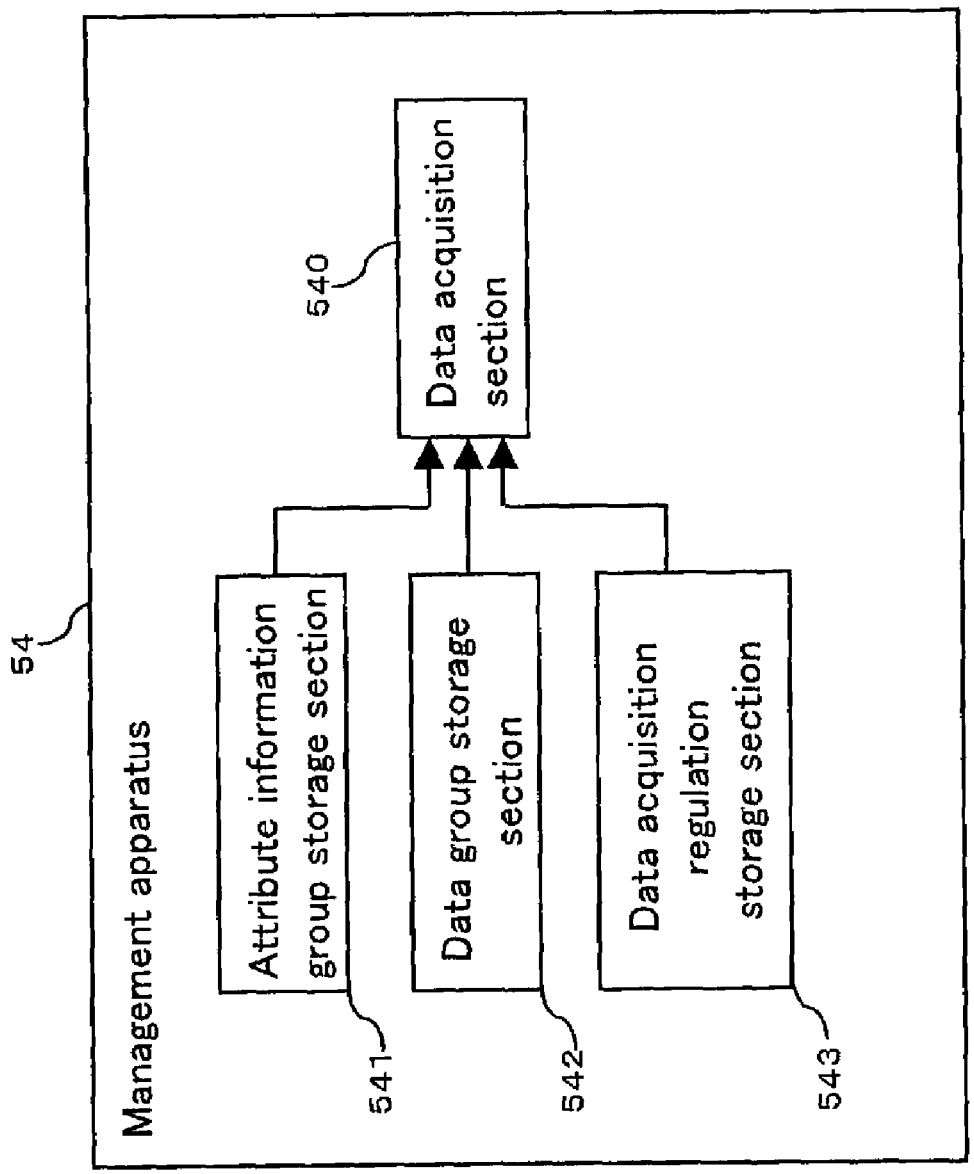
FIG. 56 is a view showing a third construction of the management apparatus in accordance with the fourth embodiment.

In the attribute information group storage section 541 of a management apparatus 54 shown in FIG. 56, test marks of plural persons are accumulated as personal attribute information values. In addition, on the basis of a regulation held in the data acquisition regulation storage section 543 of the management apparatus 54, the data acquisition section 540 of the management apparatus 54 acquires problems held in the data group storage section 542 of the management apparatus 54. At this time, a regulation stored on data acquisition regulation storage section 543 is used as a regulation wherein 100 full-mark tests are managed at intervals of 10 points. Furthermore, as problems to be held in the data group storage section 542, ten kinds of problems are prepared for each subject. The ten kinds of problems are managed in accordance with marks at intervals of 10 points. Hence, it is possible to acquire problems (data) on the basis of test points used as personal attributes. Furthermore, it is possible to cope with the case when personal attribute information changes (when tests are performed many times) by adding a function for renewing the attribute information values in the management apparatus 54 shown in FIG. 56.

In an management apparatus 55 shown in FIG. 57, an attribute information recording section 544 for renewing the test points (attribute information values) stored on the attribute information group storage section 541 and an attribute information receiving section 545 for receiving new test points are added to the management apparatus 54 shown in FIG. 56. Hence, by receiving points at the management apparatus 55 each time a test is performed, the data acquisition section 540 can acquire a problem corresponding to the points.

Figure 58:
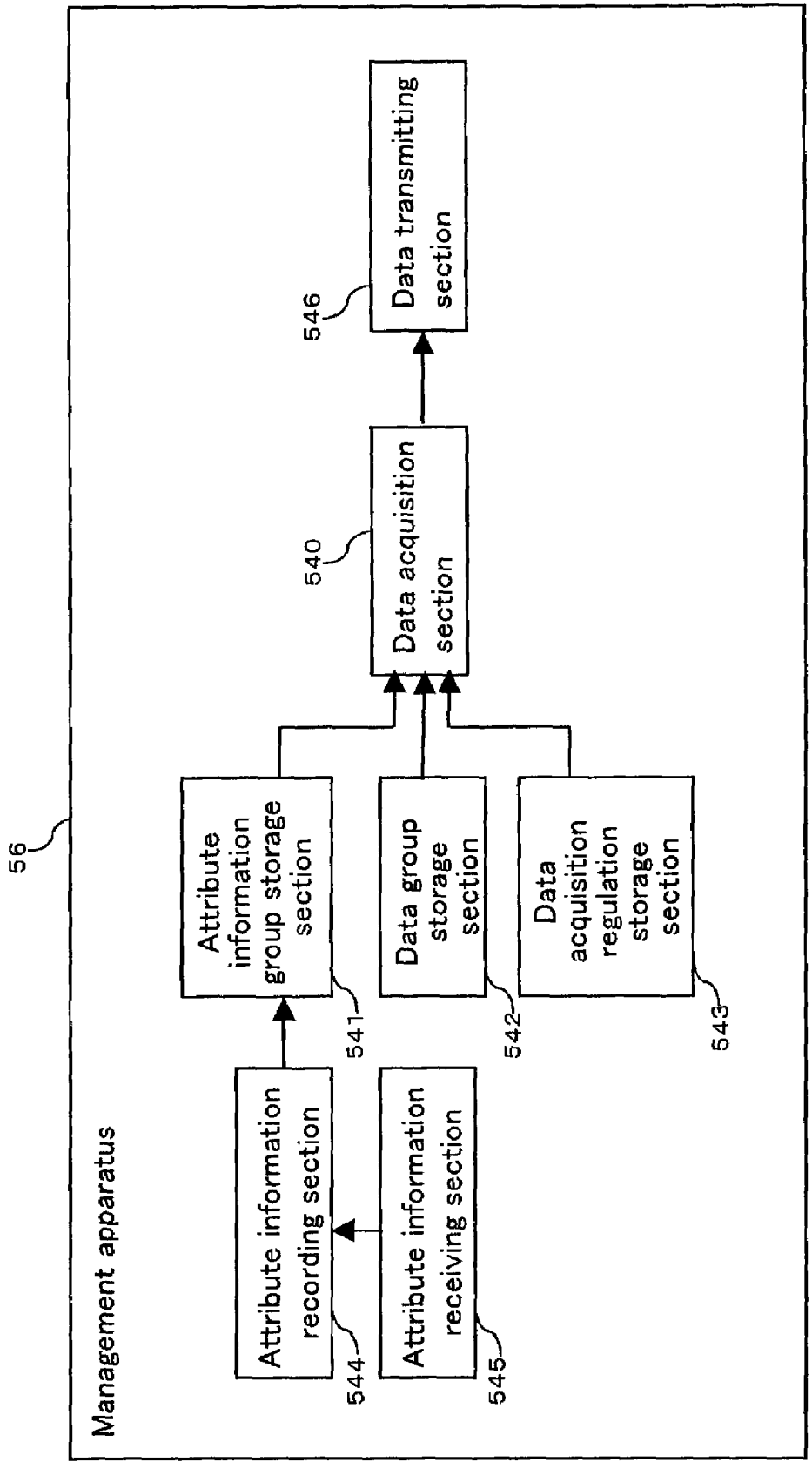
FIG. 58 is a view showing the basic construction of a modification of the management apparatus shown in FIG. 57.

Furthermore, in order to transmit problems (data) to be acquired by the data acquisition section 540 from the management apparatus, a data transmitting section 546 is added as shown in a management apparatus 56 of FIG. 58. Hence, each time a test is performed, a problem corresponding to points can be acquired and transmitted.

Furthermore, in order to receive a problem corresponding to test points, a terminal identifier for identifying the terminal to be used by a person is received at the above-mentioned attribute information receiving apparatus section 545. The received terminal identifier is held together with the points in the attribute information group storage section 541. The data transmitting section 546 transmits problems (data) to the terminal indicated by the above-mentioned terminal identifier. Hence, the person can receive a problem corresponding to the points each time a test is performed.

As described above, data can be managed and transmitted by the management apparatus.

Furthermore, data can be transmitted to the members constituting a group by managing the group as described in the third and fourth embodiments.

Figure 55:
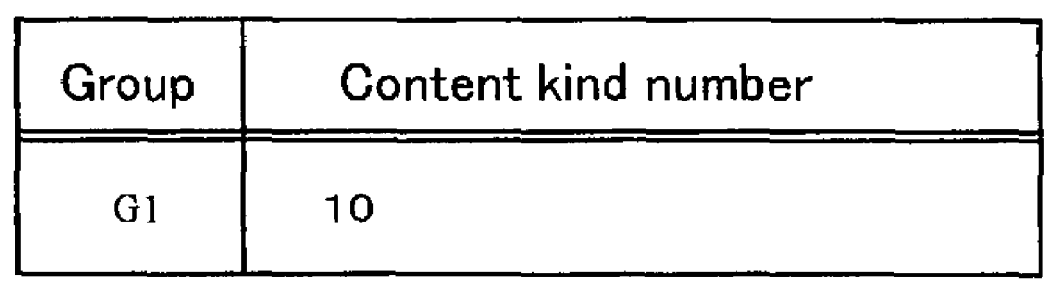
Figure 62:
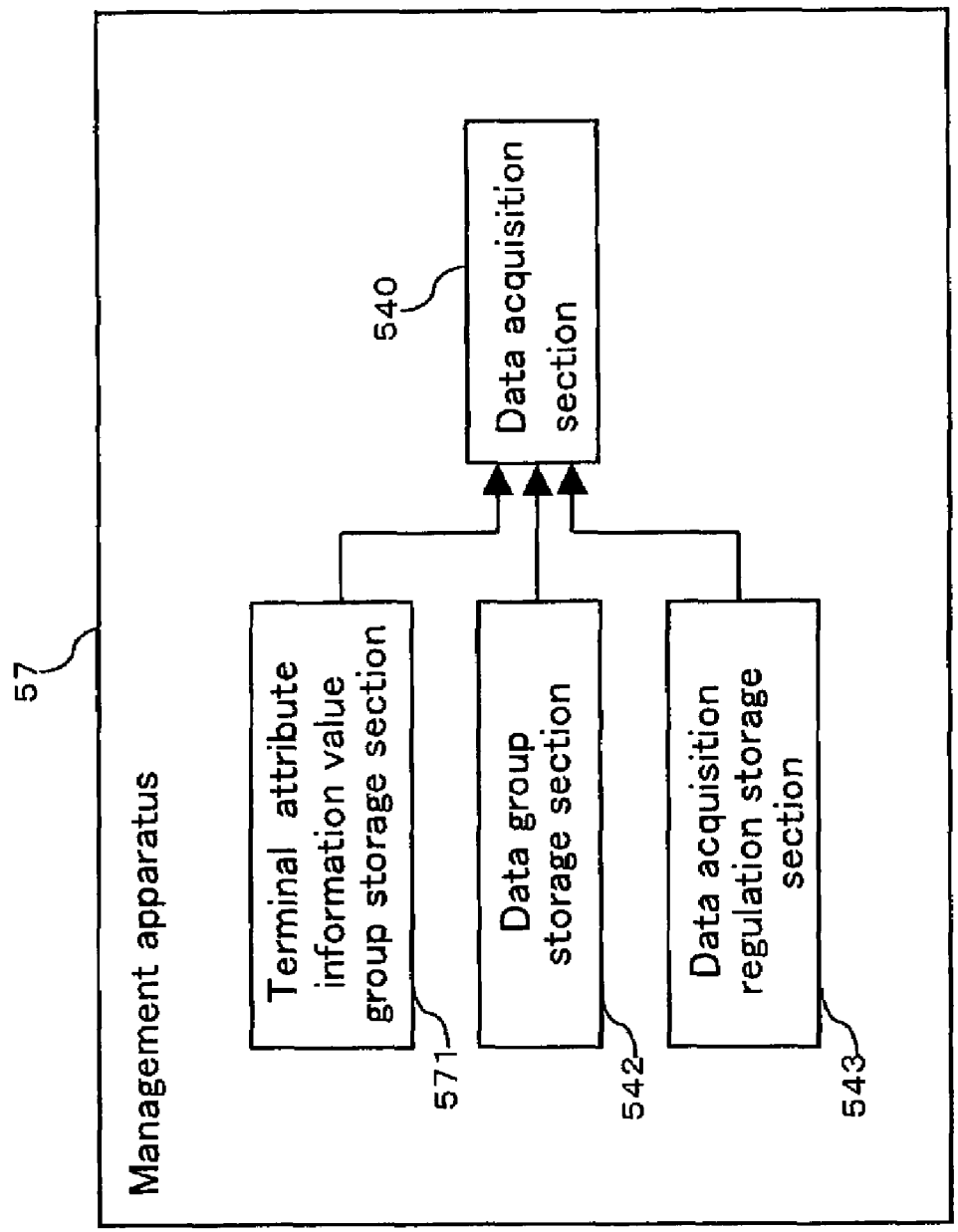
FIG. 62 is a view showing a fourth construction of the management apparatus in accordance with the fourth embodiment.

The management apparatus 57 shown in FIG. 62 has a terminal attribute information group storage section 571 instead of the attribute information group storage section 541 of the management apparatus 54 shown in FIG. 55. The terminal attribute information group storage section 571 manages terminals as a group. In addition, the terminal attribute information group storage section 571 manages a group in relation to attribute information.

Figure 63:
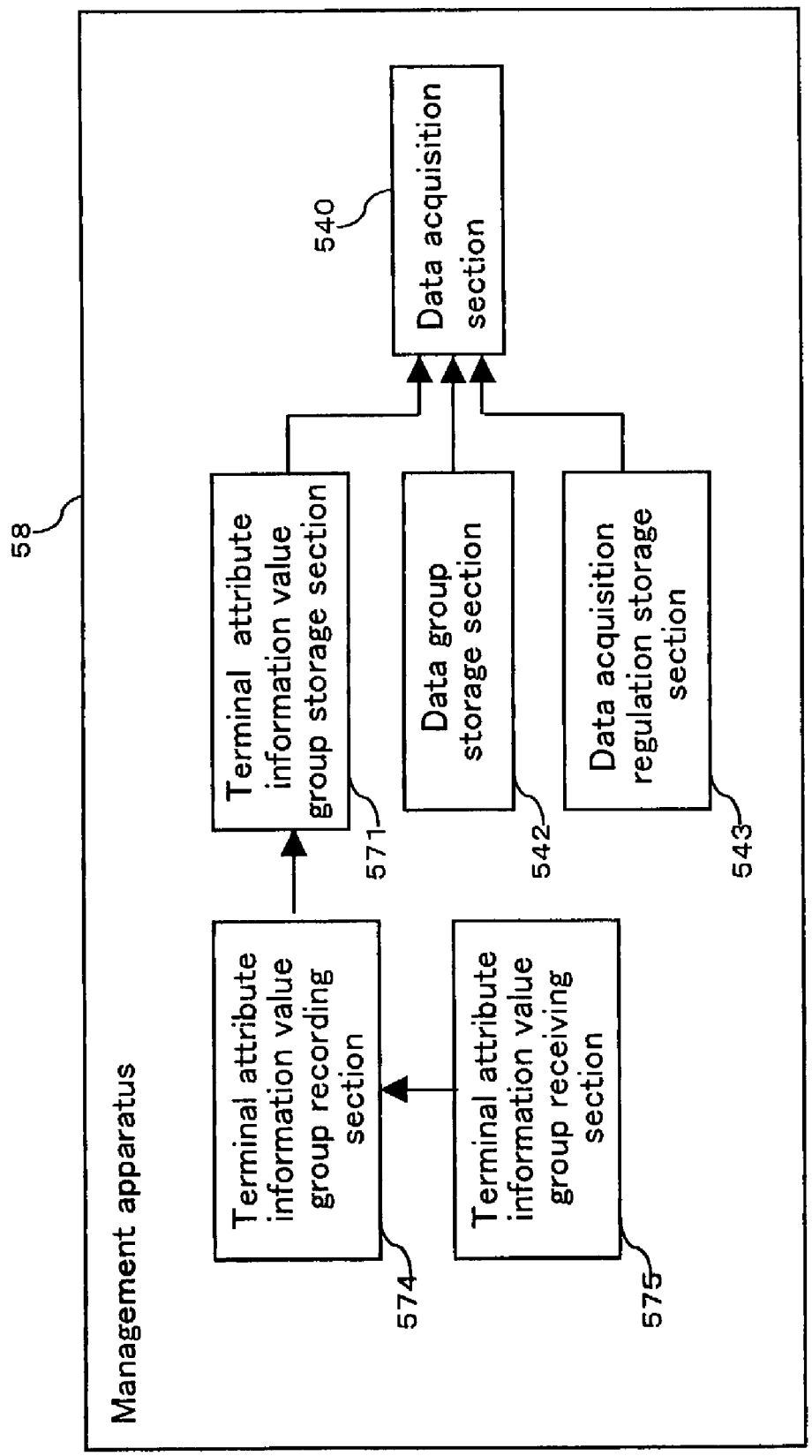
FIG. 63 is a view showing the basic construction of a modification of the management apparatus shown in FIG. 62.

The management apparatus 58 shown in FIG. 63 has a terminal attribute information group recording section 574 instead of the attribute information recording section 544 of the management apparatus 55. The terminal attribute information group recording section 574 renews attribute information managed as a group.

Figure 64:
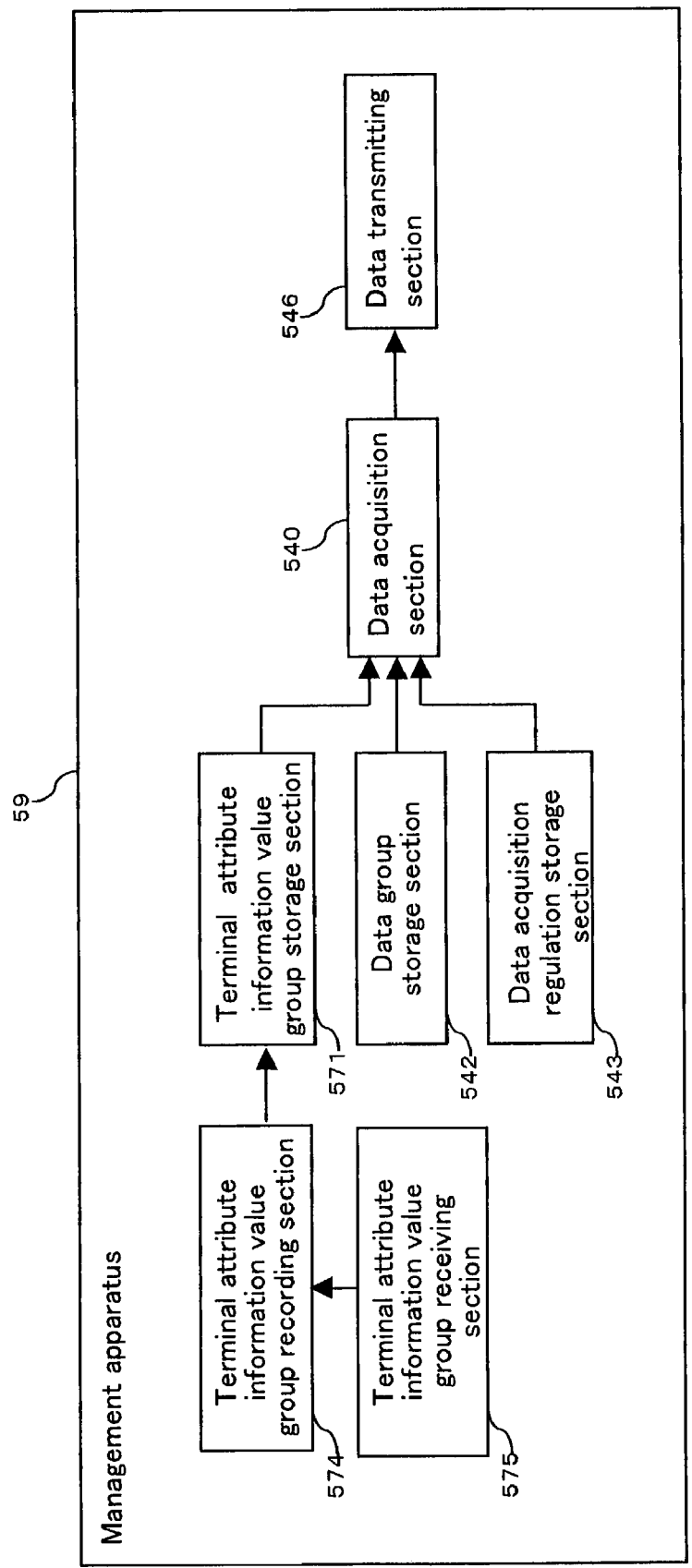
FIG. 64 is a view showing the basic construction of a modification of the management apparatus shown in FIG. 63.

The management apparatus 59 shown in FIG. 64 has a terminal attribute information group receiving section 575 instead of the attribute information receiving section 545 of the management apparatus 56. The terminal attribute information group receiving section 575 receives attribute information from terminals managed as a group. In addition, the terminal attribute information group receiving section 575 also receives terminal identifiers for identifying terminals and therefore can automatically transmit data to the members in the group as described in the third and fourth embodiments.

At this time, the terminal identifier may identify not only a terminal but also the user of the terminal, and may identify a place where the terminal is installed.

Furthermore, it may be possible to transmit not only data but also a terminal identifier as data to the terminal indicated by the terminal identifier. As a result, it is possible to recognize on the terminal side which terminal has received what kind of data.

Figure 65:
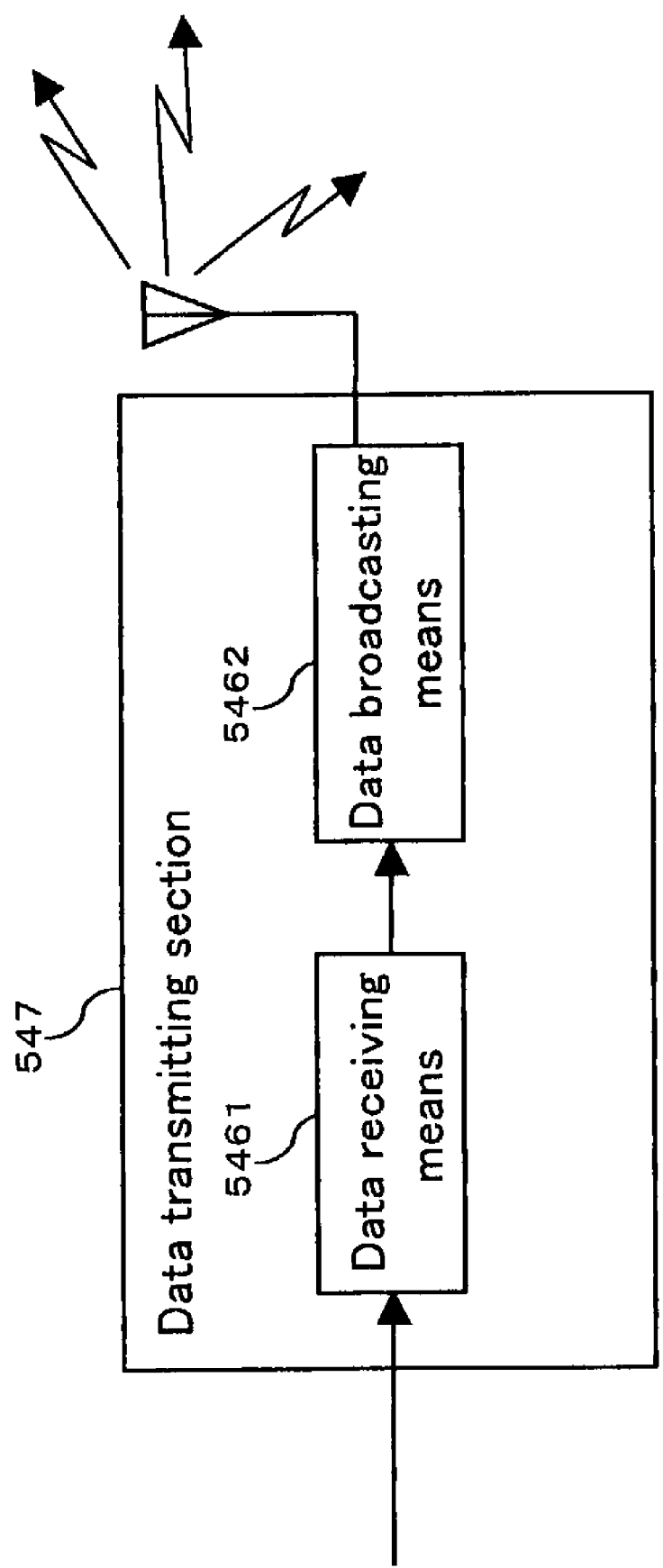
FIG. 65 is a view showing a modification of the data transmitting section of the management apparatuses shown in FIGS. 58 and 64.

The data transmitting section 547 shown in FIG. 65 is a modification of the data transmitting section 546 of the management apparatus 59. The data transmitting section 547 has a data receiving means 5461 for receiving data and terminal identifiers from the data acquisition section 540 of the management apparatus 59. The data transmitting section 547 has a data broadcasting section 5462 for broadcasting the received data and terminal identifiers in relation to each other. As a result, the management apparatus can function as a broadcasting apparatus.

Figure 59:
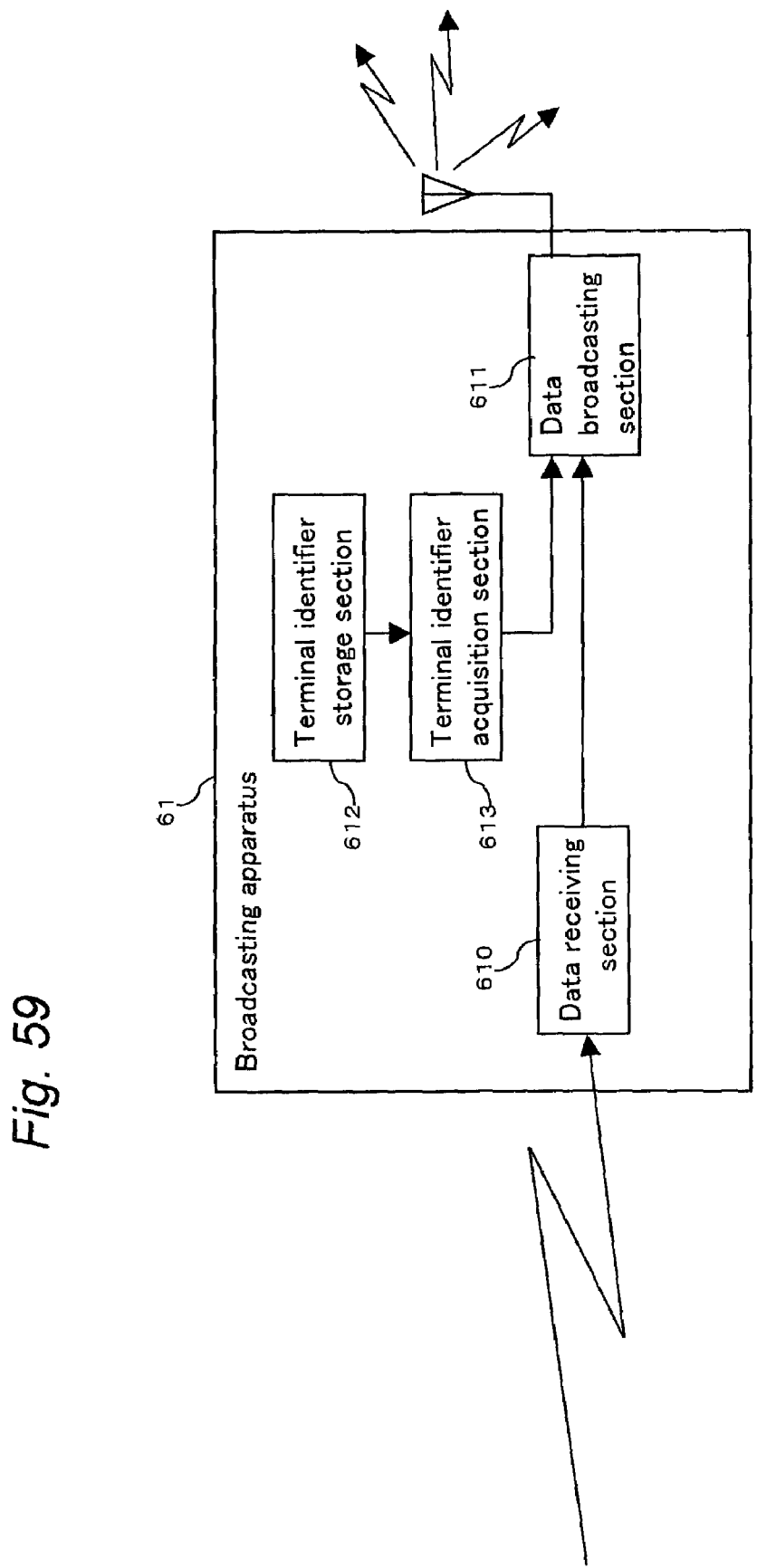
FIG. 59 is a view showing a second construction of the broadcasting apparatus in accordance with the fourth embodiment.

The broadcasting apparatus 61 shown in FIG. 59 has a data receiving section 610 for receiving data transmitted by the management apparatus 56. The broadcasting apparatus 61 also has a terminal identifier storage section 612 for holding terminal identifiers for identifying terminals and a terminal identifier acquisition section 613 for acquiring terminal identifiers from the terminal identifier storage section 612. Therefore, the received data and terminal identifiers can be broadcast in relation to each other from a data broadcasting section 611. This realizes functions similar to those realized by the cooperation of the management apparatus and the transmitting apparatus described in the first, second, third and fourth embodiments.

Figure 60:
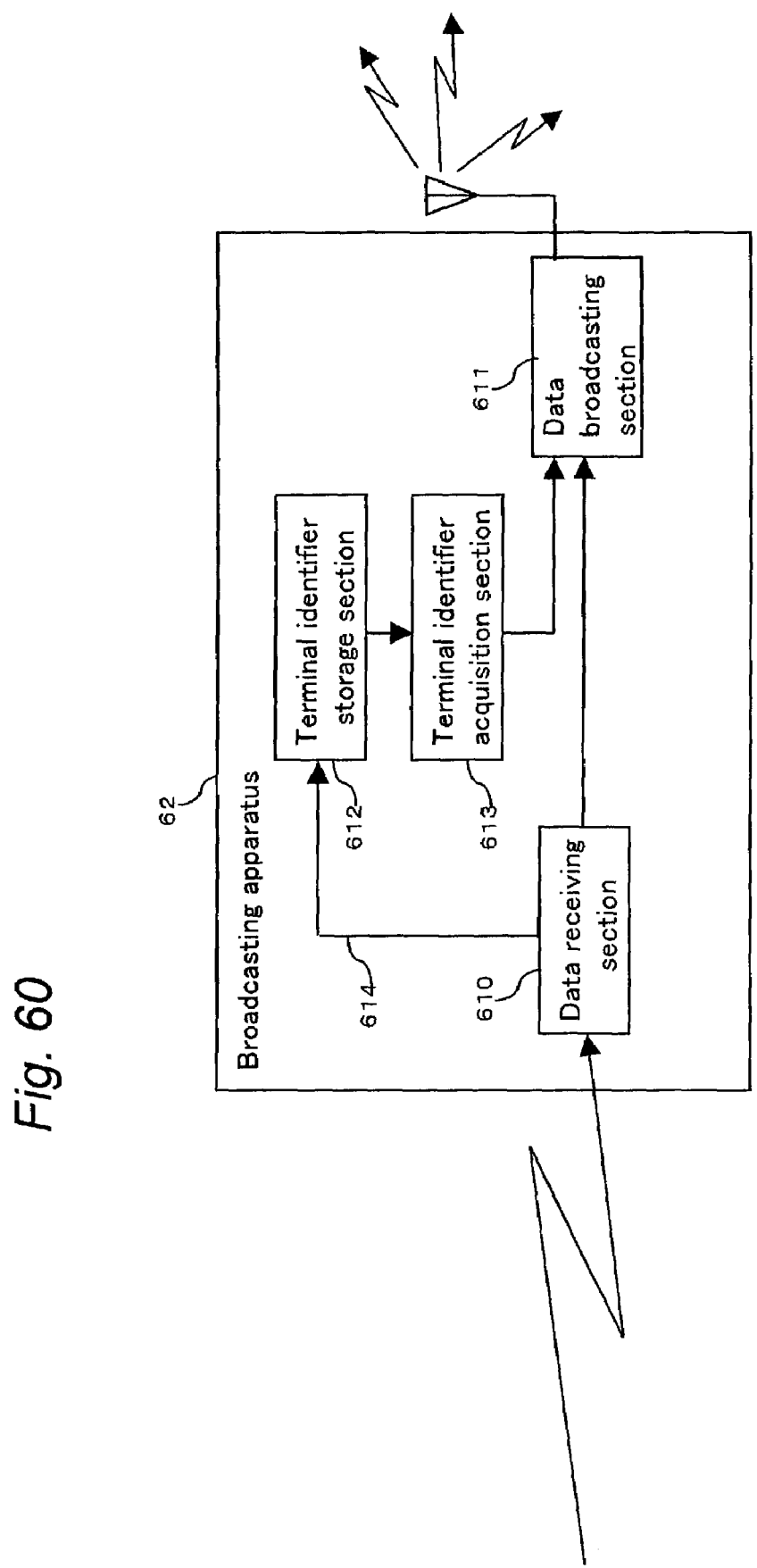
FIG. 60 is a view showing the basic construction of a modification of the broadcasting apparatus shown in FIG. 59.

Furthermore, when the management apparatus 56 shown in FIG. 58 transmits terminal identifiers together with data, the received terminal identifiers are stored on the terminal identifier storage section 612 via the passage 614 of the broadcasting apparatus 62 shown in FIG. 60. Hence, on the basis of the group formation managed by the management apparatus 56, it is possible to broadcast data to the members. This also realizes functions similar to those realized by the cooperation of the management apparatus and the transmitting apparatus described in the first, second, third and fourth embodiments.

Figure 61:
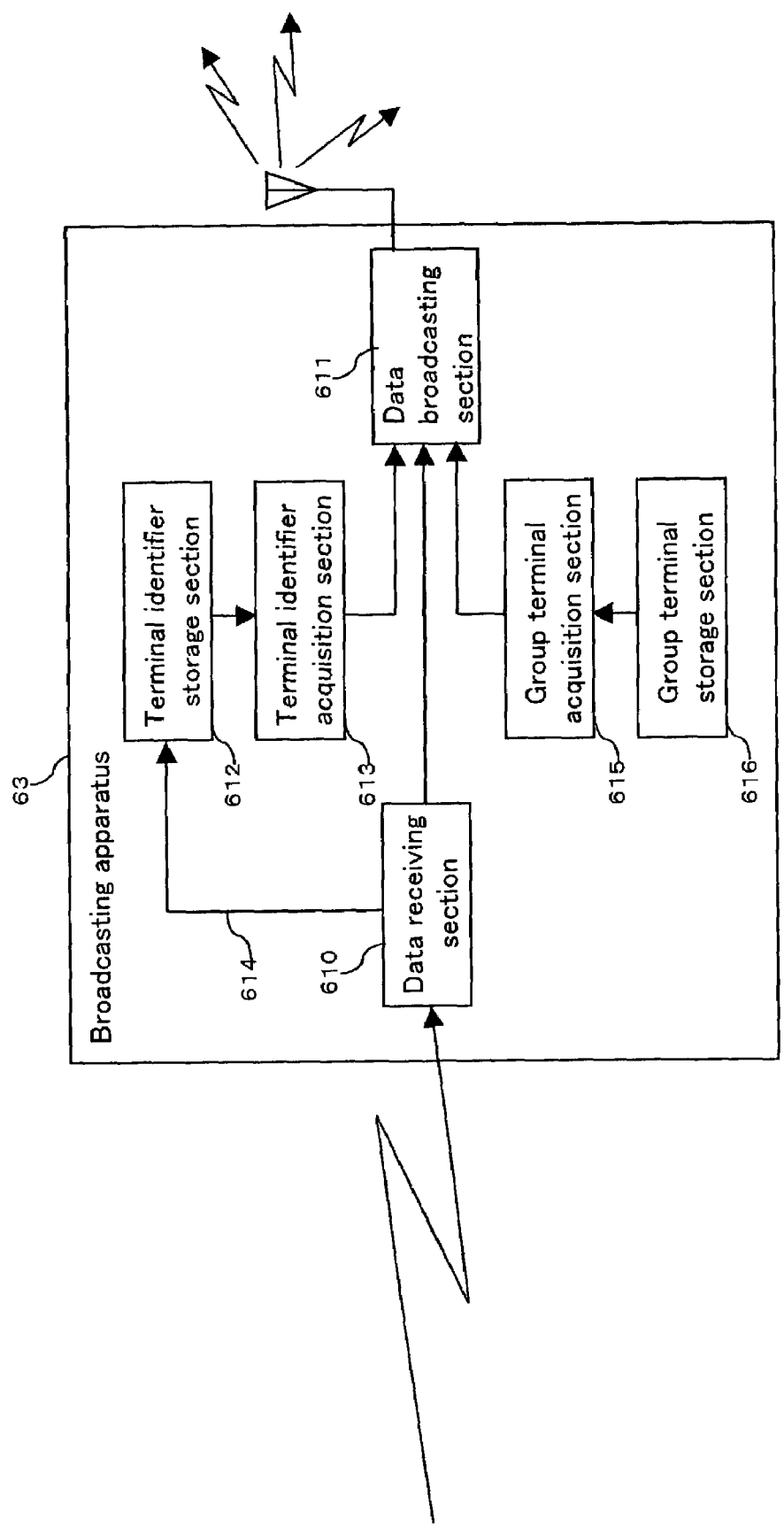
FIG. 61 is a view showing the basic construction of a modification of the broadcasting apparatus shown in FIG. 60.

The broadcasting apparatus 63 shown in FIG. 61 has a configuration (or construction) wherein group management is not carried out on the side of the management apparatus. The broadcasting apparatus 63 has a group terminal storage section 616 and a group terminal acquisition section to realize the above-mentioned group management. This also realizes functions similar to those realized by the cooperation of the management apparatus and the transmitting apparatus described in the first, second, third and fourth embodiments.

This embodiment is just an embodiment, and it is needless to say that other forms for embodying the invention in accordance with the claims are included in the present invention.

Fifth Embodiment

A fifth embodiment of the present invention will be described by using FIG. 66 to FIG. 70.

In the third and fourth embodiments, on the basis of the attribute information of members and receiving apparatuses managed in group, data is received automatically, and judgment is made as to whether the data is stored (or accumulated) or not. However, the present invention is not limited to this. On the basis of operations for specifically receiving and accumulating data and for specifically reserving data by members managed in group, it may be possible to allow another receiving apparatus (itself or a receiving apparatus used by another user) to automatically receive data, and judgment may be made as to whether the data is stored or not.

In the first embodiment, as shown in FIG. 1, the user of a receiving apparatus registers the content number or the content kind number of a content desired to be received and stored in the transmitting apparatus 1 by using the existing communication means 101. Furthermore, the user registers the receiving apparatus identification number for identifying the receiving apparatus in the transmitting apparatus 1.

The above-mentioned content number or content kind number is an example of the above-mentioned data identification information. Furthermore, the above-mentioned receiving apparatus identification number is an example of the above-mentioned receiving apparatus identifier.

Figure 66:
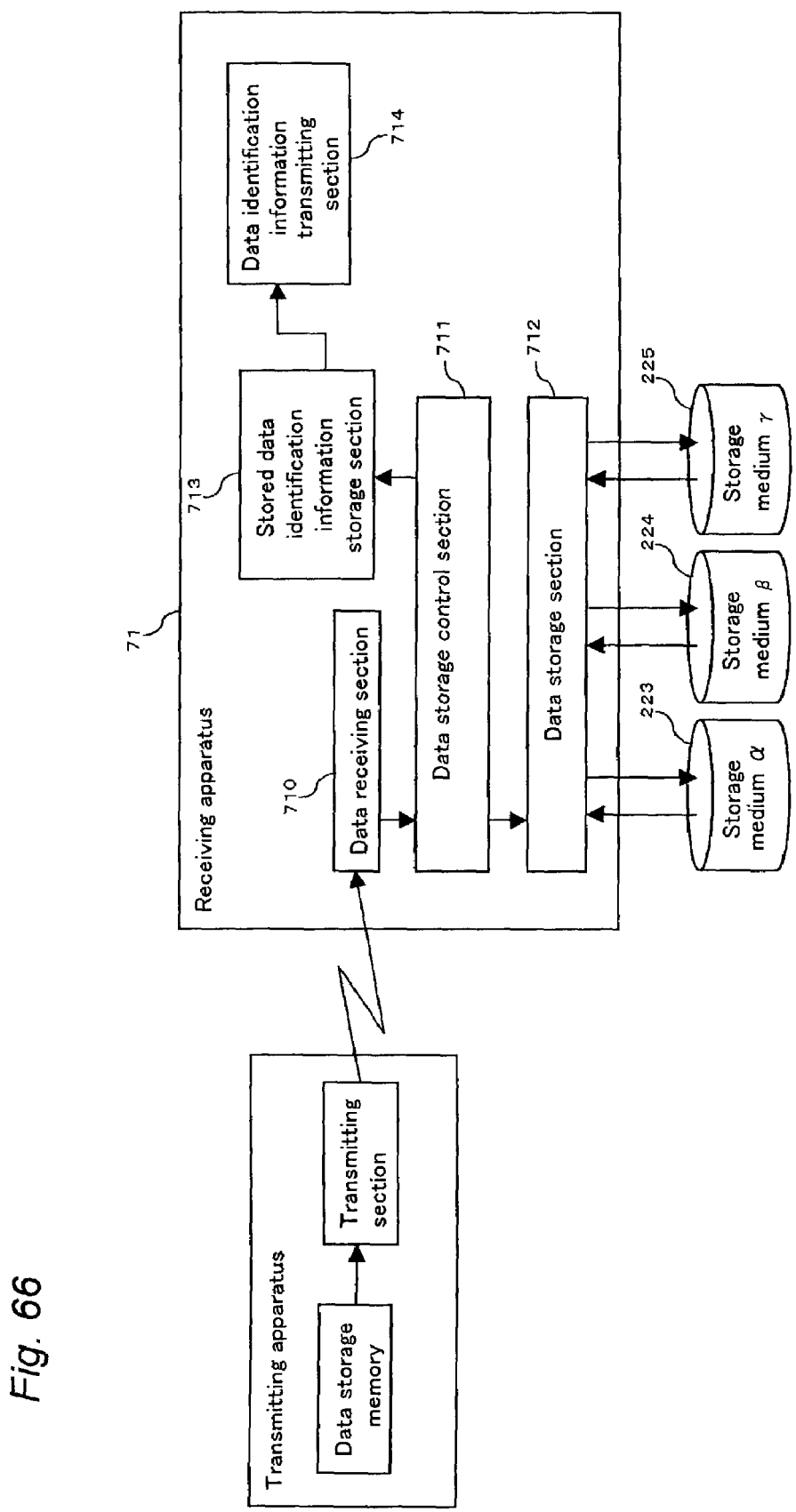
FIG. 66 is a view showing a second construction of the receiving apparatus in accordance with a fifth embodiment.

FIG. 66 shows a construction of a receiving apparatus 71 capable of transmitting data identifiers for identifying contents (hereafter referred to as data) to be received and stored (or accumulated).

The receiving apparatus 71 has a receiving section 710 having a function similar to that of the receiving section 210 of the receiving apparatus 21 in accordance with the first embodiment. It does not matter whether the receiving means is wired or wireless, and broadcasting or communications, just as in the case of the first embodiment.

Furthermore, the receiving apparatus 71 has a data storage section 712 having a function of recording received data on a storage medium; and this is a part of the function owned by the storage (or accumulation) control section 212 of the receiving apparatus 21 in accordance with the first embodiment. Still further, the receiving apparatus 71 has a data storage (or accumulation) control section 711 having a function of extracting data identification information for identifying data to be stored.

The data storage control section 711 is an extension of the function owned by the storage control section 212 of the receiving apparatus 21 in accordance with the first embodiment. Its extended function is a function for extracting data identification information (a content number in the first embodiment) for identifying data to be accumulated from a packet to be received from the receiving section and for accumulating the information on a stored (or accumulated) data identification information storage section 713. The method for extracting the data identification information is the same as that in the case of the first embodiment. The extracted data identification information can be accumulated on the identifier storage section 211 in accordance with the first embodiment as a separate table. In this embodiment, a stored data identification information storage section 713 is newly provided as an example.

Furthermore, when the user of a receiving apparatus specifically performs data storage reservation operation, data identification information to be reserved can be accumulated in the stored data identification information storage section 713 thanks to this extension of function.

The receiving apparatus 71 has a data identification information transmitting section 714 to send data identification information accumulated on the stored data identification information storage section 713 to a data management apparatus (for example, the transmitting apparatus 1 in accordance with the first embodiment).

Figure 67:
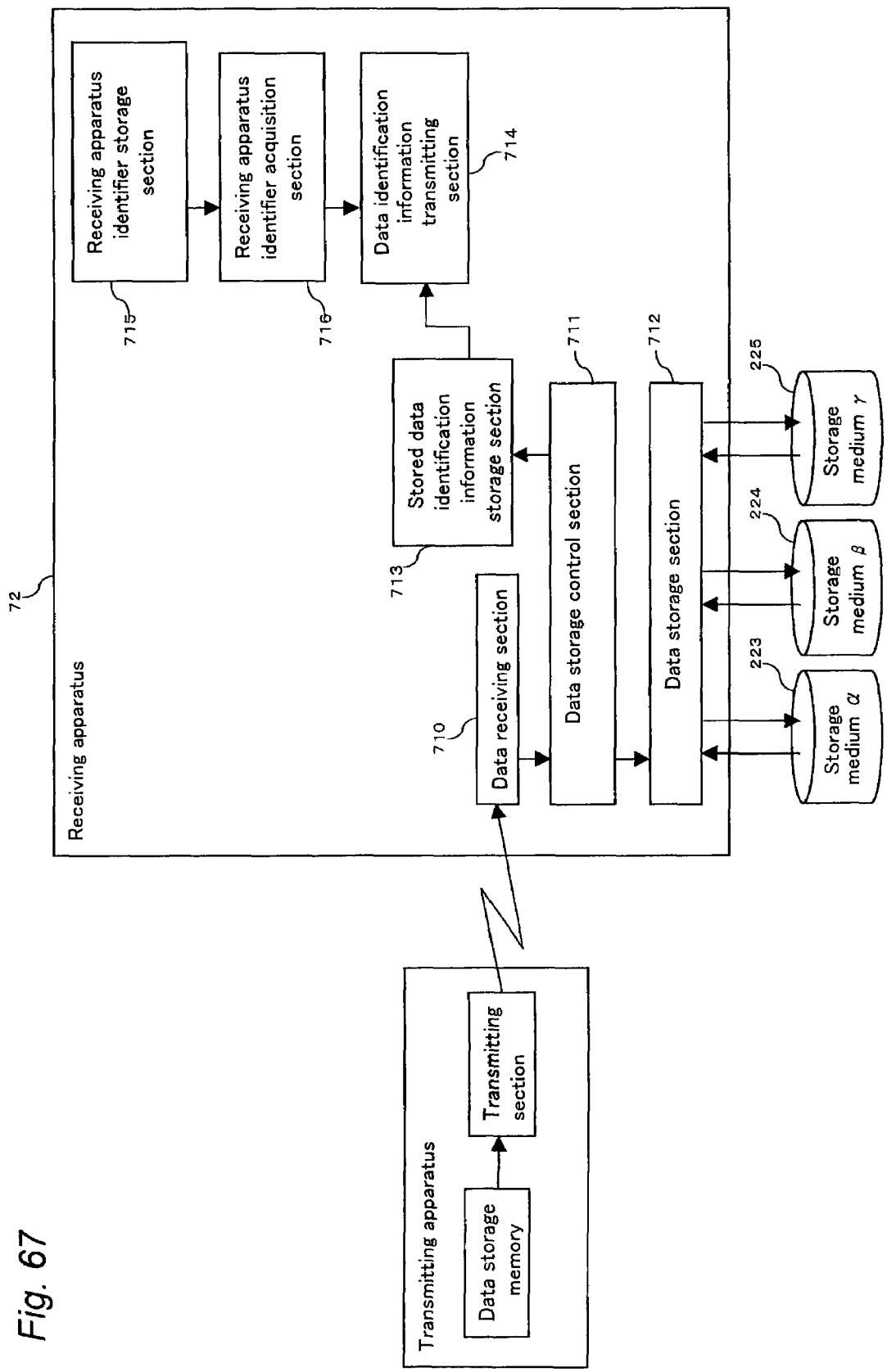
FIG. 67 is a view showing the basic of a modification of the receiving apparatus shown in FIG. 66.

In the receiving apparatus 71 of FIG. 66, only the data identification information is sent; however, the receiving apparatus 72 shown in FIG. 67 has a construction capable of sending the receiving apparatus identifier stored on the receiving apparatus in order to identify itself.

The receiving apparatus 72 stores the receiving apparatus identifier for identifying itself in a receiving apparatus identifier 715. Furthermore, the receiving apparatus 72 has a receiving apparatus identifier acquisition section 716 for acquiring the receiving apparatus identifier from the receiving apparatus identifier 715.

In the first embodiment, the above-mentioned receiving apparatus identifier 715 can also be stored as a separate table on the identifier storage section 211 of the receiving apparatus 21. Furthermore, the acquisition of the receiving apparatus identifiers can be realized by the storage control section 212 of the receiving apparatus 21.

By receiving the notice of the data identification information and the receiving apparatus identifier, a data management apparatus (for example, the transmitting apparatus 1 in accordance with the first embodiment) can recognize which receiving apparatus intends to store which data.

Furthermore, the management apparatuses 52 and 53 in accordance with the third and fourth embodiments manage group information. When the data identification information and the receiving apparatus identifier are sent to the management apparatus 52 or 53, the management apparatus 52 or 53 can specify a member constituting a group. As described in the third and fourth embodiments, the management apparatus 52 or 53 can send the receiving apparatus identifier and the data identification information (a content number in the third and fourth embodiments) used by the member to a data management apparatus (for example, the transmitting apparatus 1 in accordance with the third and fourth embodiments). The data management apparatus (for example, the transmitting apparatus 1 in accordance with the third and fourth embodiments) sends information for controlling data storage to a designated receiving apparatus on the basis of the sent information.

Hence, when the user of the receiving apparatus performs storage operation of specific data (for example, reservation operation), it is possible to realize that a similar reservation operation can also be controlled automatically for the receiving apparatuses used by the members of the group.

Figure 69:
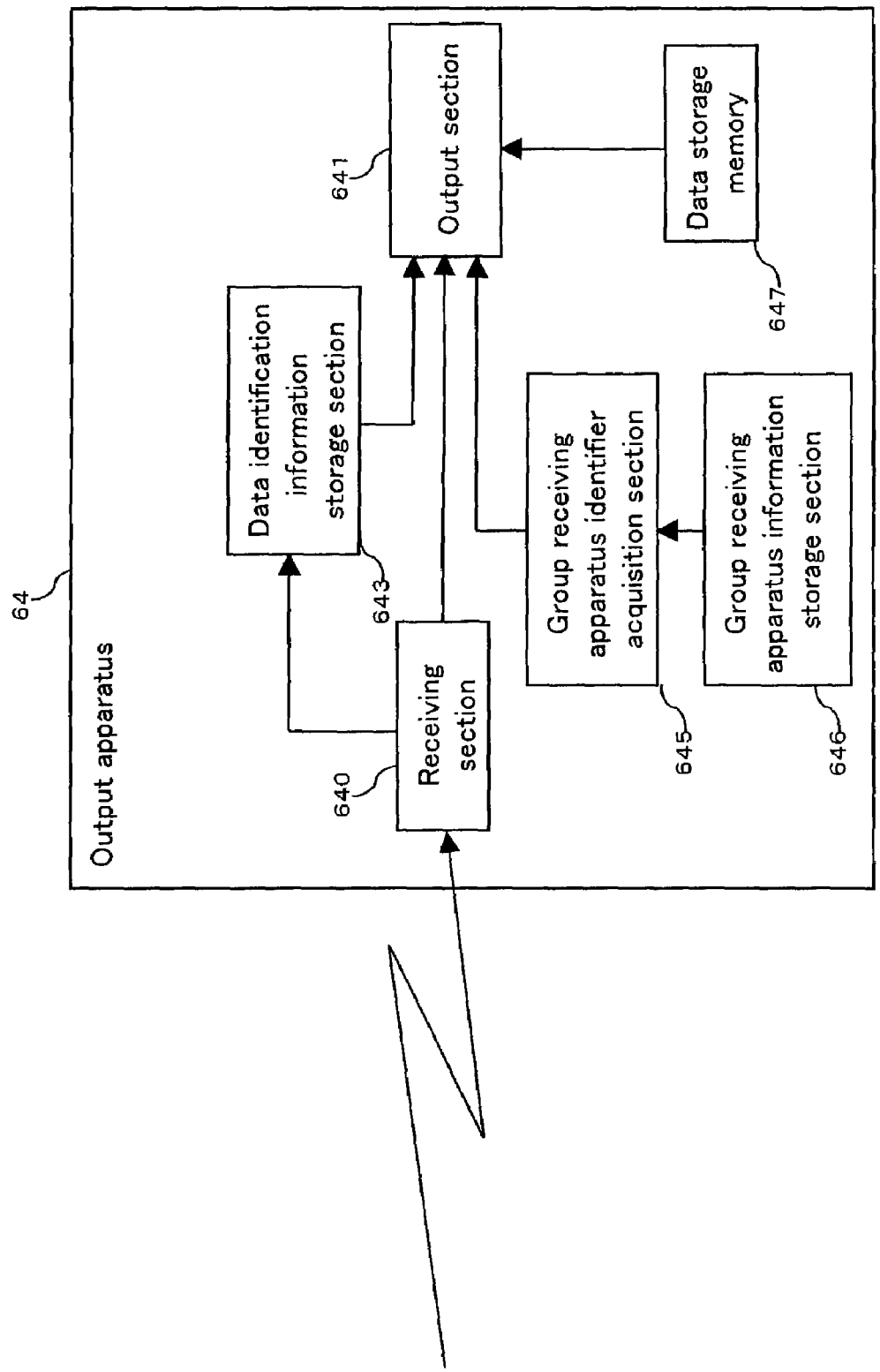
FIG. 69 is a view showing the basic construction of the output apparatus in accordance with the fifth embodiment.

Furthermore, the receiving apparatus 73 shown in FIG. 69 is further provided with a transmission destination information storage section 717 and a transmission destination information acquisition section 718.

In the first embodiment, the above-mentioned transmission destination information storage section 717 can be stored on the identifier storage section 211 of the receiving apparatus 21 as a separate table. Furthermore, the acquisition of the transmission destination information can be realized by the storage control section 212 of the receiving apparatus 21.

In the third and fourth embodiments, the management apparatuses 52 and 53 manage groups. In other words, they also manage information for identifying receiving apparatuses used by members. The construction of the receiving apparatus 73 of FIG. 68 is an example wherein information for identifying receiving apparatuses used by members is not held in a management apparatus but held by itself.

Figure 68:
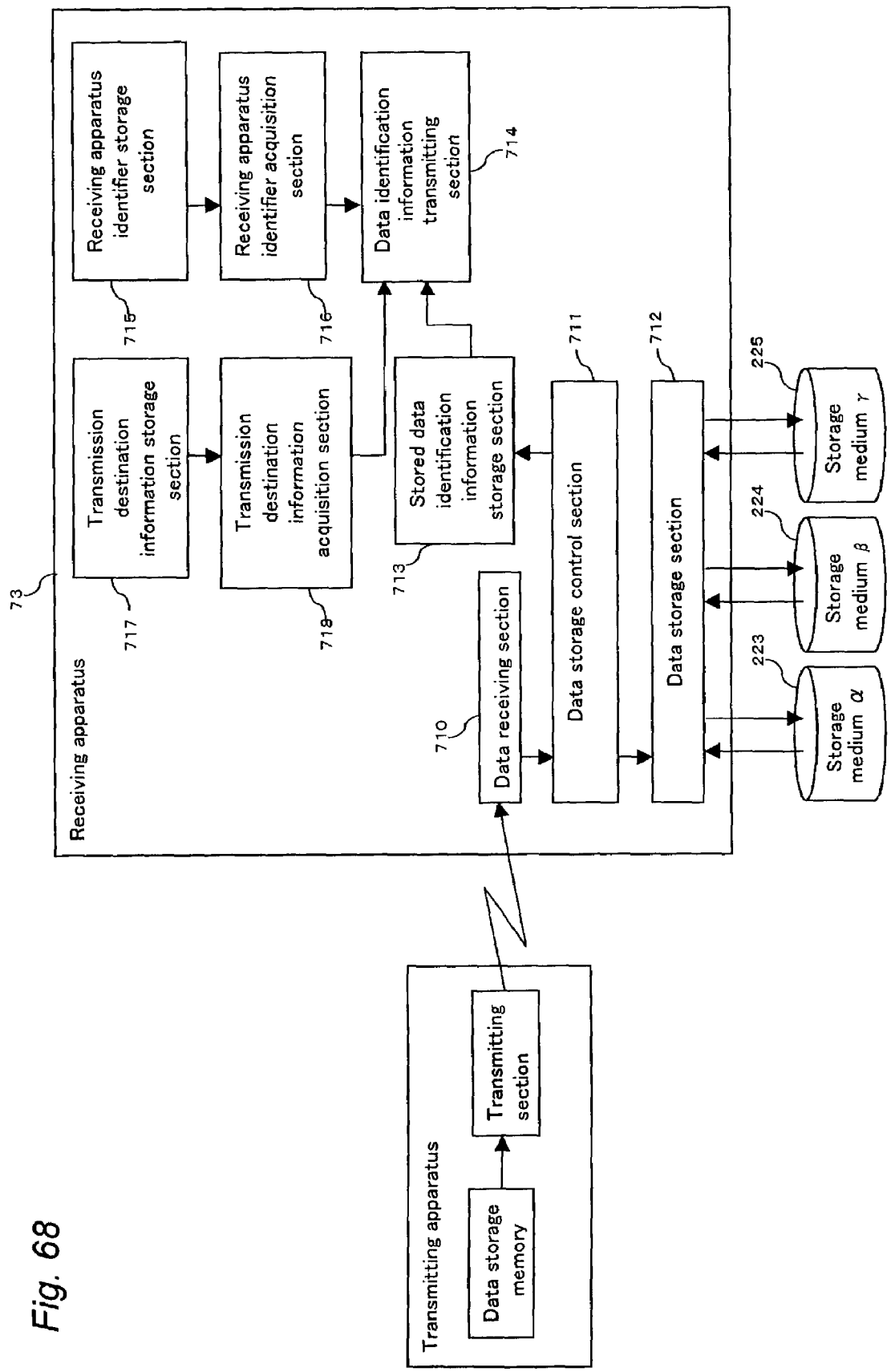
FIG. 68 is a view showing the basic construction of a modification of the receiving apparatus shown in FIG. 67.

Hence, the above-mentioned function that can be realized by the construction comprising the receiving apparatus 72 of FIG. 67 and the management apparatuses 52 and 53 in accordance with the third and fourth embodiments can be realized by only the receiving apparatus 73 of FIG. 68.

FIG. 69 shows the construction of an output apparatus 64 for receiving data identification information and receiving apparatus identifiers transmitted from the receiving apparatuses 71 and 72 described in this embodiment.

The output apparatus 64 is provided with an output section 641 for sending at least either data identification information or receiving apparatus identifier received by a receiving section 640. The data identification information is held (or kept) in a data identification information storage section 643. Furthermore, the output apparatus 64 is provided with a group receiving apparatus information storage section 646. The group receiving apparatus information storage section 646 holds a receiving apparatus identification table for managing receiving apparatuses as a group.

The output section 641 compares this table with the receiving apparatus identifier received by the receiving apparatus 640 via a group receiving apparatus identifier acquisition section 645 to detect a group corresponding thereto. Furthermore, another receiving apparatus identifier of the detected group is acquired. The output section 641 outputs the acquired receiving apparatus identifier and received data identification information. This function realizes the functions of the transmitting apparatus 1 and the management apparatuses 52 and 53 according to the third and fourth embodiments by using one apparatus (the output apparatus 64).

The group managed by the management apparatuses 52 and 53 in accordance with the third and fourth embodiments is intended for a group construction based on the taste for contents. However, the receiving apparatus information storage section 646 can hold a receiving apparatus identification table wherein the group construction is based on groups for managing residential districts, school districts, theme park districts, etc.

Hence, when data storage reservation is carried out by one receiving apparatus in a district, the receiving apparatus sends its receiving apparatus identifier and data identification information to the output apparatus. The output apparatus can detect the corresponding district and can send the receiving apparatus identifiers of the receiving apparatuses belonging to the district and the data identification information. In the district, the receiving apparatuses store the same data, whereby the data can be shared.

The output apparatus 64 is one apparatus for realizing the functions of the transmitting apparatus 1 and the management apparatuses 52 and 53 in accordance with the third and fourth embodiments, and the data transmission function thereof is extended.

The output section 641 reads the data from a data storage memory 647 and sends the data. The data is controlled in the data storage memory so as to be paired with the data identification information. When the output apparatus 64 sends the data coincident with the received data identification information, the output apparatus 64 sends the data together with the data identification information in relation thereto.

Hence, unlike the receiving apparatus 21 in accordance with the first embodiment, it is possible to identify data (a content in accordance with the first embodiment) to be accumulated, independent of EPG (electronic program guide).

Figure 70:
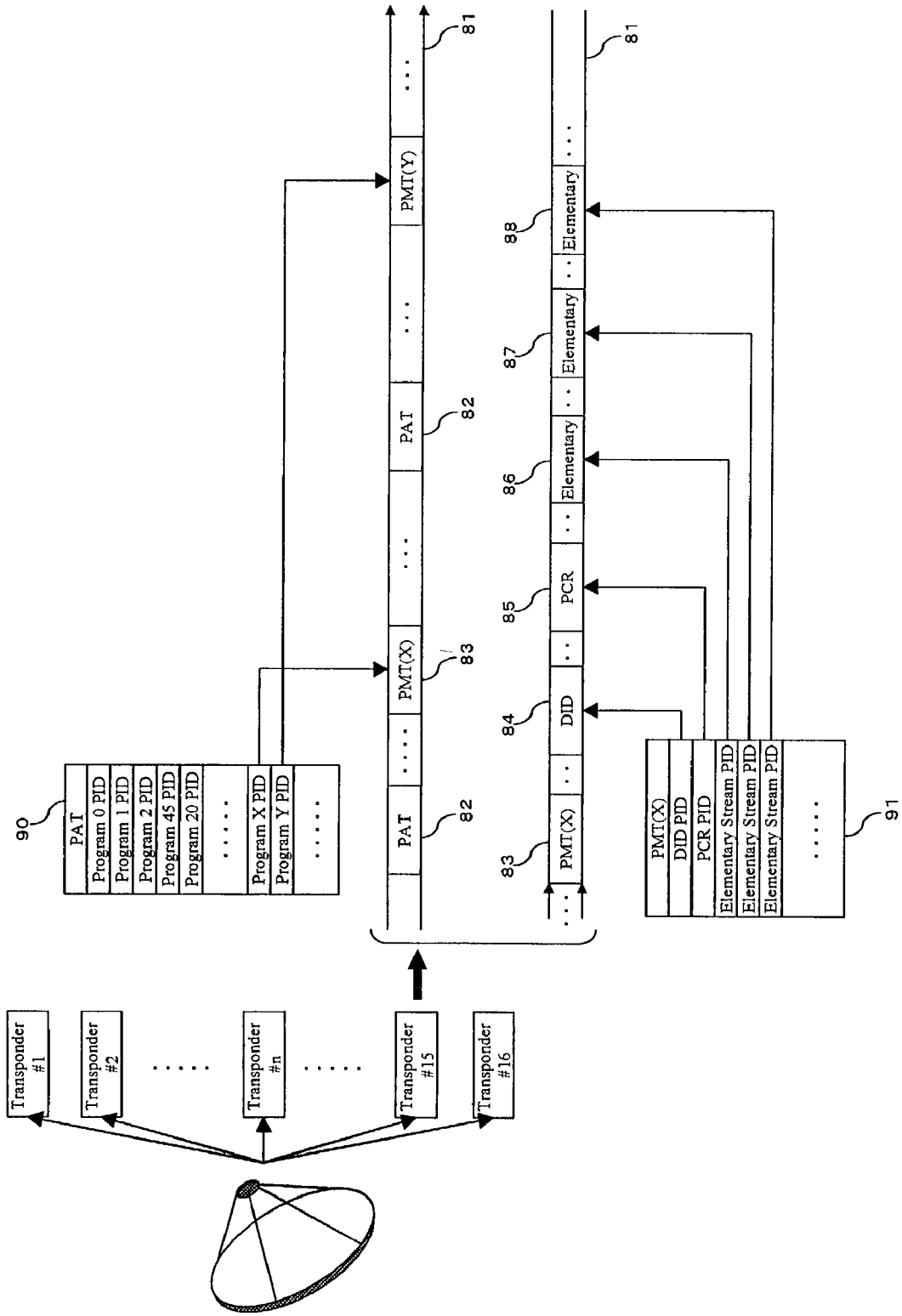
FIG. 70 is a view showing the specifications of a stream in accordance with the fifth embodiment.

FIG. 70 shows an example of a stream including both data and data identification information to be sent. In the example shown in FIG. 70, a packet including data identification information is disposed at the head of an elementary packet, i.e., an element of the data (a content).

In order that a receiving apparatus can securely receive the packet including the data identification information, plural data identification information packets may be disposed ahead of the head elementary packet or may be disposed in the middle of the elementary packets of data.

FIG. 70 is an example of a broadcast stream, and its details will be described below.

Inside the above-mentioned stream, information tables required for broadcasting are included as packets. In the example of the stream 81 shown in FIG. 70, three kinds of information tables are present. A program association table (PAT) 82 has 0 as a packet ID. The details of the table are shown in PAT 90. PAT 90 is a table for holding the number of a program and the packet ID of a program map table (PMT), i.e., an information table required for the program.

The program is herein a general classification of data sent by the output apparatus 63 of FIG. 69.

PMT (X) 83 in the stream 81 is a packet identified by the packet ID of the program map table (PMT) of a program X held in PAT 82 (90). The details of the table of PMT (X) 83 are shown in PAT (X) 91. PAT (X) 91 is a table for holding the packet ID of an elementary packet used as a data element, the packet ID of a time stamp packet referred to on the receiving side and the packet ID of a packet including the data identification information. The elementary packet used at the head of data is the packet designated by numeral 86. The packet including the data identification information is a packet designated by DID 84 and is disposed ahead of the head elementary packet (numeral 86).

Plural DIDs 84 can be disposed in the stream 81 so that DIDs can be received securely on the receiving side.

In this embodiment, the content number described in the explanation of the first embodiment is taken as an example of the data identification information; however, the information is not limited to that. As the data identification information, the data may include region identification information of a meaningful district, or the data may be divided and may include information indicating the ordinal position of data.

This embodiment is just an embodiment, and it is needless to say that other forms for embodying the invention in accordance with the claims are included in the present invention.

As described above, the respective embodiments in accordance with the present invention provide the following effects.

(1) Data can be accumulated automatically even in a receiving apparatus installed at a physically remote place without carrying out operation by its user.

(2) When data is received by a receiving apparatus and accumulated on plural kinds of storage (or accumulation) media connected to the receiving apparatus, identifiers for identifying the storage media are managed by the receiving apparatus or transmitted from a transmitting apparatus together with the data, whereby the receiving apparatus can automatically select a storage medium from among the plural kinds of storage media and can accumulate the data.

(3) Personal tastes depending on daily living environments can be reflected, data storage (or accumulation) in synchronization with the changes in personal tastes can be carried out automatically, and data conforming to the personal tastes can be accumulated.

(4) By automatically storing data for plural persons, the plural persons can have unified topics of conversation by using the same accumulated data, and the effect of data utilization increases.

(5) Data judged unnecessary when judgment is made on the basis of only the taste of a person is automatically accumulated forcibly for all the members on the basis of the judgment on the taste of the group comprising plural persons including the person, whereby data storage (or accumulation) assumed to be participated by all the members forming a group can be guaranteed for all the members.

(6) Even when the taste for data changes owing to stimuli and incitements among plural persons and time lags occur in data demand and desire, data is automatically accumulated forcibly for all the members forming a group on the basis of the judgment on the taste of plural persons stimulating one another, whereby data storage for the lagged data demand and desire can be guaranteed.

(7) Data being effective when used by plural persons is automatically accumulated forcibly for all the members of a group on the basis a specific storage (or accumulation) reservation of a person, whereby data storage (or accumulation) assumed to be participated by all the members can be guaranteed for all the members forming the group.

Although the present invention has been fully described in connection with the preferred embodiments thereof with reference to the accompanying drawings, it is to be noted that various changes and modifications are also apparent to those skilled in the art. Such changes and modifications are to be understood as included within the scope of the present invention as defined by the appended claims unless they depart therefrom.

What is claimed is:

1. A transmitting apparatus that transmits a storage identifier that identifies one of a plurality of storage media of a single receiving apparatus and data to be accumulated on the storage medium identified by the storage identifier.

2. A transmitting method, comprising:
transmitting a storage identifier that identifies one storage medium of a plurality of kinds of storage media of a single receiving apparatus and data to be accumulated on the storage medium identified by the storage identifier.

3. The transmitting method according to claim 2, further comprising associating at least one storage identifier with at least one of content and a kind of content.

4. The transmitting method according to claim 3, further comprising designating, by a user of a receiving apparatus, the at least one of content and kind of content which each of the storage identifiers is associated with.

5. The transmitting method according to claim 2, further comprising acquiring a storage identifier from memory based upon one of a content and a kind of content to be transmitted, and transmitting the storage identifier along with the one of content and kind of content.

6. A transmitting apparatus that transmits a storage identifier that identifies one of a plurality of kinds of storage media of a single receiving apparatus, and data to be accumulated on a storage medium of the kind of storage medium identified by the storage identifier.

7. A transmitting method, comprising:
transmitting a storage identifier that identifies one of a plurality of kinds of storage media of a single receiving apparatus, and data to be accumulated on a storage medium of the kind of storage medium identified by the storage identifier.

8. A transmitting method, comprising:
transmitting a storage identifier that identifies one of a plurality of storage media of a single receiving apparatus and data to be accumulated on the storage medium identified by the storage identifier.

* * * * *